US012038160B2

(12) United States Patent
Guastella

(10) Patent No.: US 12,038,160 B2
(45) Date of Patent: Jul. 16, 2024

(54) AMBIANCE LIGHTING SYSTEM AND METHOD

(71) Applicant: Teresa Marie Guastella, Clermont, FL (US)

(72) Inventor: Teresa Marie Guastella, Clermont, FL (US)

(*) Notice: Subject to any disclaimer, the term of this patent is extended or adjusted under 35 U.S.C. 154(b) by 0 days.

(21) Appl. No.: 18/124,692

(22) Filed: Mar. 22, 2023

(65) Prior Publication Data
US 2023/0250946 A1 Aug. 10, 2023

Related U.S. Application Data

(63) Continuation-in-part of application No. 17/549,973, filed on Dec. 14, 2021, now Pat. No. 11,644,177.

(51) Int. Cl.
F21V 21/16 (2006.01)
F21V 1/06 (2006.01)
F21V 3/04 (2018.01)
F21V 7/04 (2006.01)
F21V 17/00 (2006.01)
F21W 121/00 (2006.01)
F21Y 115/10 (2016.01)

(52) U.S. Cl.
CPC ............... *F21V 21/16* (2013.01); *F21V 1/06* (2013.01); *F21V 3/049* (2013.01); *F21V 7/04* (2013.01); *F21V 17/002* (2013.01); *F21W 2121/00* (2013.01); *F21Y 2115/10* (2016.08)

(58) Field of Classification Search
CPC .................................... F21V 1/22; F21V 1/06
See application file for complete search history.

(56) References Cited

U.S. PATENT DOCUMENTS

| 9,568,174 | B2* | 2/2017 | Ng | F21V 21/084 |
| 10,514,140 | B2* | 12/2019 | Sreshta | F21V 31/005 |
| 10,704,746 | B2* | 7/2020 | Jeong | H05B 45/10 |
| 11,242,962 | B2* | 2/2022 | Stork | F21V 23/0414 |
| 11,248,755 | B2* | 2/2022 | Sreshta | F21V 3/026 |

* cited by examiner

Primary Examiner — Tracie Y Green
Assistant Examiner — Michael Chiang
(74) Attorney, Agent, or Firm — H. Brock Kolls

(57) ABSTRACT

The present invention relates to an ambiance lighting system that uses more than one translucent panel. The translucent panels are aligned, absent occlusions along the surface, and interconnected or inserted into a luminary wrap. A light control panel comprises one or more light-emitting diodes (LED), a power source, and selectively a GPS, audio-video interface, and a communication interface. The light control panel is orientated to illuminate and project light through the translucent panel creating an ambiance lighting effect. A box spinner, box panels, post adapter, colored lens, accessory sleeves, ornamental accessories, and/or a retractable tether can be used with the ambiance lighting system. The GPS, audio-video interface, and communication interface can be used in geofencing and digital media streaming applications.

24 Claims, 42 Drawing Sheets

Fig. 1F
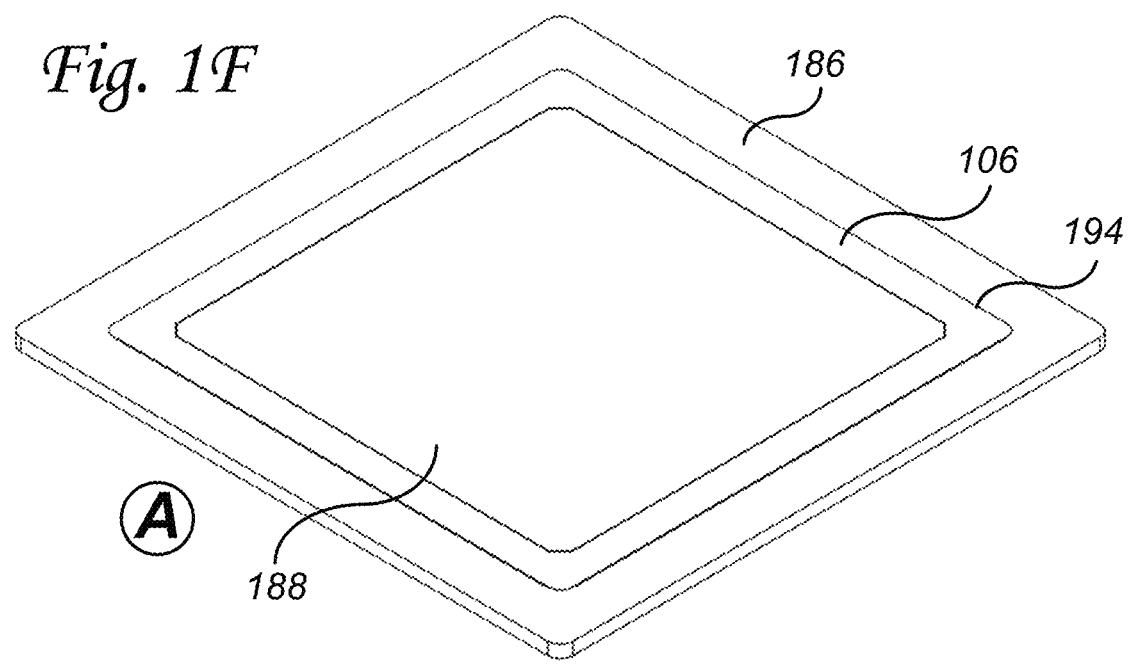
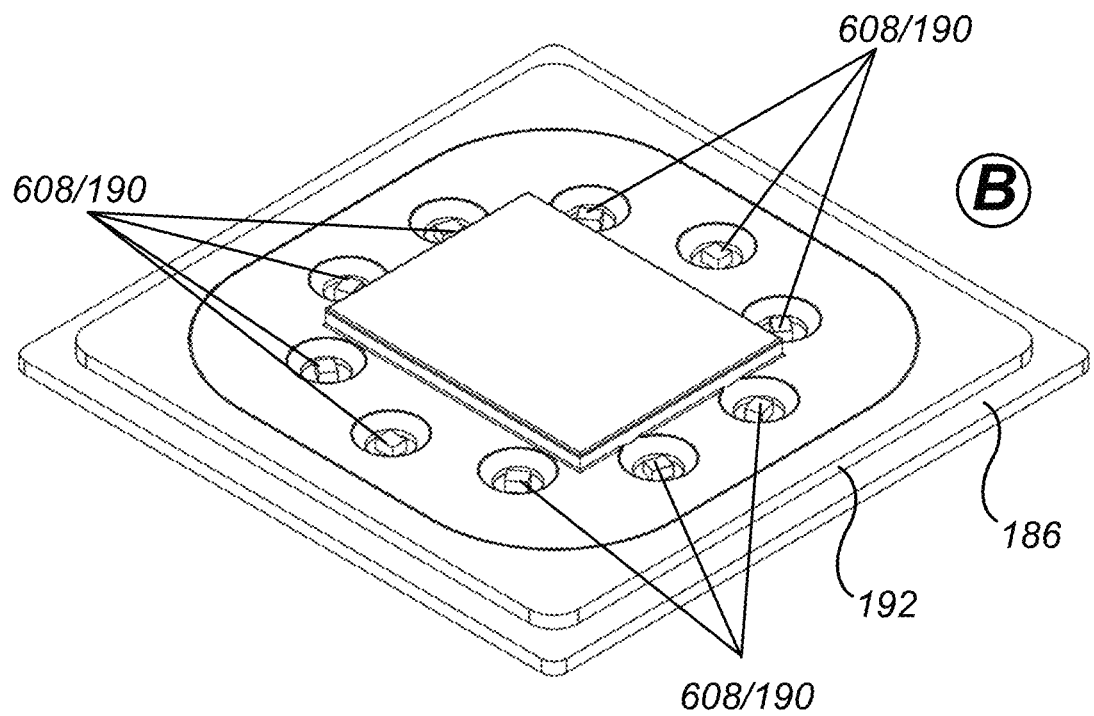

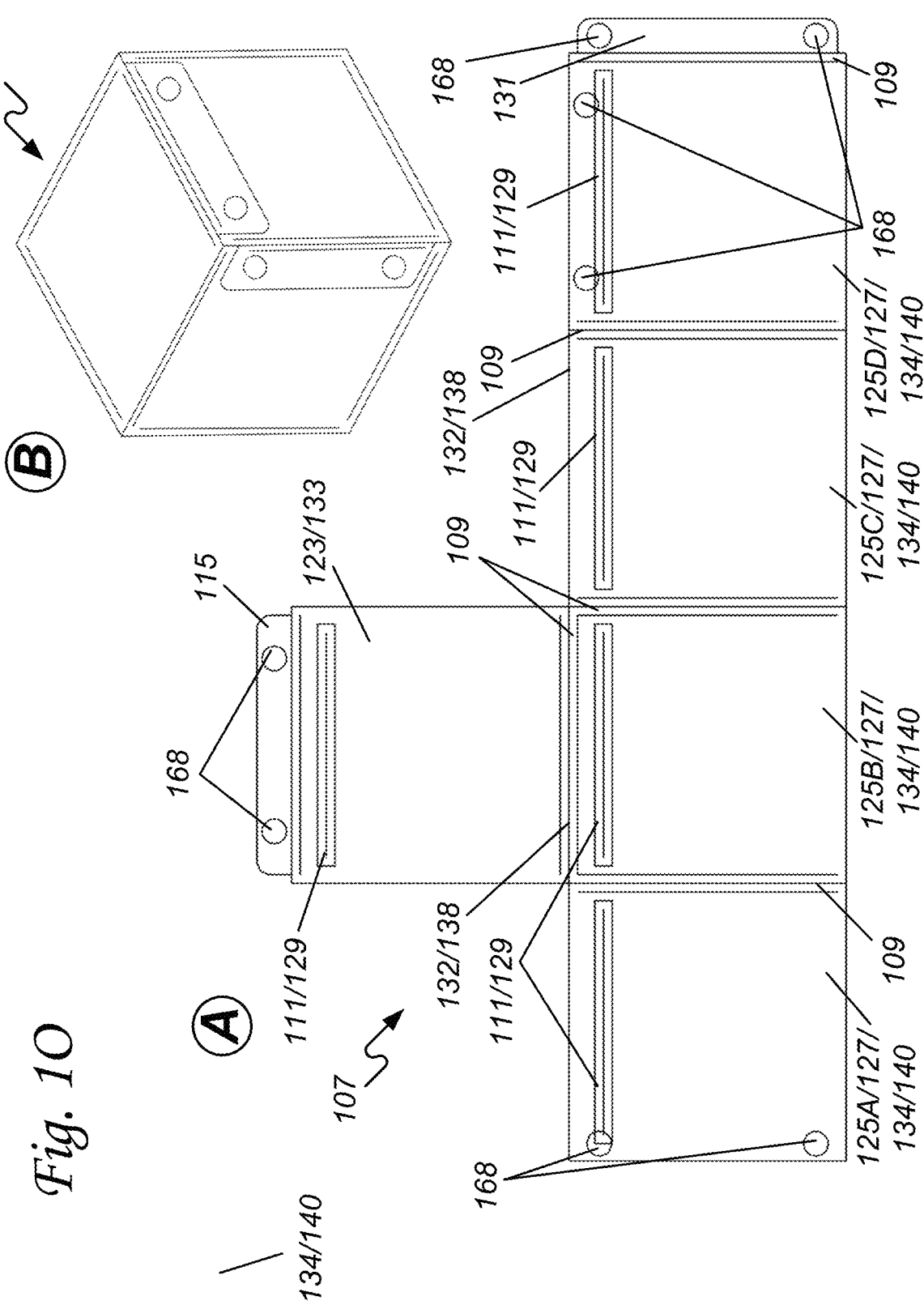

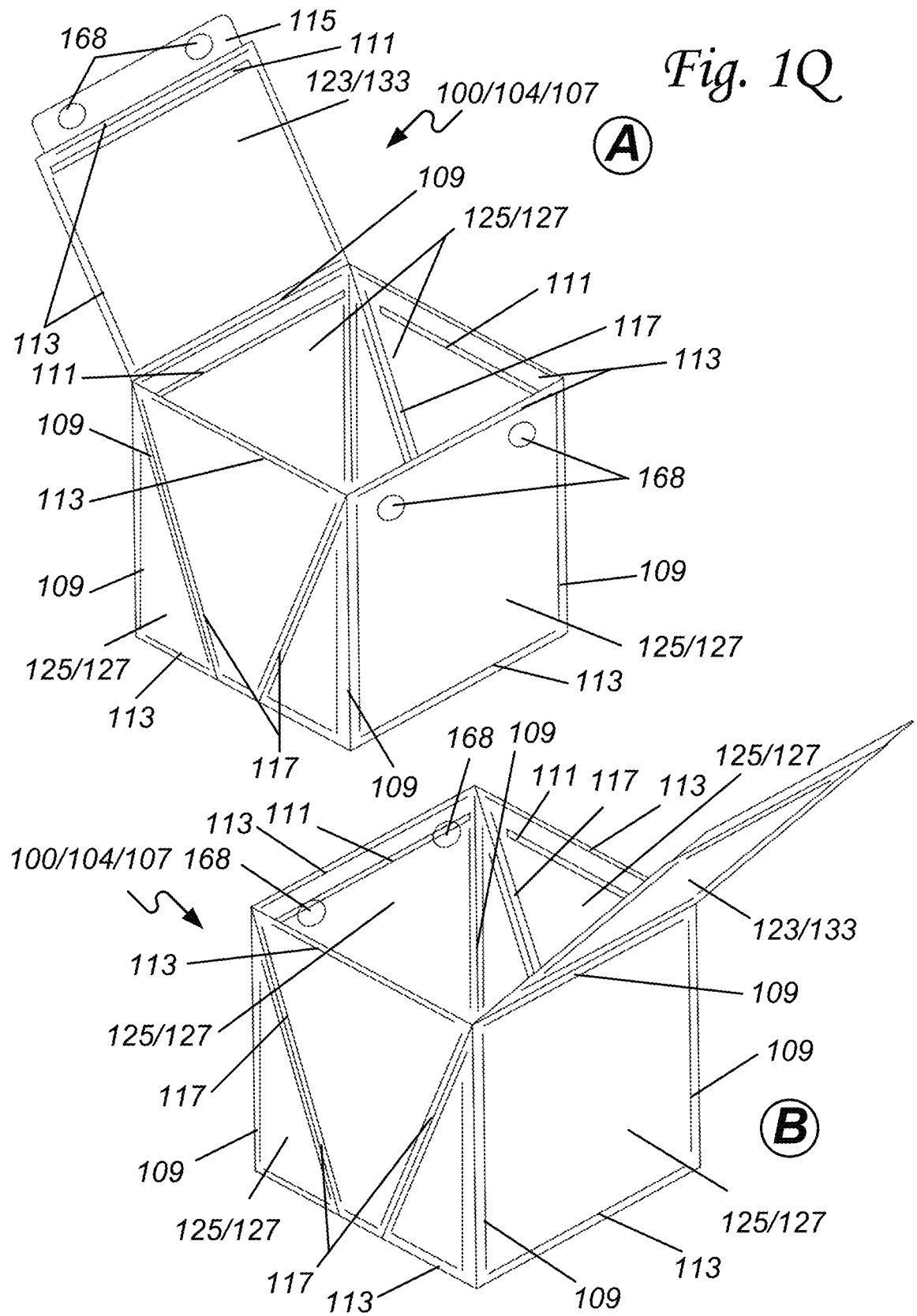

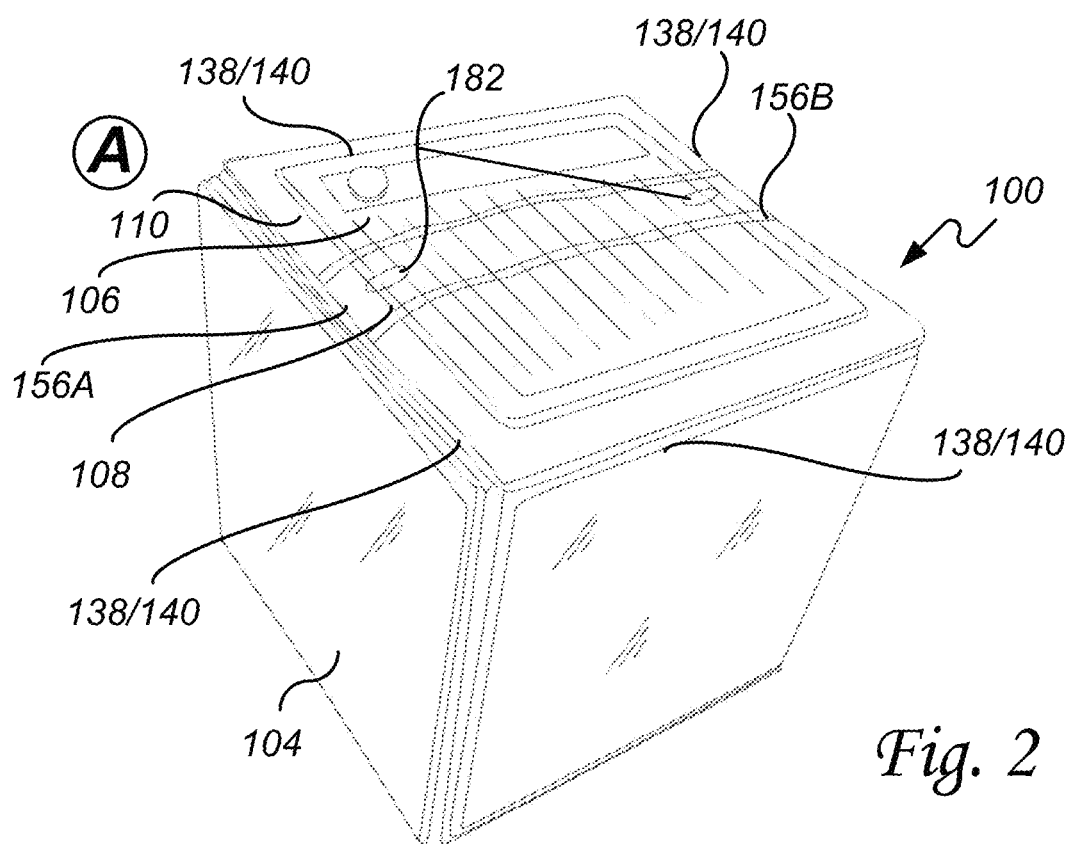
Fig. 2
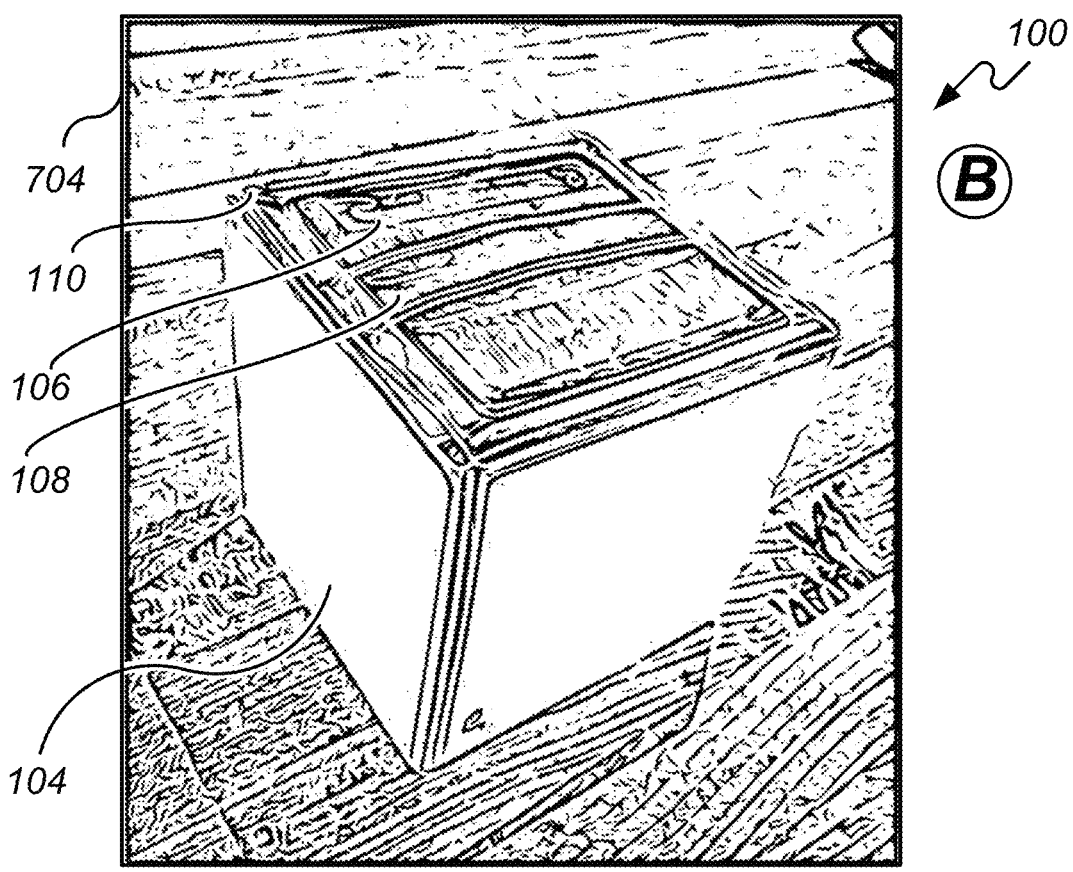

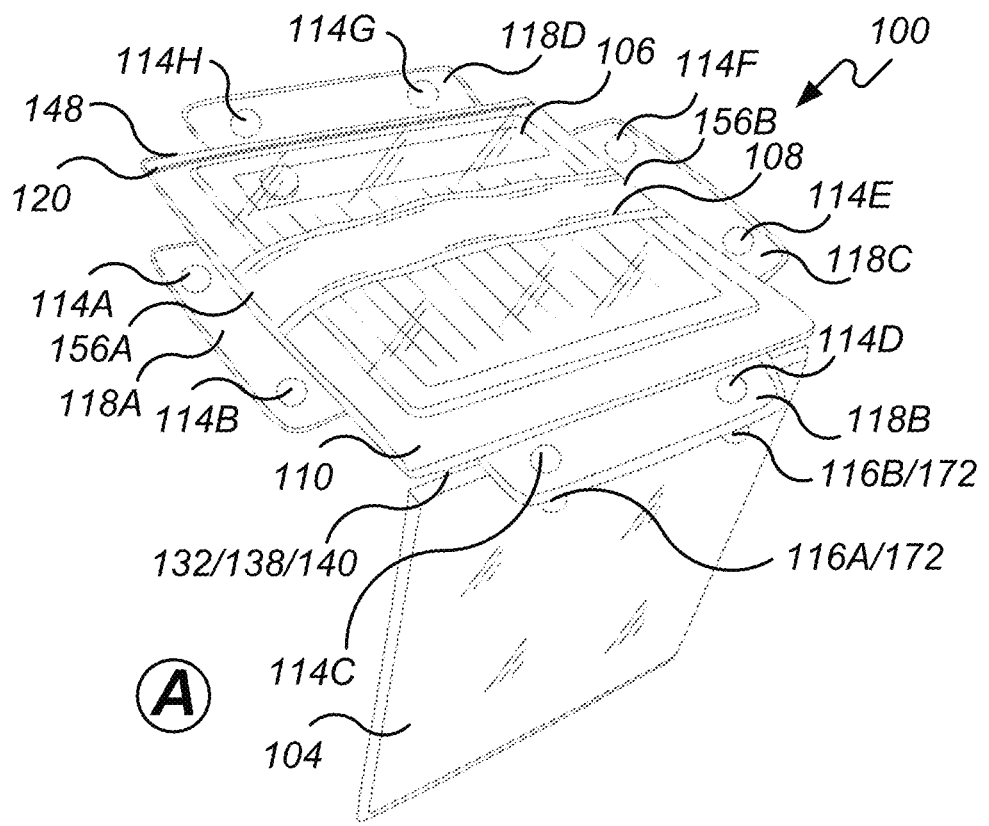
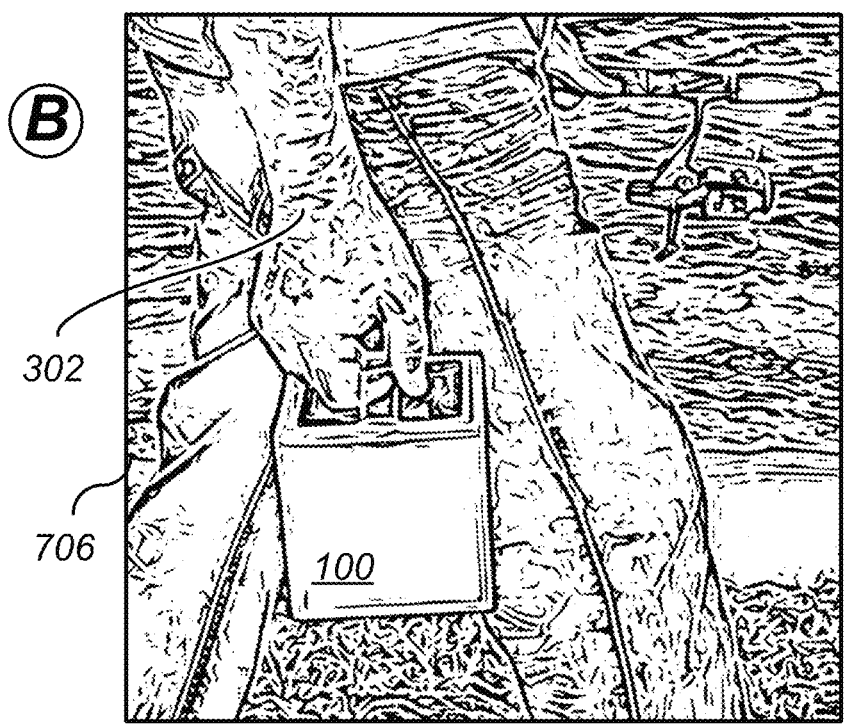
Fig. 3

Fig. 7B
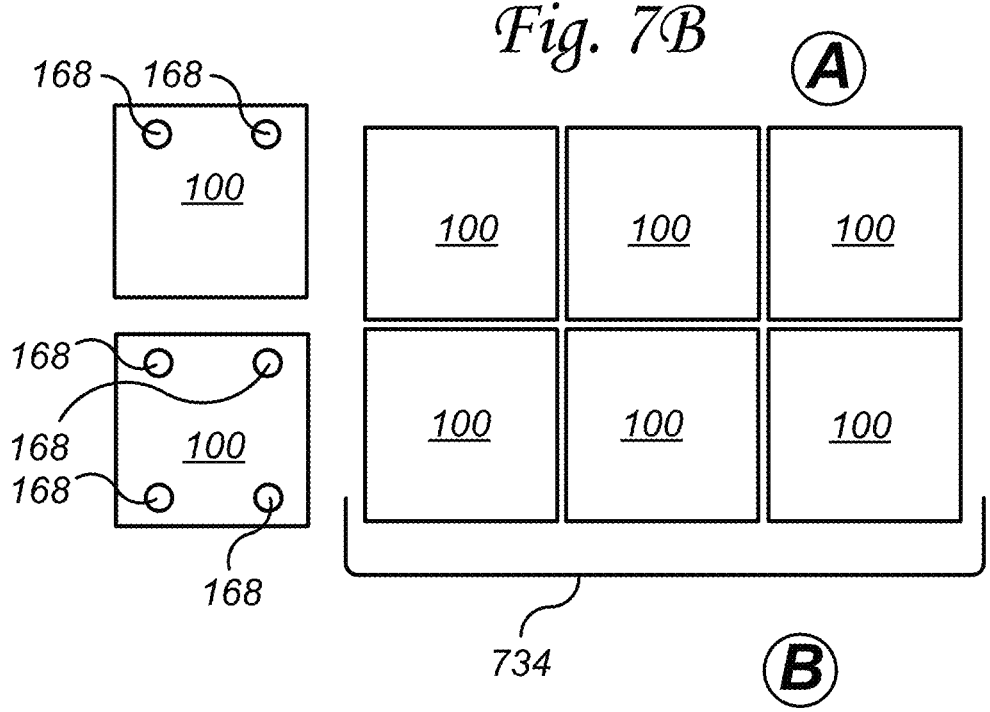
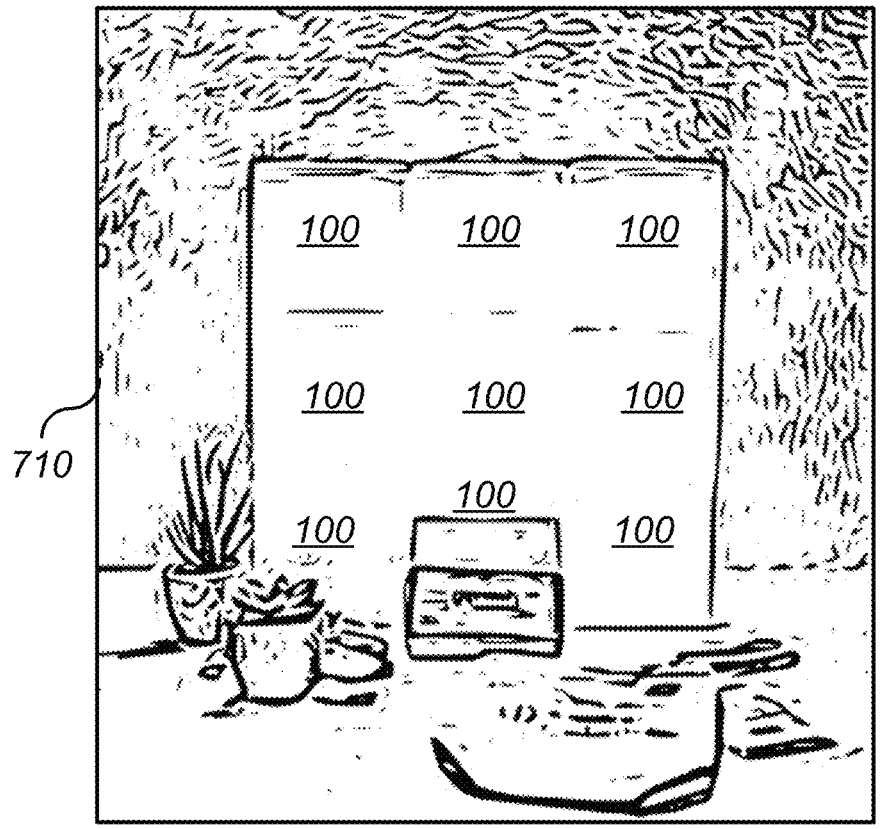

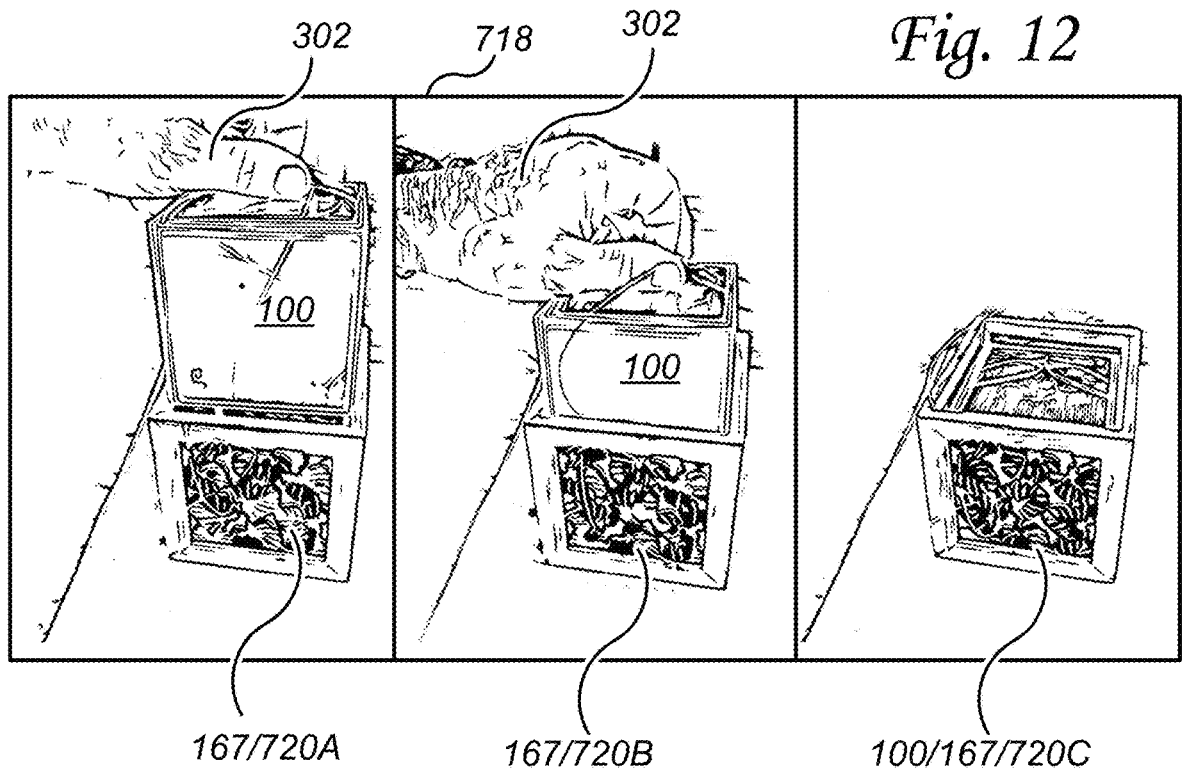
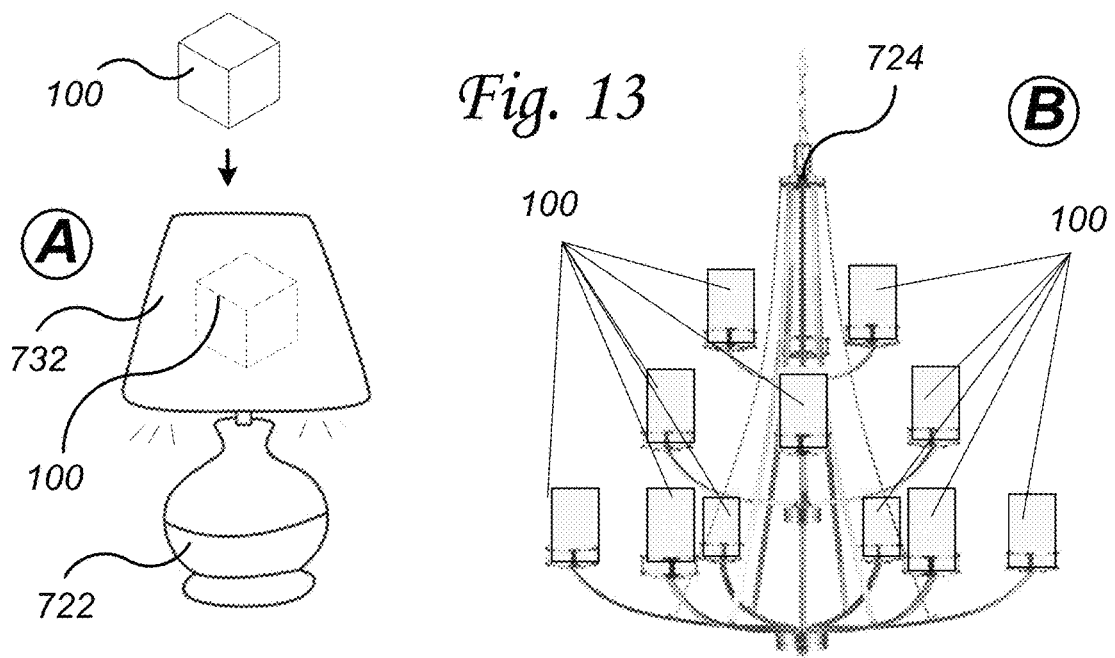
Fig. 12
Fig. 13

Fig. 14
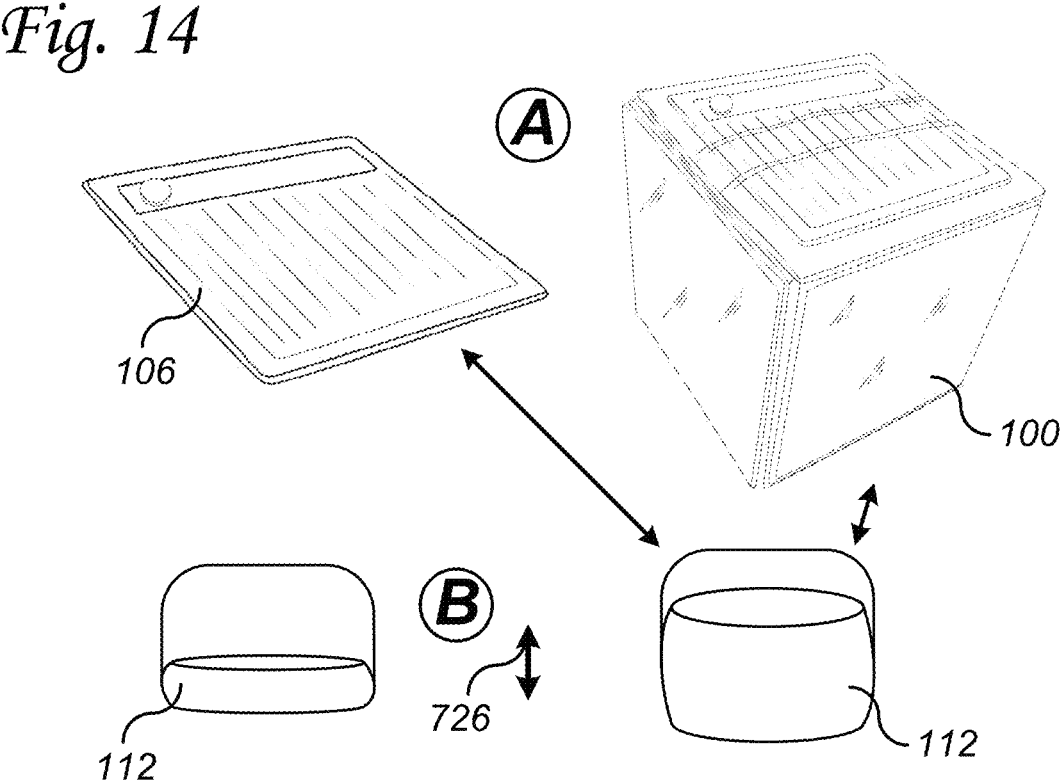

Fig. 15A
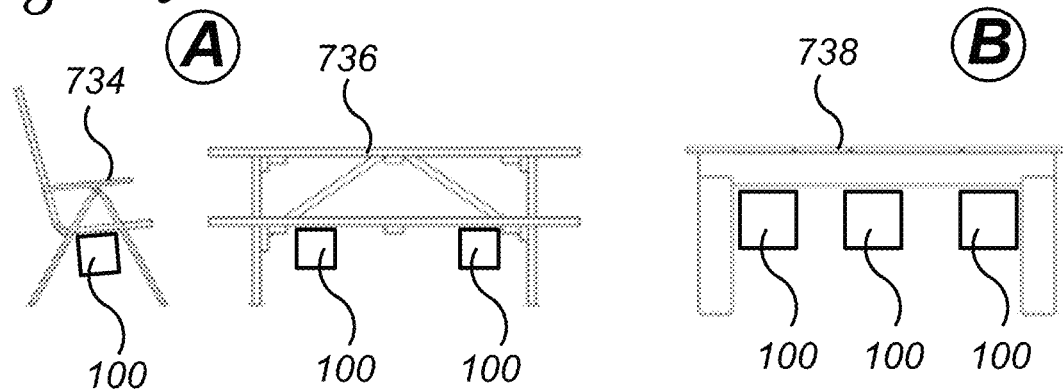
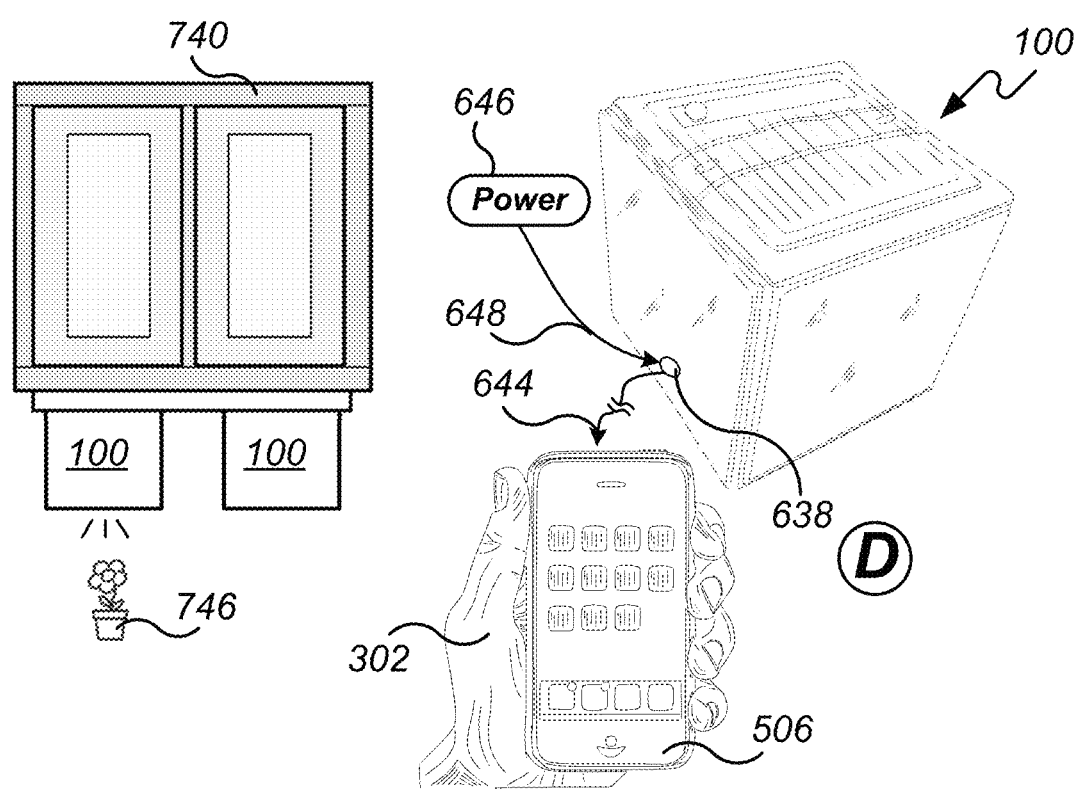

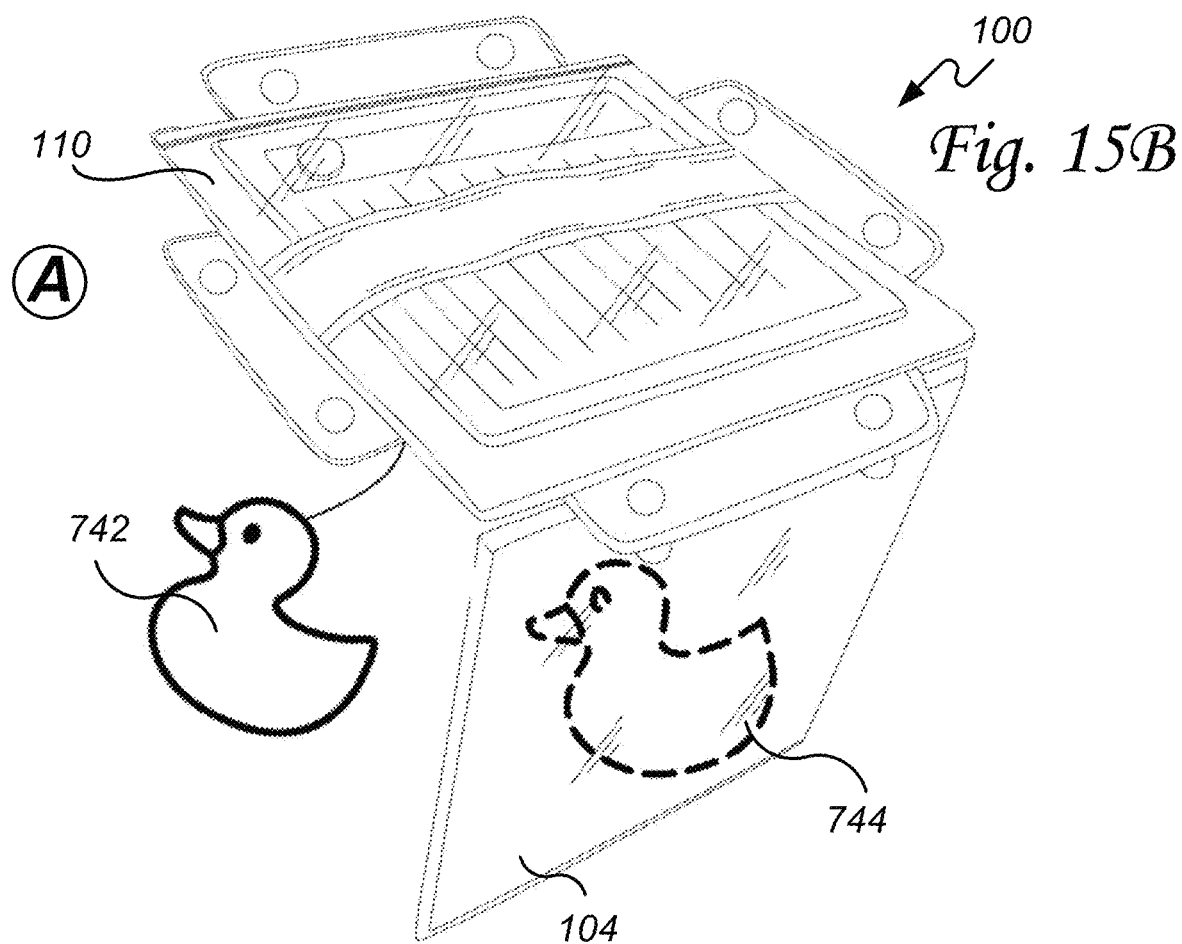
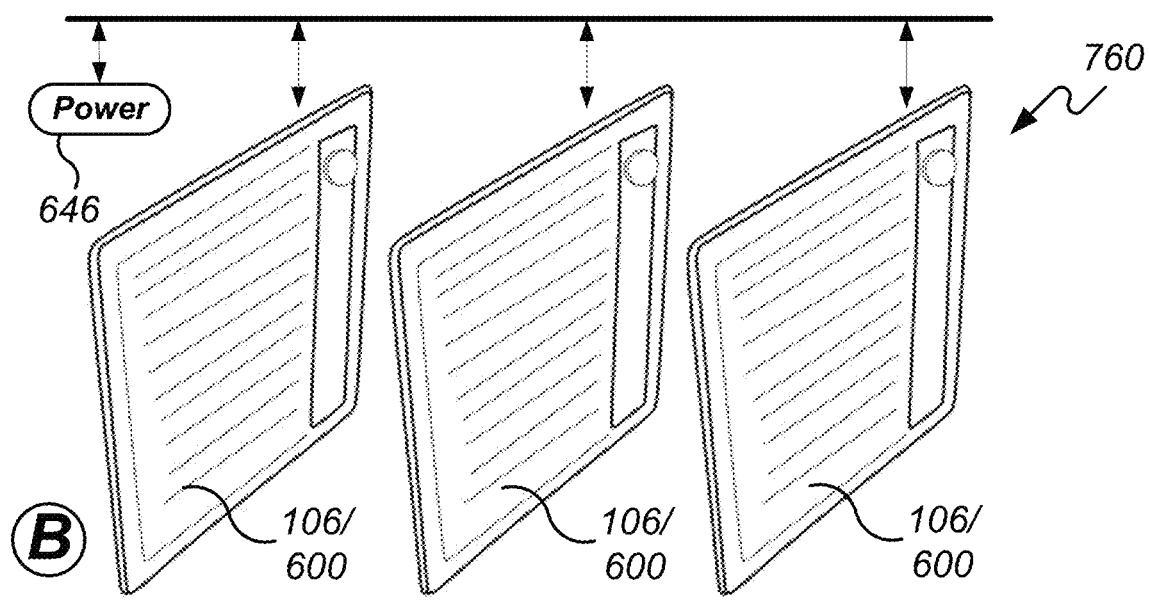
Fig. 15B

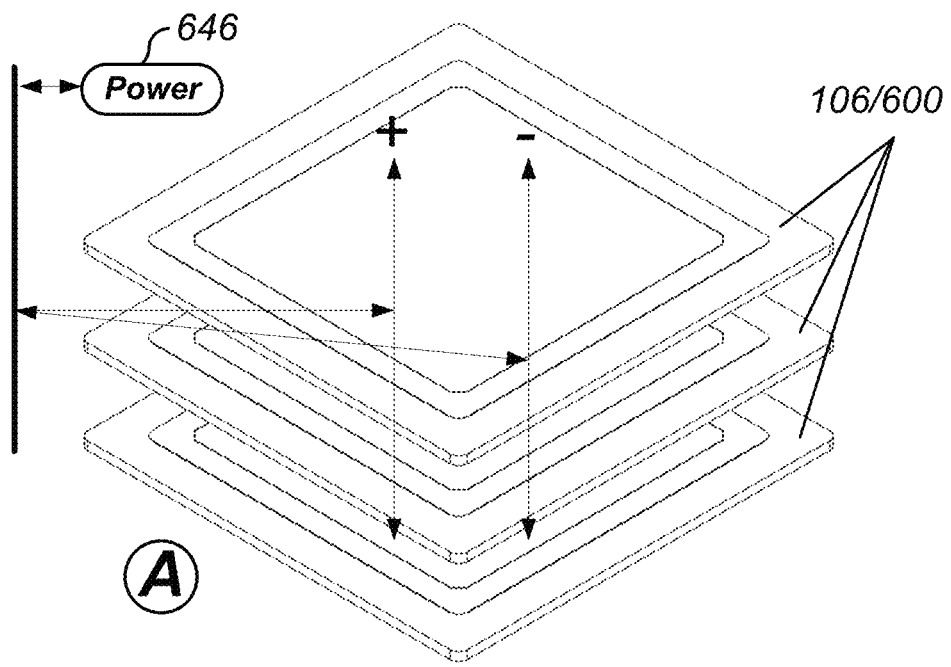
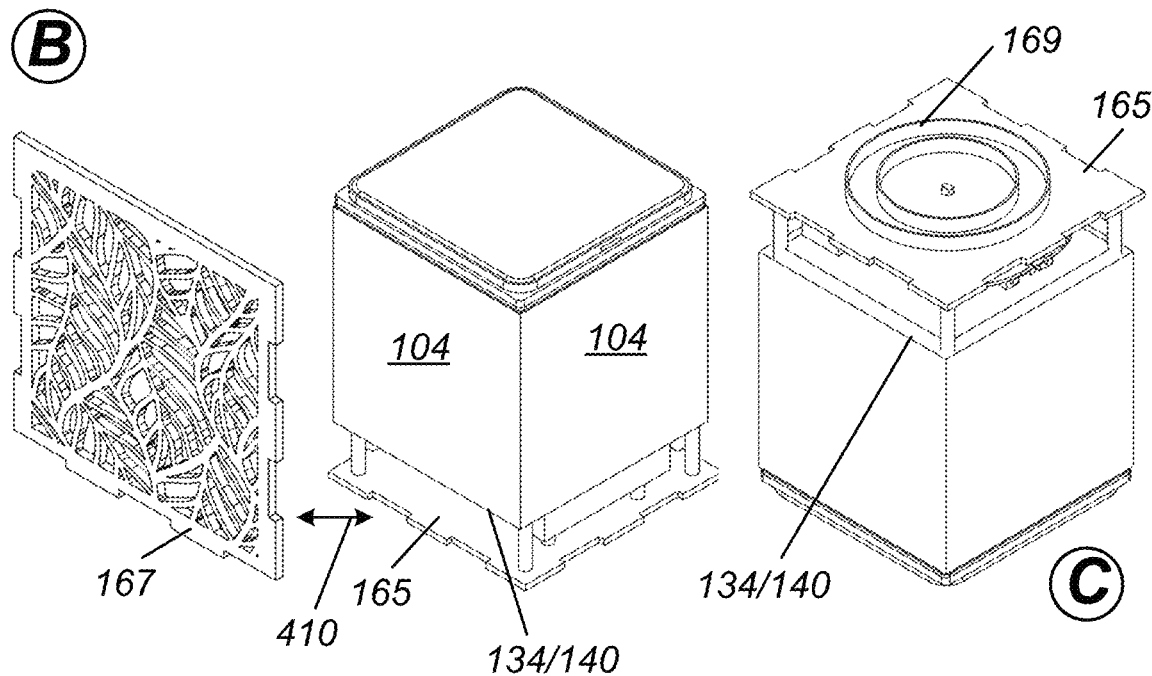
Fig. 15C

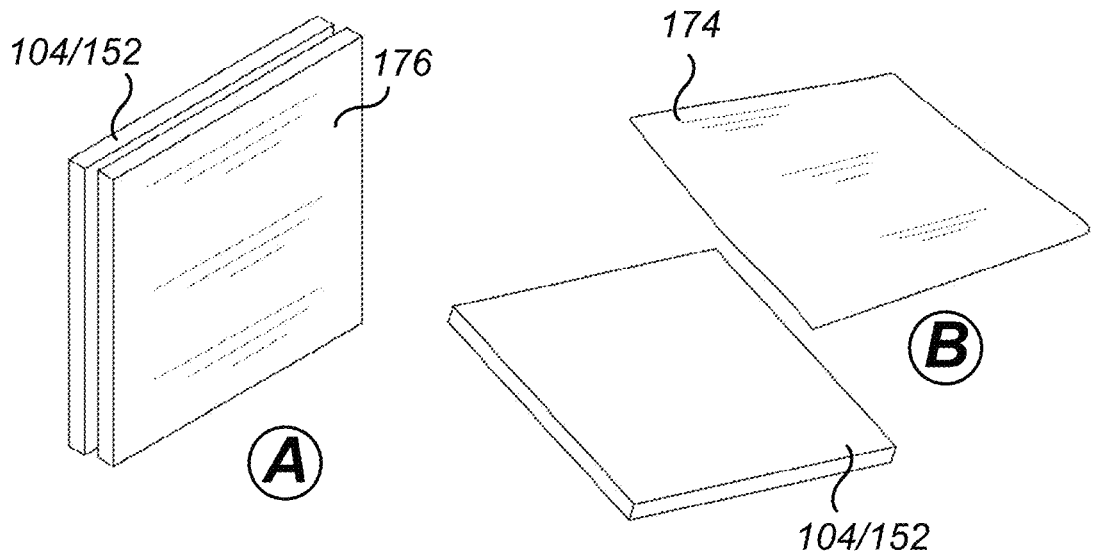
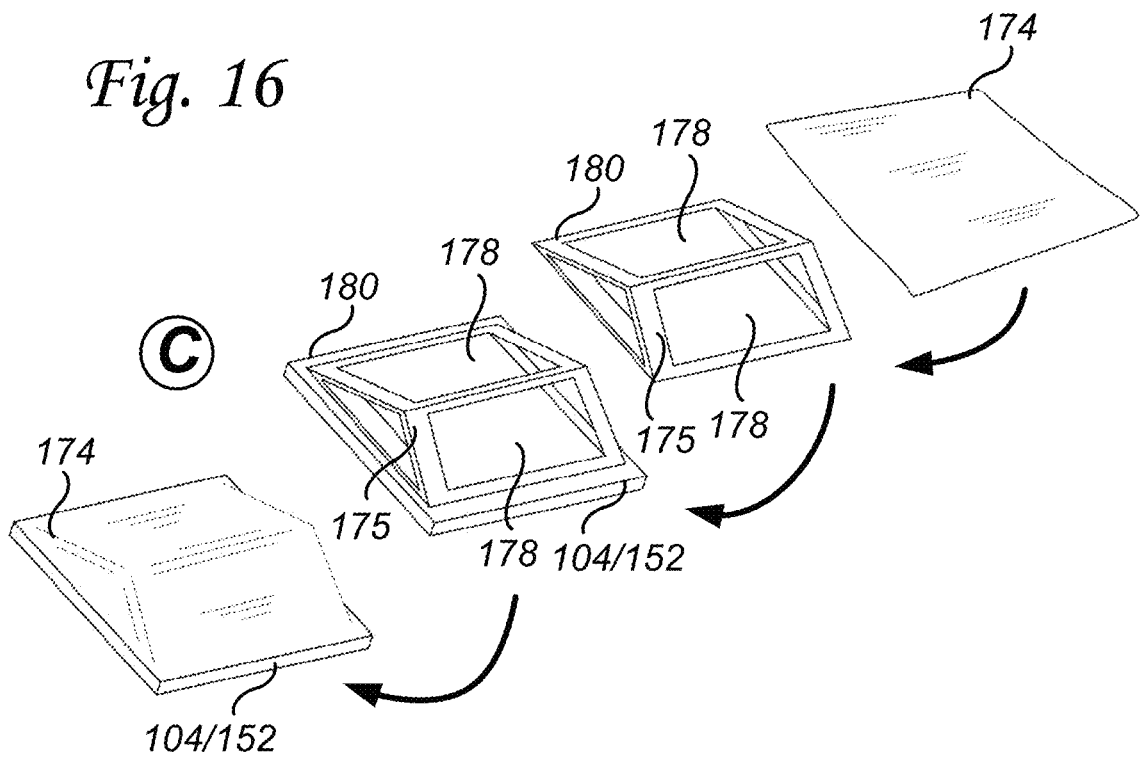
Fig. 16

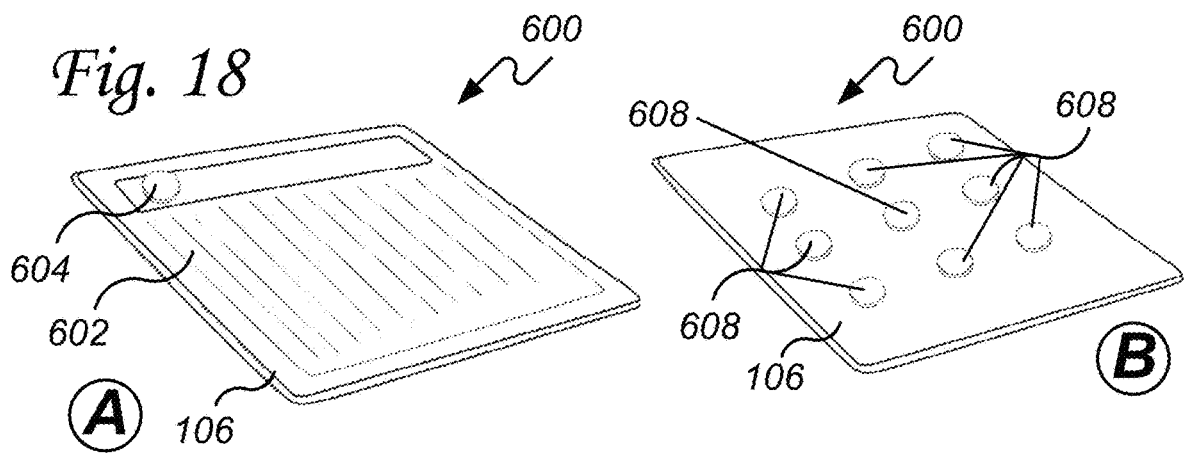
Fig. 18
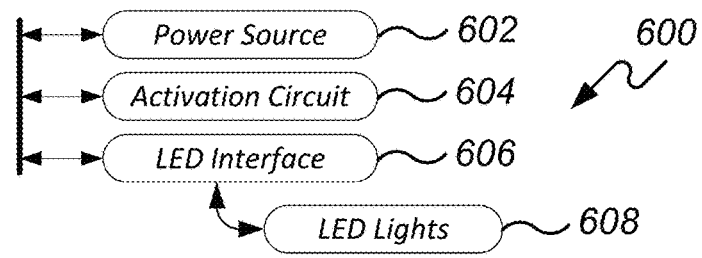
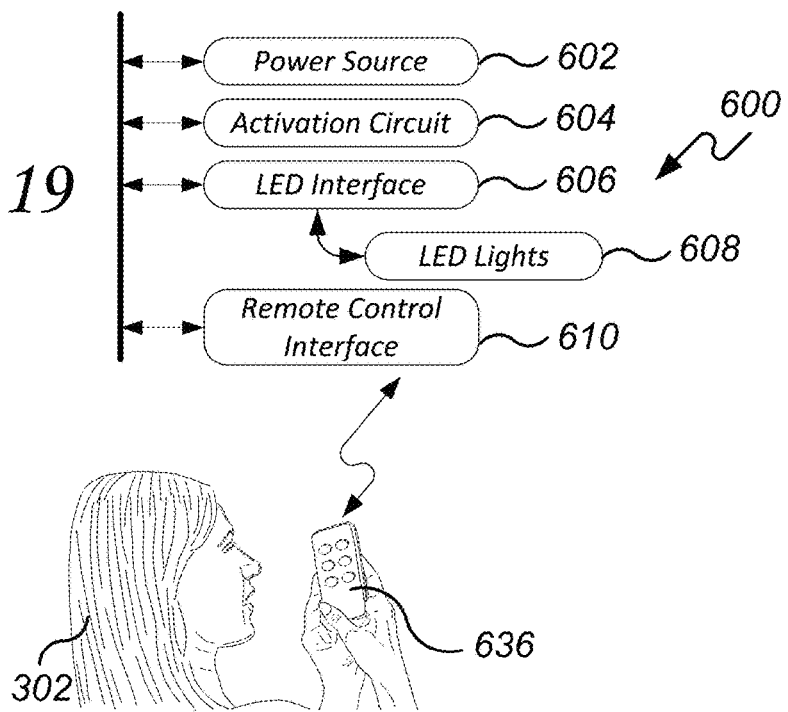
Fig. 19

US 12,038,160 B2

AMBIANCE LIGHTING SYSTEM AND METHOD

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that is a continuation in part of a U.S. non-provisional application Ser. No. 17/549,973, inventor Teresa Marie Guastella, entitled "AMBIANCE LIGHTING SYSTEM AND METHOD", filed Dec. 14, 2021.

TECHNICAL FIELD OF THE INVENTION

This invention relates to an ambiance lighting system, that uses more than one translucent panel. The translucent panels are aligned, absent occlusions along the surface, and interconnected or inserted into a luminary wrap. A light control panel comprises one or more light-emitting diodes (LED), and a power source. The light control panel is orientated to illuminate and project light through the translucent panel creating an ambiance lighting effect.

BACKGROUND OF THE INVENTION

Before our invention adding accent lighting to event spaces and other places was difficult. Often the event is temporary and the environment is last-minute changeable and as such running cables can be impractical for such lighting needs. Also, lots of wires replacement batteries, and using candles are costly and dangerous. They are also unsightly and the presence of wired lighting in public places and event spaces can raise issues of adhering to electrical codes, union labor use requirements for lighting setup and teardown activities, and other safety and compliance issues.

Another shortcoming is that often when the event space is set up the lighting needs to be adjusted based on the event type or style or the environment such as indoor versus outdoor to create the desired lighting effect. Lighting attributes such as color, color temperature, warmth, brightness, and other attributes are typically not available to change when using standard lighting and as such, it can be difficult to adjust the lighting to create the desired lighting ambiance.

Another shortcoming is that it can be difficult to integrate lighting that requires being wired into table centerpieces, artwork, having to re-print customization for events, branding, personalization for custom home décor items, and other places. Running wires can be a complicated mess and detract from an otherwise beautiful accent piece along with the safety hazard of tripping.

The present invention addresses these and other shortcomings by providing a way to provide ambiance lighting in event places, outdoor spaces, entertaining spaces, home décor items, and in other places. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of an ambiance lighting system comprising more than one translucent panel that is aligned, absent occlusions along the surface, and interconnected to form a panel perimeter having a top edge, and an interior region. A light control panel comprises one or more of a light-emitting diode (LED) and a power source. A lens adapter has more than one lens aperture, a panel inlay, and a frame adapter. The lens adapter is sized to extend across the top edge and contoured along the outer edge of the translucent panel to match the panel perimeter. The light control panel, in a removable manner, fits snugly into the panel inlay, and the LED is positioned inside the lens aperture. The lens adapter positions the light control panel across the top of the interior region. A frame has a frame opening. The frame adapter fits snugly into the frame opening. The outer perimeter of the frame is sized and contoured to fit into the interior region along the interior surface of the translucent panel and along the panel perimeter in a manner that abates the motion of the lens adapter and the light control panel. The light control panel is orientated within the panel inlay so that light from the LED passes through the lens aperture and the frame opening illuminating the interior region and projecting light through the translucent panel to create an ambiance lighting effect.

Additional shortcomings of the prior art are overcome and additional advantages are provided through the provision of an ambiance lighting system comprising more than one translucent panel, a light control panel comprising one or more light-emitting diodes (LED), and a power source. A luminary wrap forms a top panel, and a panel perimeter, the panel perimeter having a top edge, and an interior region. The luminary wrap comprises at least two layers of flexible clear material seamed together with more than one edge divider forming at least one pocket on the top panel and more than one pocket on the panel perimeter. Each of the pockets has a pocket front surface and a pocket back surface. The pocket back surface faces the interior region. At least some of the pockets have an open pocket edge. A portion of the top panel is connected to the top edge by at least one of the edge dividers. A press-to-seal fastener is integrated along the open pocket edge. The open pocket edge is positioned along the pocket back surface. The translucent panels slide into the open pocket edge of the pocket along the panel perimeter and the light control panel slides into the open pocket edge of the pocket on the top panel. The open pocket edge is sealed closed by way of the press-to-seal fastener. Viewable from the pocket front surface, the translucent panel hides the open pocket edge. The top panel comprises a top panel flap. And, at least one panel fastener is integrated into the top panel flap and the panel perimeter. The ambiance lighting system is collapsible until the top panel is extended across the top edge and the panel fasteners on the top panel flap are aligned and interconnected with the panel fasteners on the panel perimeter transforming the ambiance lighting system into a rigid structure. The LEDs are orientated to illuminate the interior region, projecting light through the translucent panel to create an ambiance lighting effect.

Additional shortcomings of the prior art are overcome and additional advantages are provided through the provision of a method of using an ambiance lighting system comprising the steps of positioning, within a geographic area, more than one ambiance lighting system. The ambiance lighting system comprises more than one translucent panel that is aligned, absent occlusions along the surface, and interconnected to form a panel perimeter having a top edge, and an interior region. A light control panel comprises one or more light-emitting diode (LED), a power source, a global position system (GPS) configured to determine the location of the ambiance lighting system, and a communication interface configured to data communicate with a remote data processing resource, a computing device, or wirelessly with a plurality of the ambiance lighting system. A lens adapter has more than one lens aperture, a panel inlay, and a frame adapter, the lens adapter is sized to extend across the top edge and contoured along the outer edge of the translucent panel to match the panel perimeter. The light control panel, in a removable manner, fits snugly into the panel inlay, and the LED is positioned inside the lens aperture. The lens adapter positions the light control panel across the top of the interior region. A frame has a frame opening. The frame adapter fits snugly into the frame opening. The outer perimeter of the frame is sized and contoured to fit into the interior region along the interior surface of the translucent panel along the panel perimeter in a manner that abates the motion of the lens adapter and the light control panel. The light control panel is orientated within the panel inlay so that light from the LED passes through the lens aperture and the frame opening illuminating the interior region and projecting light through the translucent panel and creating an ambiance lighting effect.

The method continues by communicating, by way of the communication interface, and obtained from the GPS, a lighting GPS location data of the physical location of the ambiance lighting system to the remote data processing resource. And, establishing at least one geofenced boundary, within the geographic area, based on a plurality of the lighting GPS location data from a plurality of the ambiance lighting system.

The method concludes by receiving at the computing device a notification message from the remote data processing resource, content of the notification message is selected based, in part, on the GPS location of the computing device being located inside or outside the geofenced boundary.

Additional shortcomings of the prior art are overcome and additional advantages are provided through the provision of a method of using an ambiance lighting system comprising the steps of positioning, within a geographic area, more than one ambiance lighting system. The ambiance lighting system comprises more than one translucent panel. A light control panel comprises one or more of a light-emitting diode (LED), a power source, a global position system (GPS) configured to determine the location of the ambiance lighting system, and a communication interface configured to data communicate with a remote data processing resource, a computing device, or wirelessly with a plurality of the ambiance lighting system. A luminary wrap forms a top panel and a panel perimeter. The panel perimeter has a top edge and an interior region. The luminary wrap comprises at least two layers of flexible clear material seamed together with more than one edge divider forming at least one pocket on the top panel and more than one pocket on the panel perimeter. Each of the pockets has a pocket front surface and a pocket back surface. The pocket back surface faces the interior region. At least some of the pocket has an open pocket edge. A portion of the top panel is connected to the top edge by at least one of the edge dividers. A press-to-seal fastener is integrated along the open pocket edge. The open pocket edge is positioned along the pocket back surface. The translucent panel slides into the open pocket edge of the pocket along the panel perimeter and the light control panel slides into the open pocket edge of the pocket on the top panel. The open pocket edge is sealed closed by way of the press-to-seal fastener. Viewable from the pocket front surface, the translucent panel hides the open pocket edge. The top panel comprises a top panel flap, and more than one panel fastener is integrated into the top panel flap and the panel perimeter. The ambiance lighting system is collapsible until the top panel is extended across the top edge and the panel fasteners on the top panel flap are aligned and interconnect with the panel fasteners on the panel perimeter transforming the ambiance lighting system into a rigid structure. The LEDs are orientated to illuminate the interior region, projecting light through the translucent panel and creating an ambiance lighting effect.

The method continues by, communicating, by way of the communication interface, and obtained from the GPS, a lighting GPS location data of the physical location of the ambiance lighting system to the remote data processing resource. And, establishing at least one geofenced boundary, within the geographic area, based on a plurality of the lighting GPS location data from a plurality of the ambiance lighting system.

The method concludes by, receiving at the computing device a notification message from the remote data processing resource, content of the notification message is selected based, in part, on the GPS location of the computing device being located inside or outside the geofenced boundary.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of a sleeve and light control panel;

FIG. 3 illustrates one example of a consumer carrying an ambiance lighting system;

FIGS. 7A-7B illustrate examples of a plurality of ambiance lighting systems being interconnected forming ambiance lighting clusters effects;

FIGS. 12-14 illustrates examples of ambiance lighting systems being inserted into secondary lighting fixtures. In exemplary embodiments plexiglass protection, or similar material, can be attached to the secondary lighting fixture where solar panels are inserted into a sleeve;

FIGS. 15A-E illustrates examples of applications of an ambiance lighting system;

FIG. 16 illustrates examples of mirrored translucent panels;

FIGS. 18-20A illustrates examples of a light control panel;

The detailed description explains the preferred embodiments of the invention, together with advantages and features, by way of example with reference to the drawings.

DETAILED DESCRIPTION OF THE INVENTION

In the present invention "ambiance" is intended to mean the character and atmosphere of a place such as a room, event space, patio area, pool area, outdoor space, reception room, and/or other places. Furthermore, "ambiance lighting" is intended to mean lighting that contributes to creating the character and atmosphere of the place. In this regard, the ambiance lighting system in the present invention is a carefully engineered lighting system and method of use that easily integrates into environments such as table centerpieces, pathway lighting, ornamental displays, patio spaces, event spaces, art décor features, charging station applications, furniture under-lighting on picnic tables, benches, cabinets, and other furniture under-lighting applications, secondary lighting fixtures such as lamps, chandeliers, and other secondary lighting fixtures. And numerous other environments and applications where the ambiance lighting effect enhances the character and atmosphere of a place.

An advantage, in the present invention, is that the ambiance lighting system controls the light brightness, color, color temperature, and other ambiance attributes associated with the light quality, warmth, color palette, luminance, and other ambiance lighting attributes.

Figure 1A:
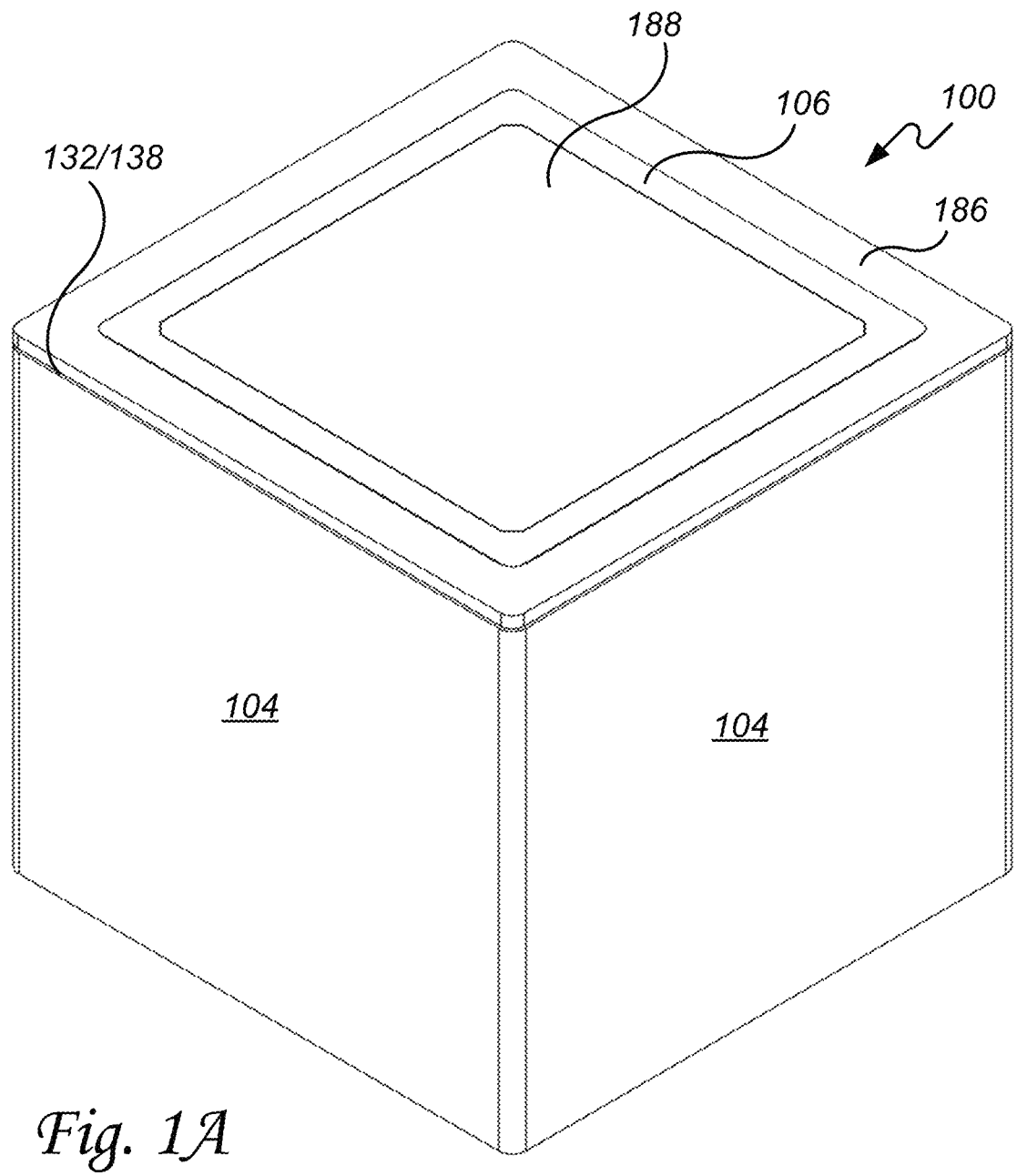
FIGS. 1A-1R illustrates one example of an ambiance lighting system.
Figure 1B:
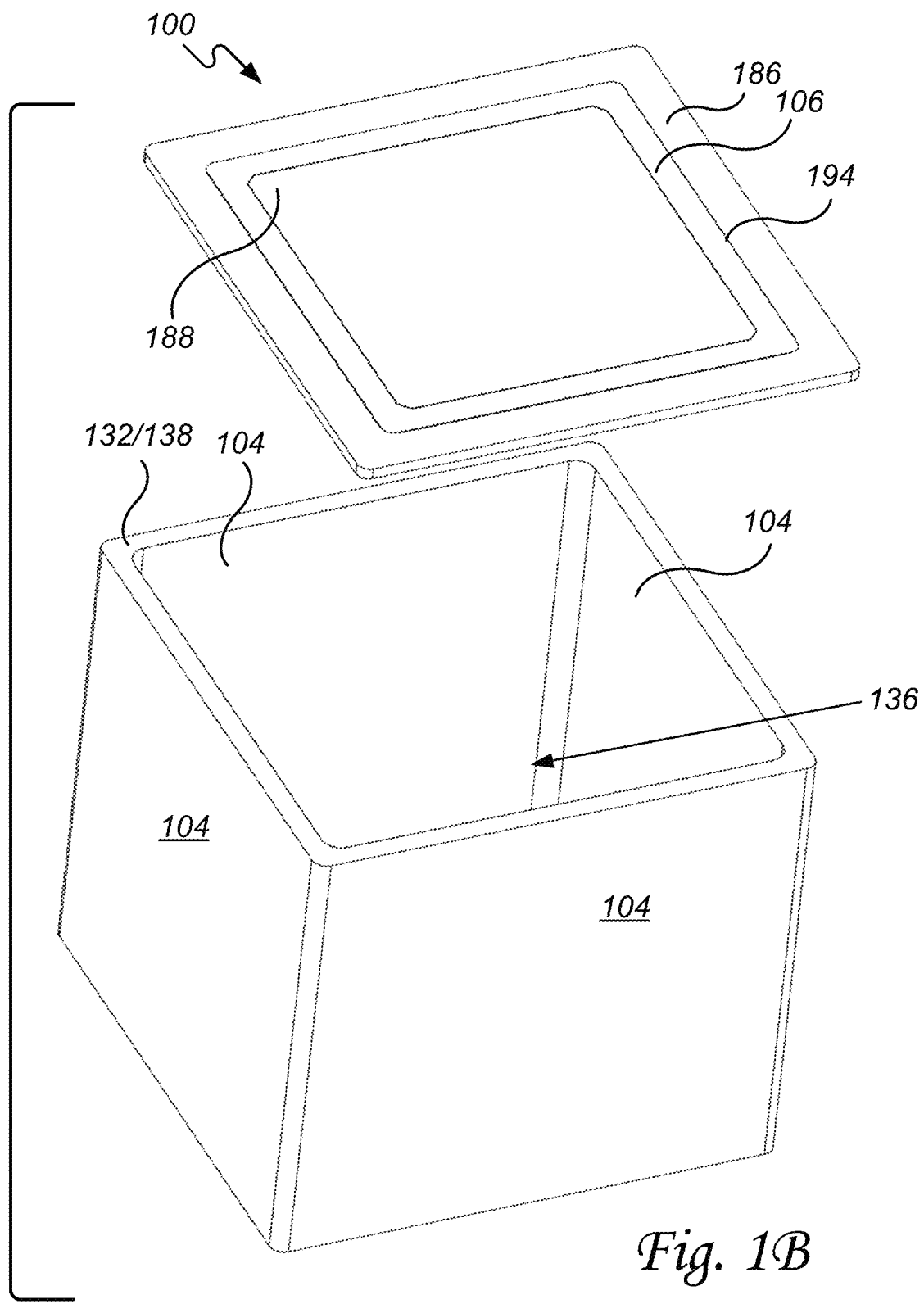
Figure 1C:
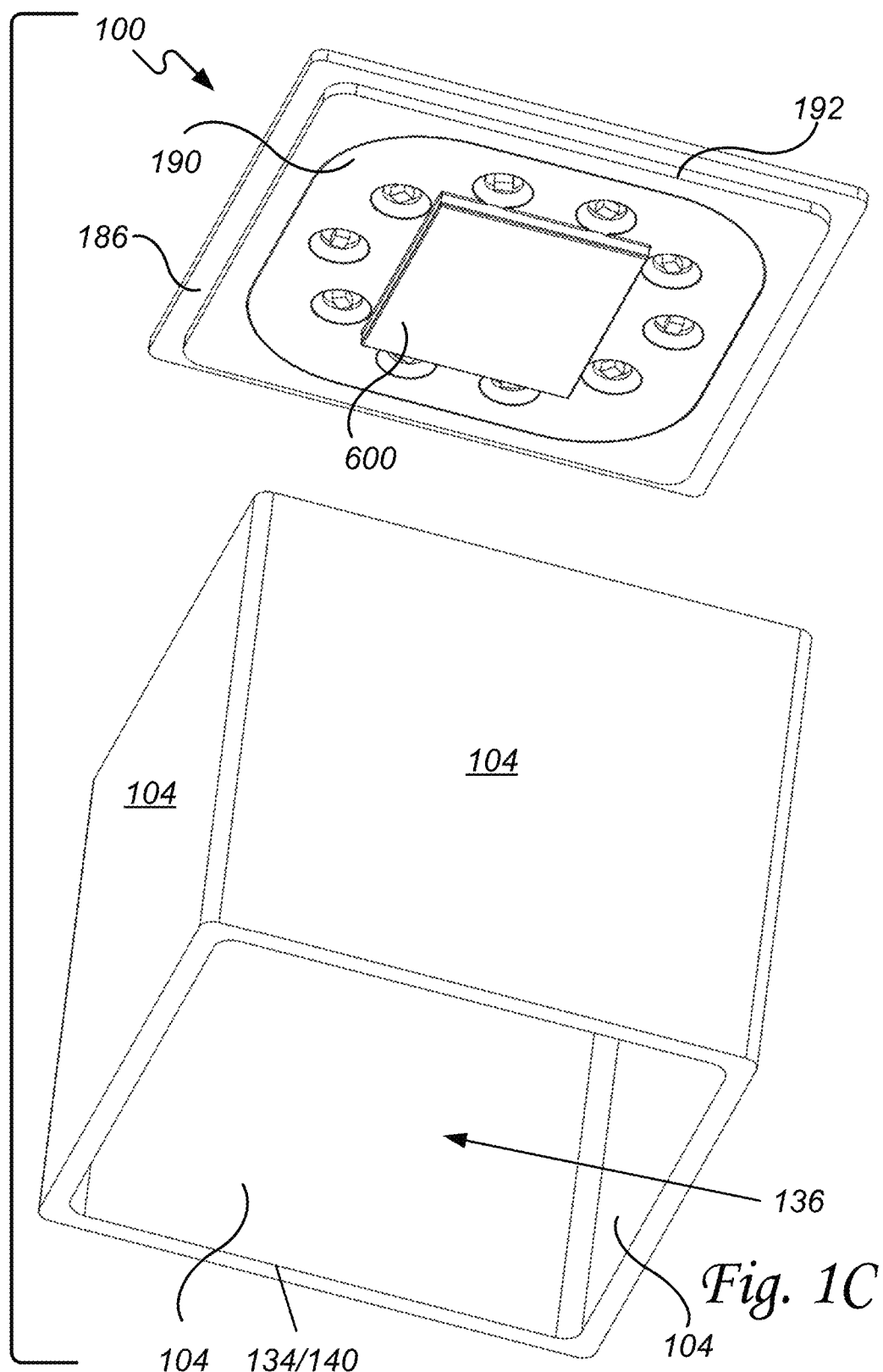
Figure 1D:
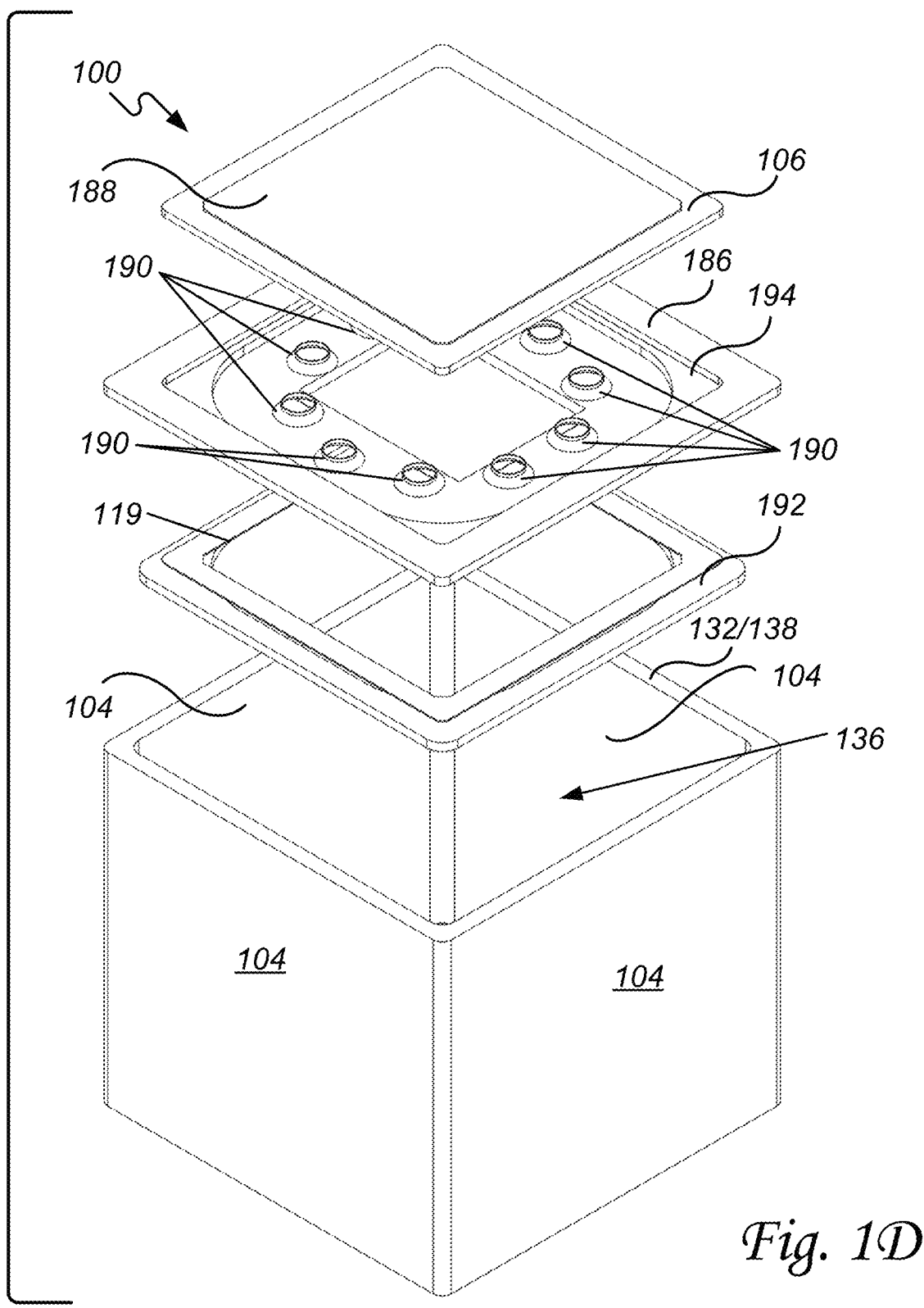
Figure 1E:
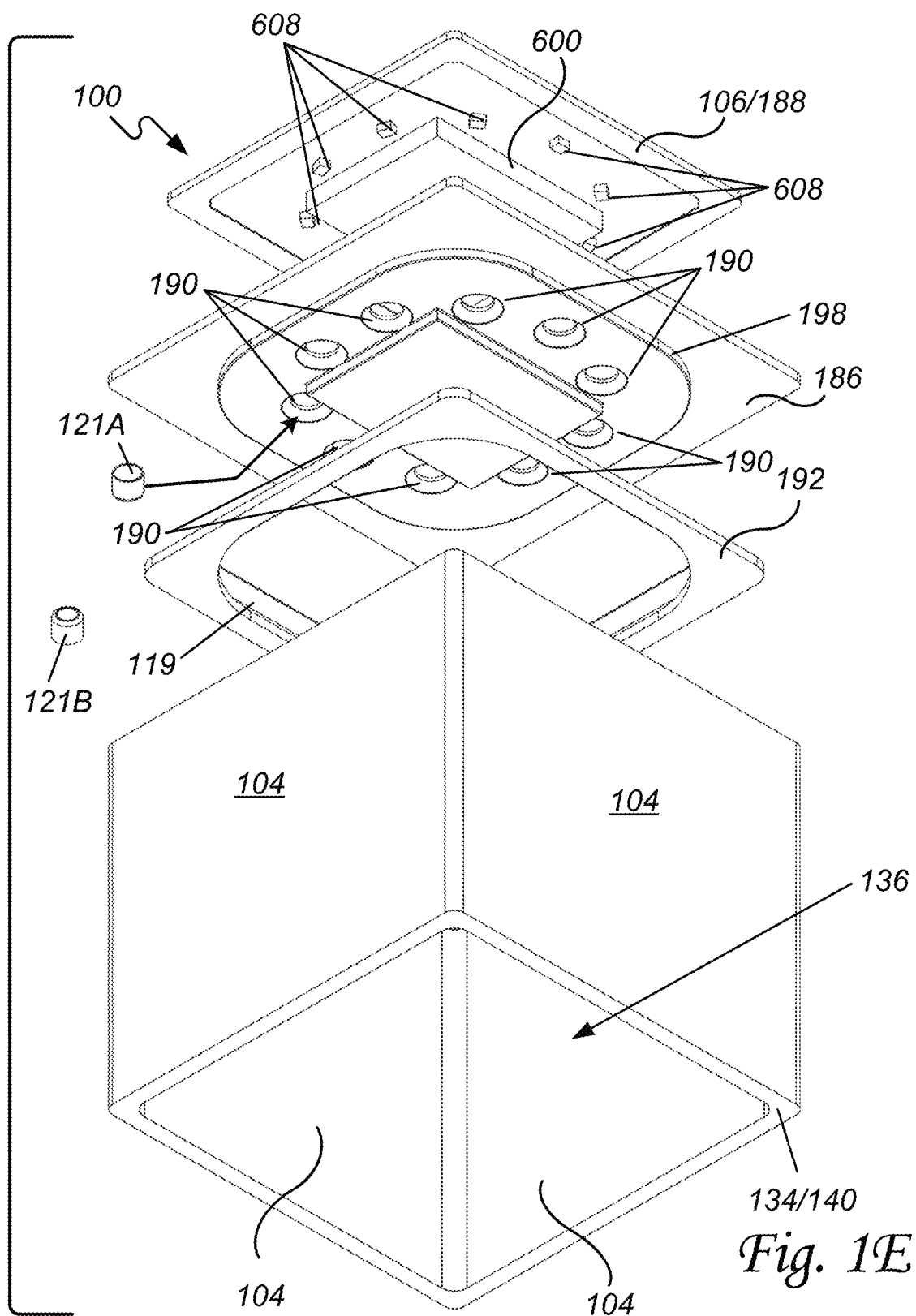
Figure 1G:
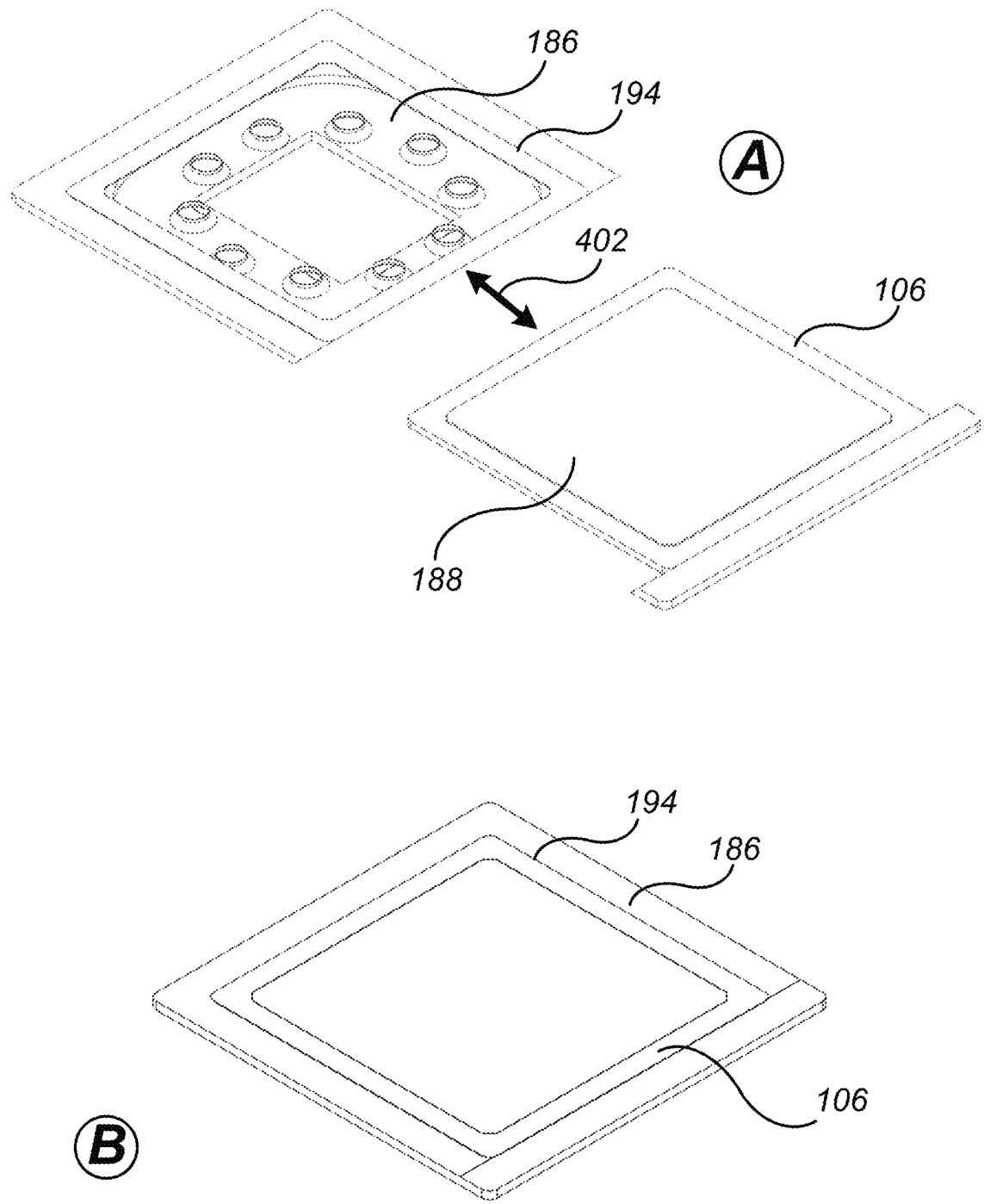
Figure 1H:
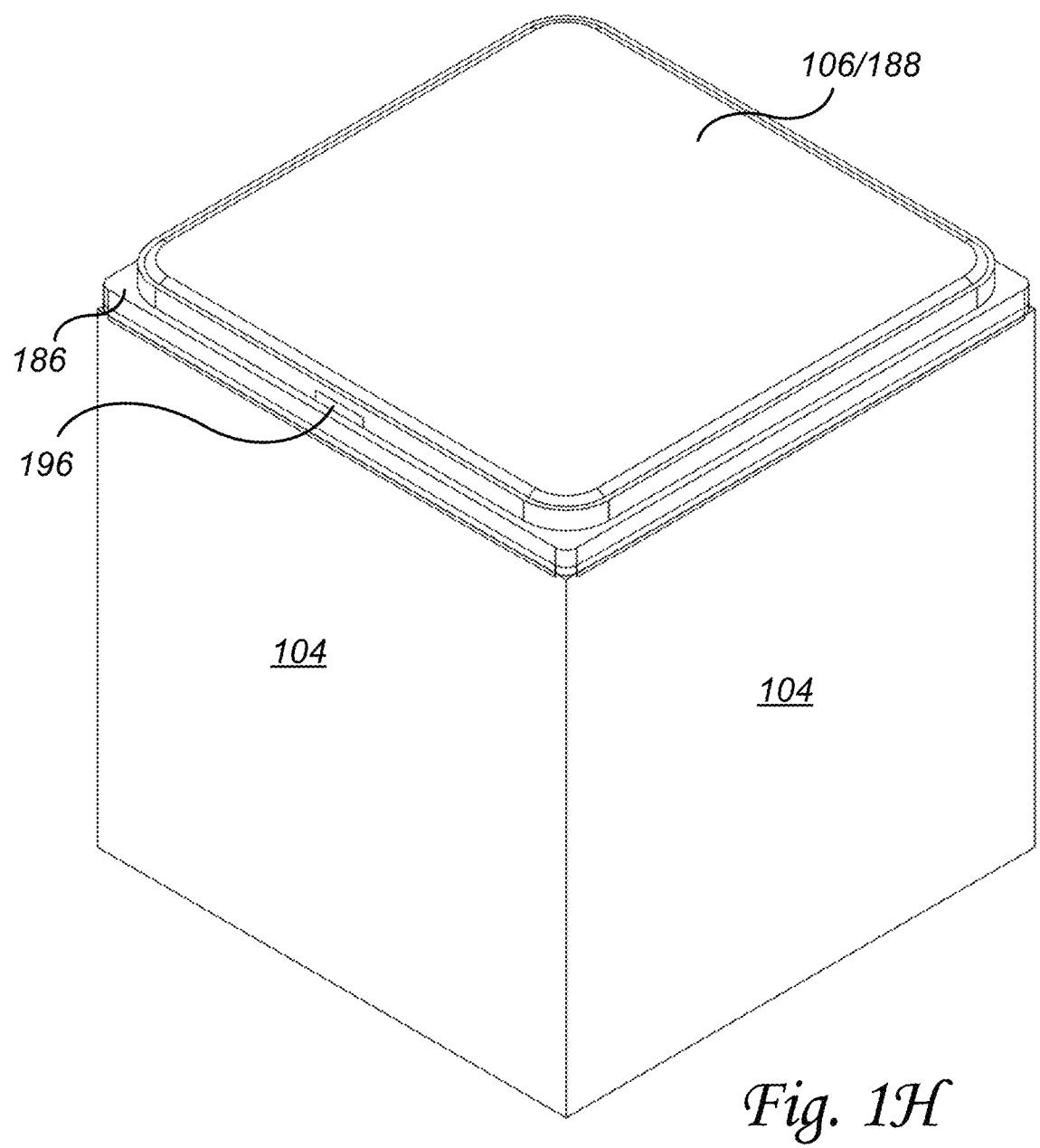
Figure 1I:
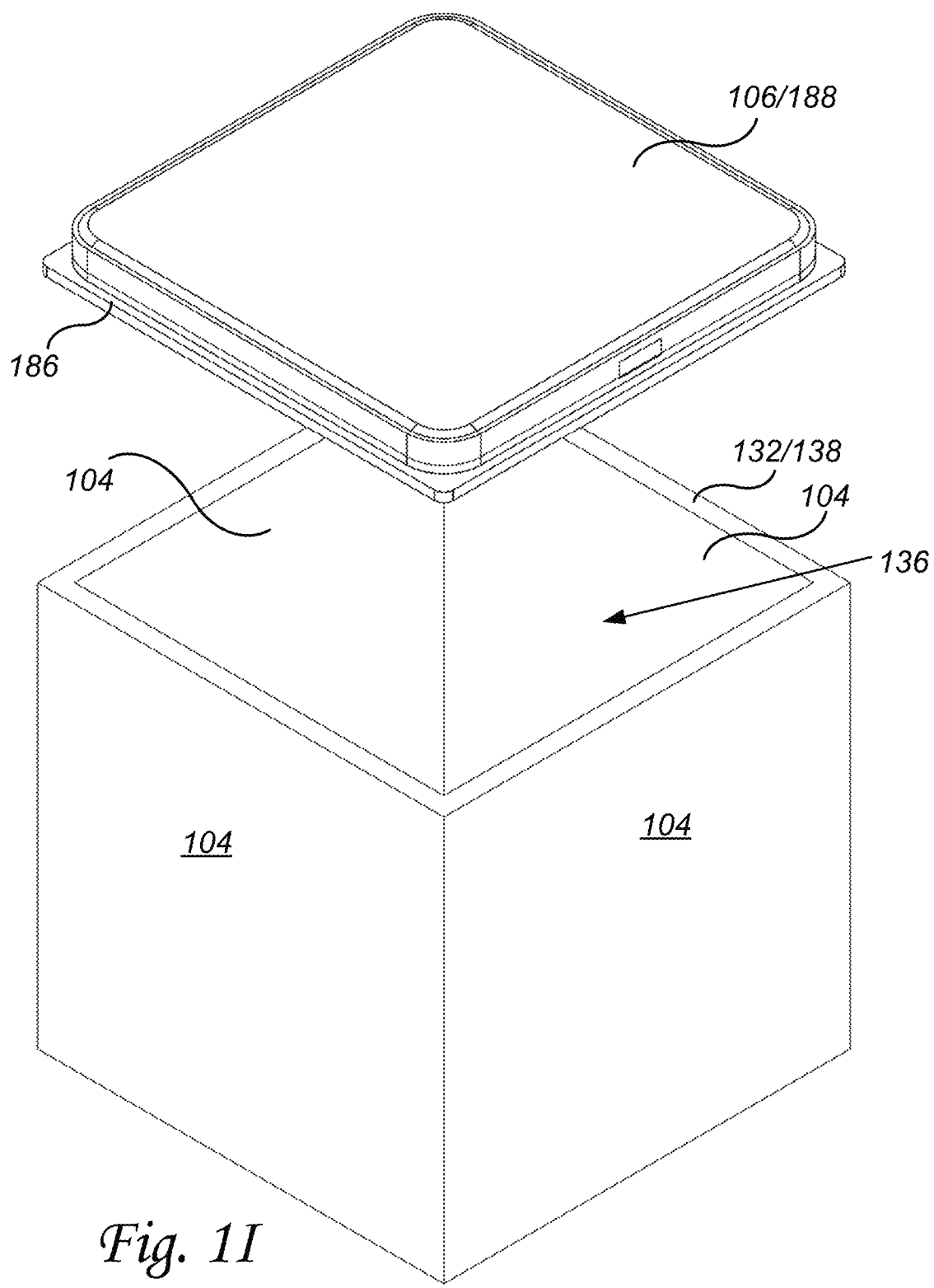
Figure 1J:
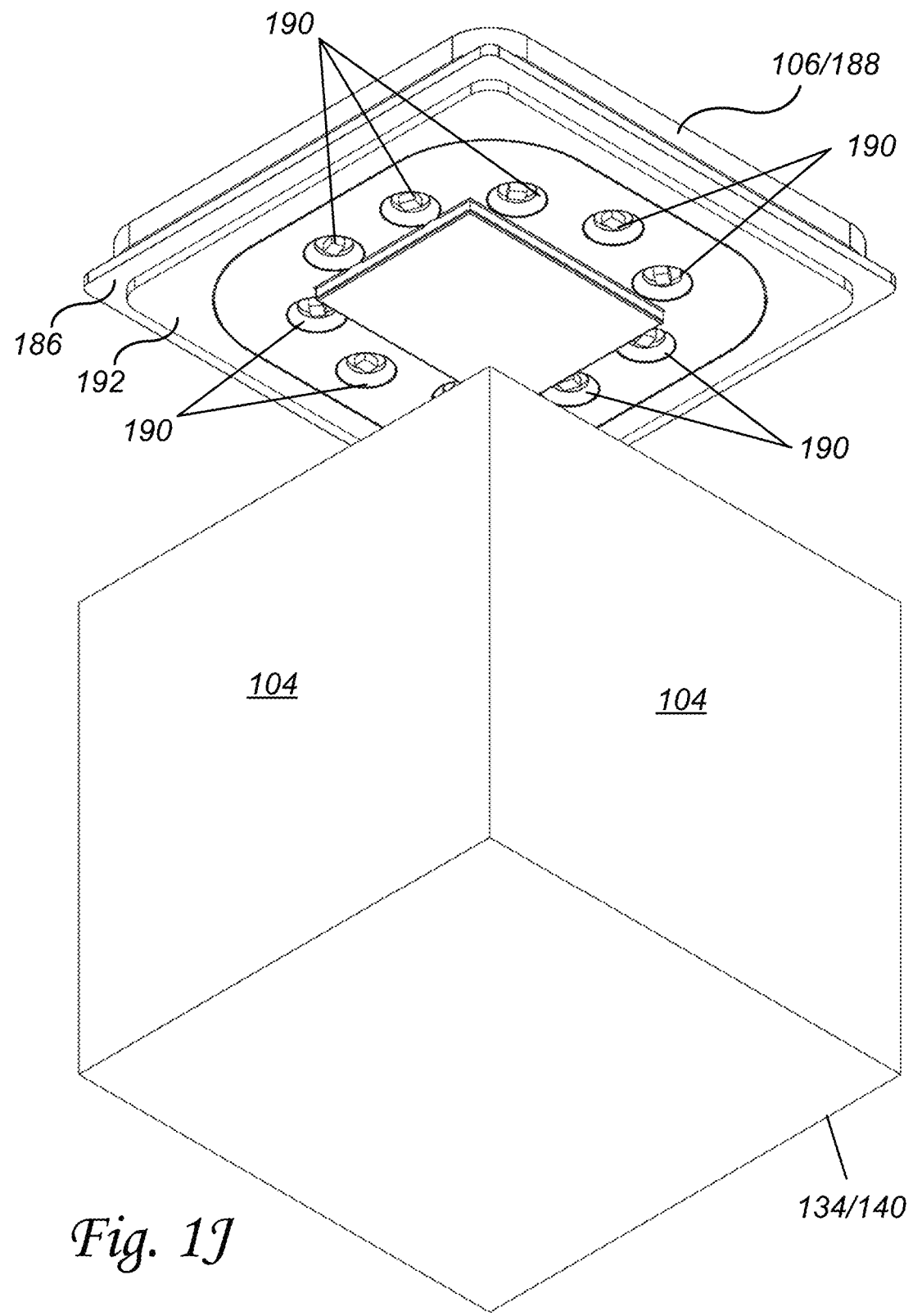
Figure 1K:
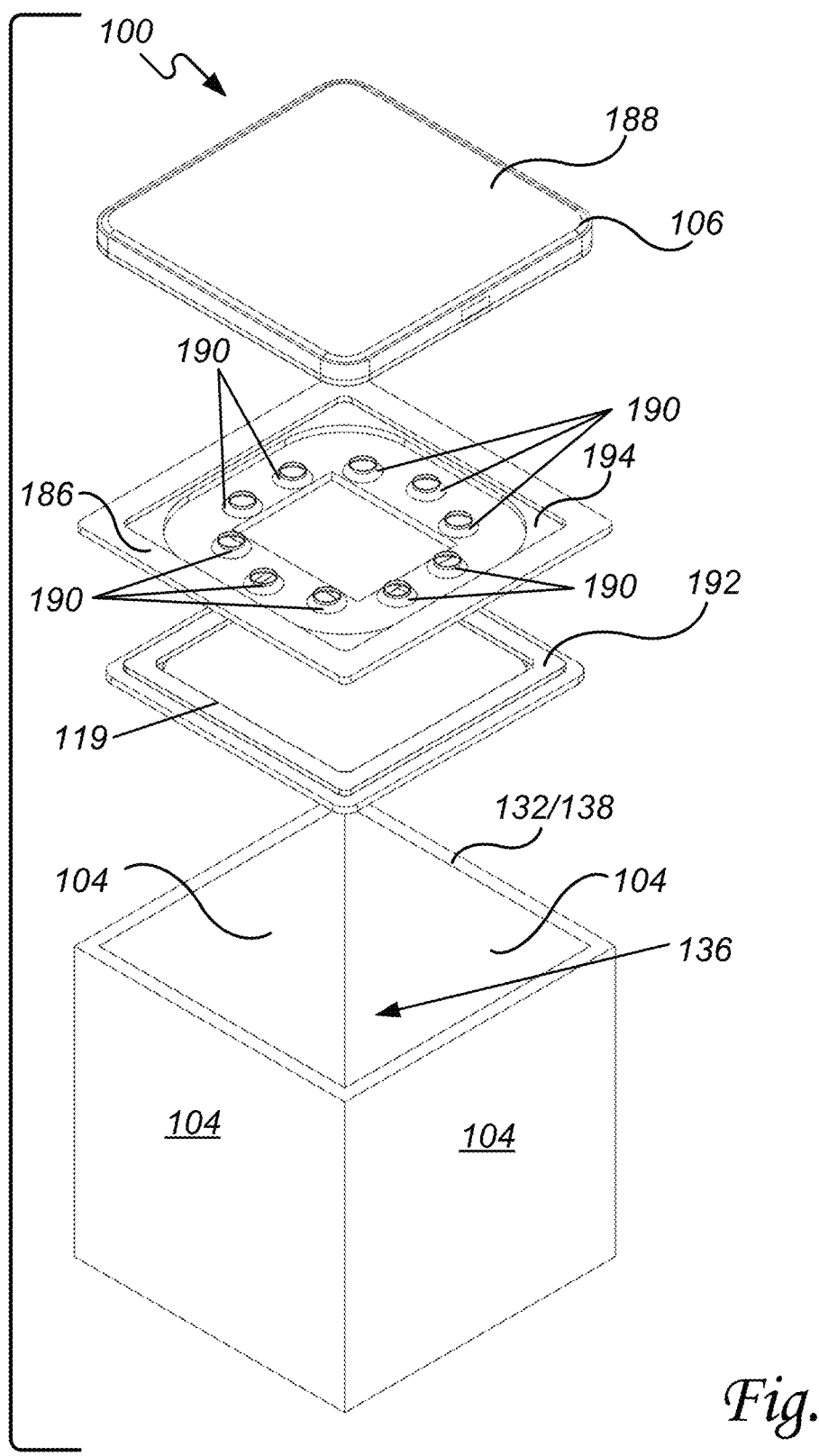
Figure 1L:
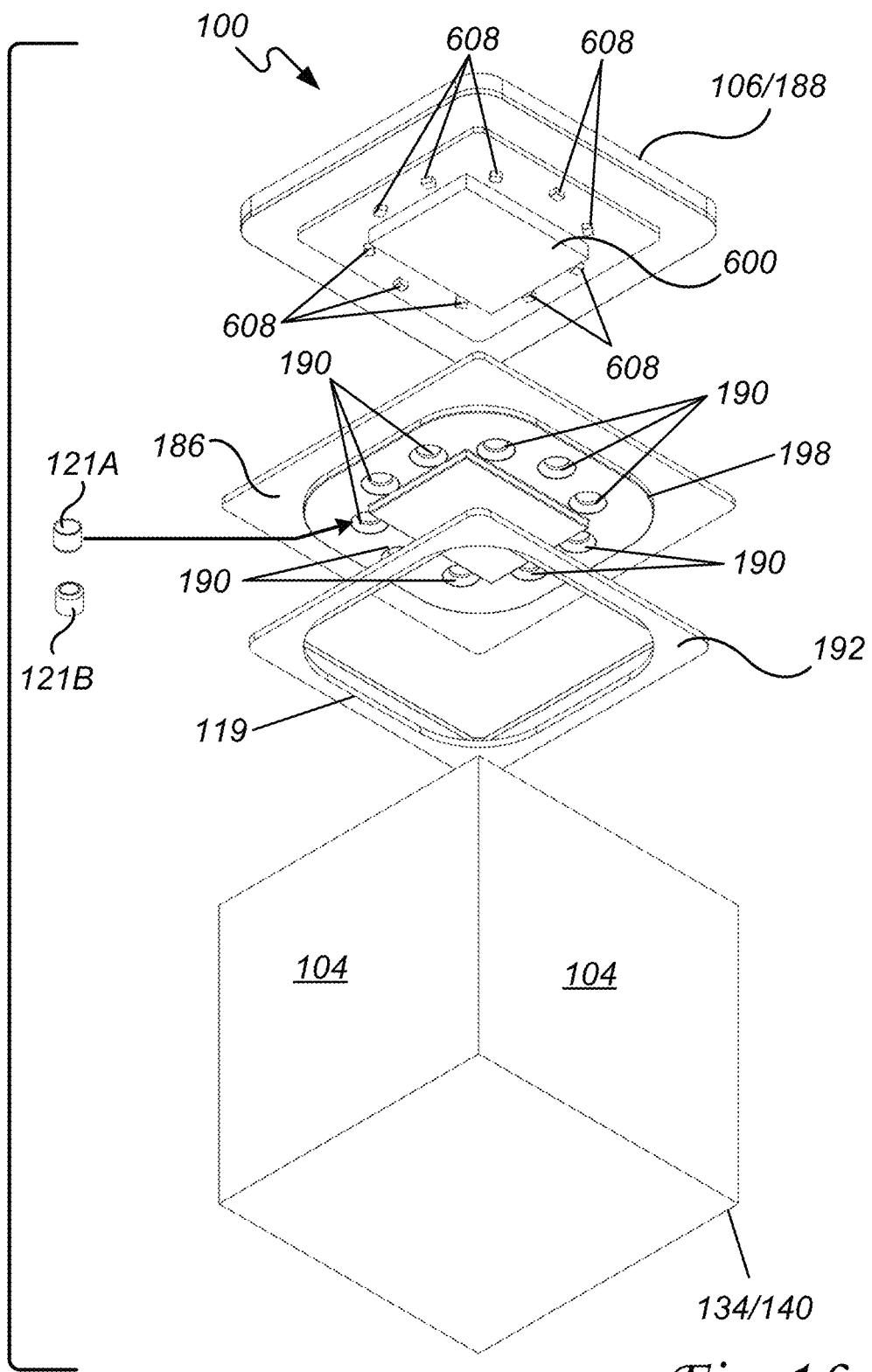
Figure 1M:
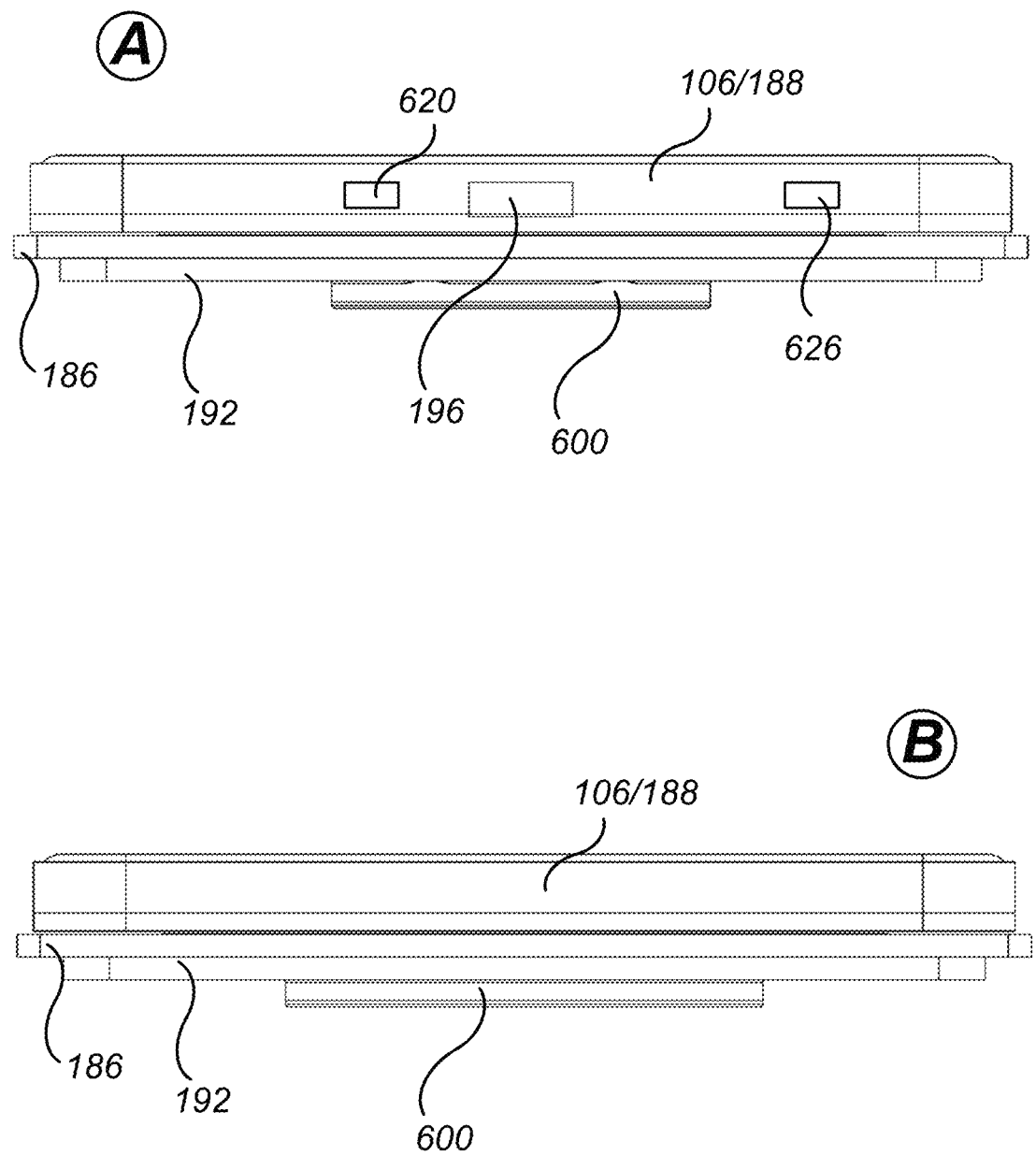
Figure 1N:
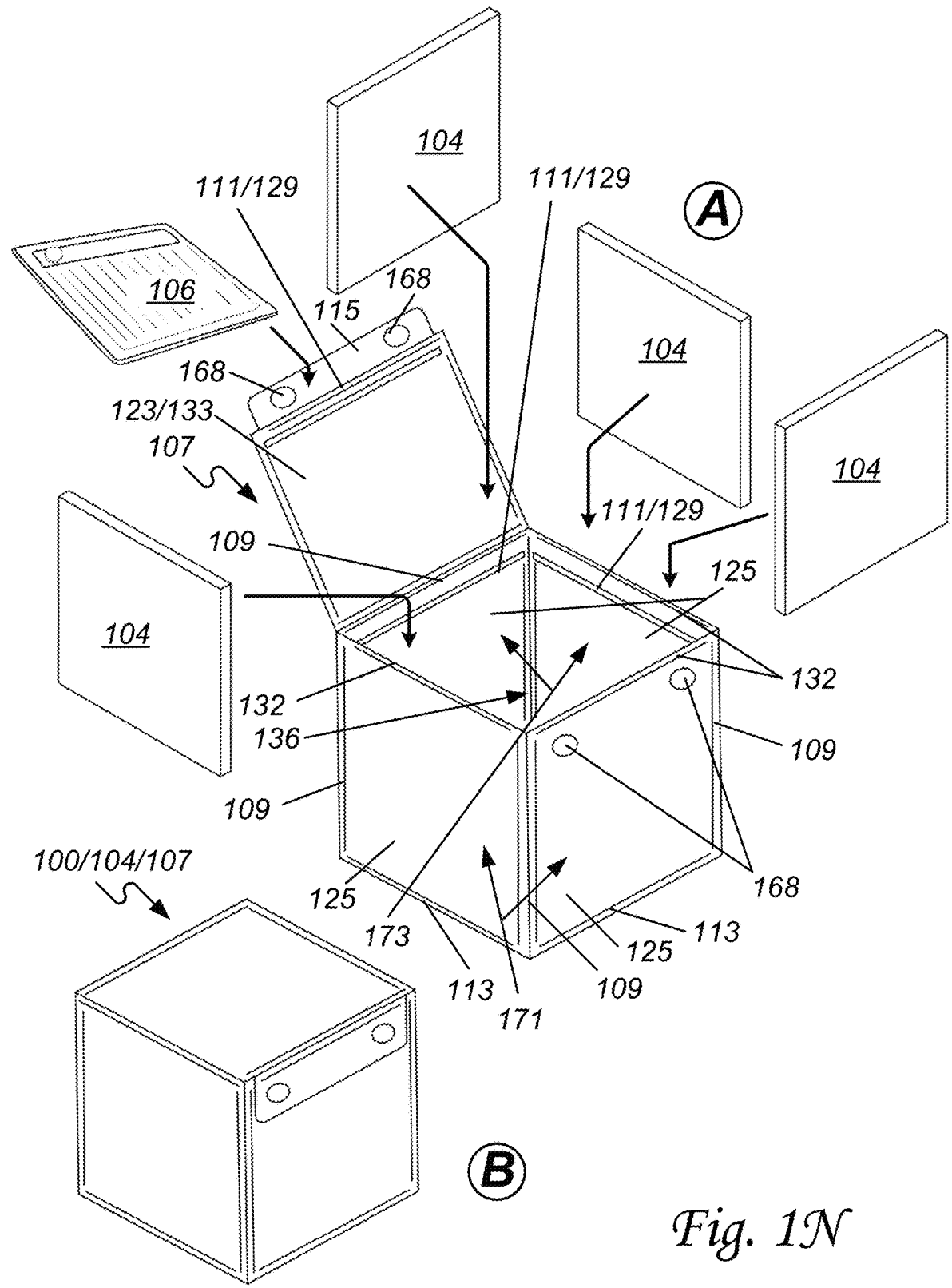
Figure 1P:
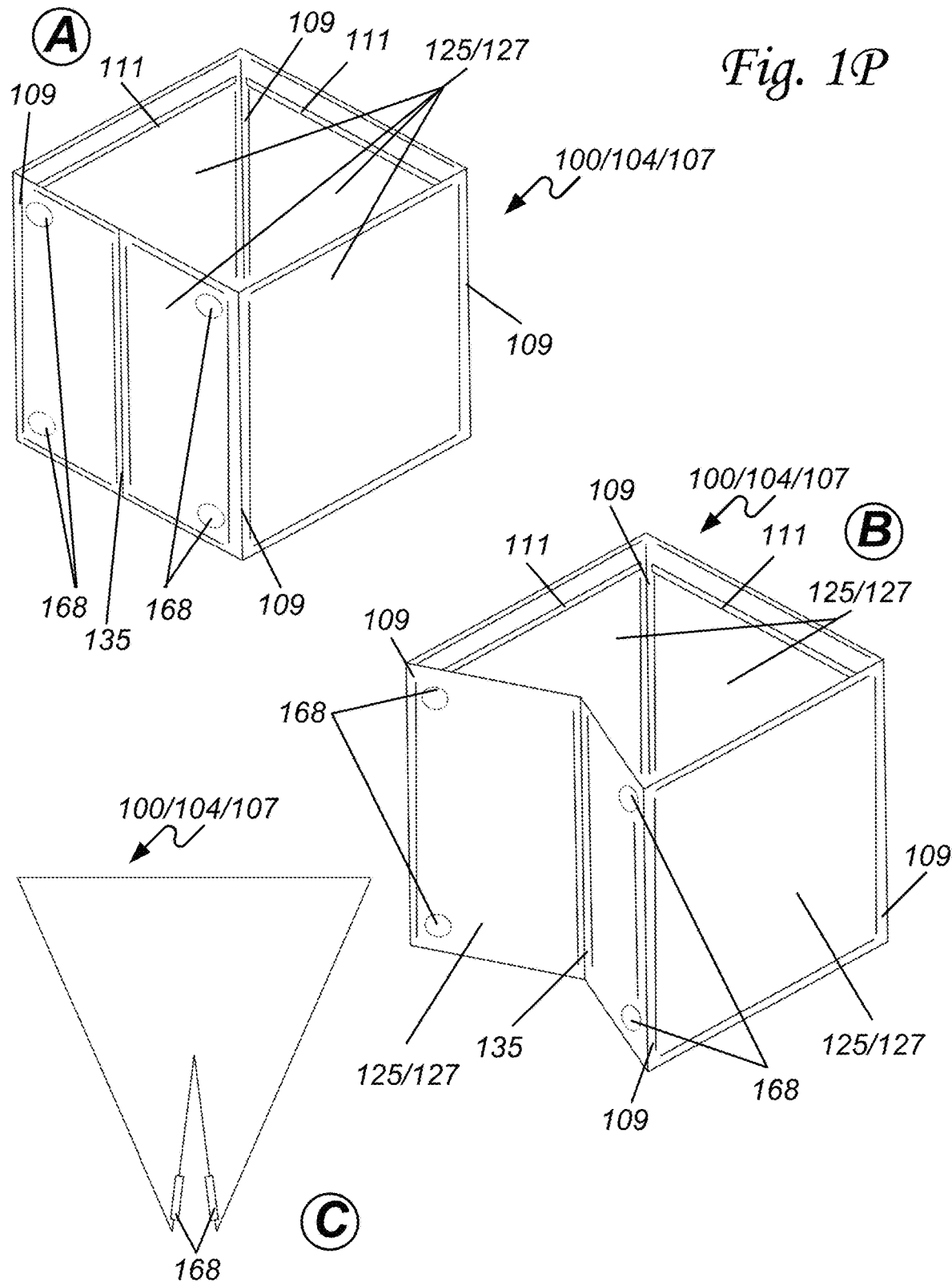
Figure 1R:
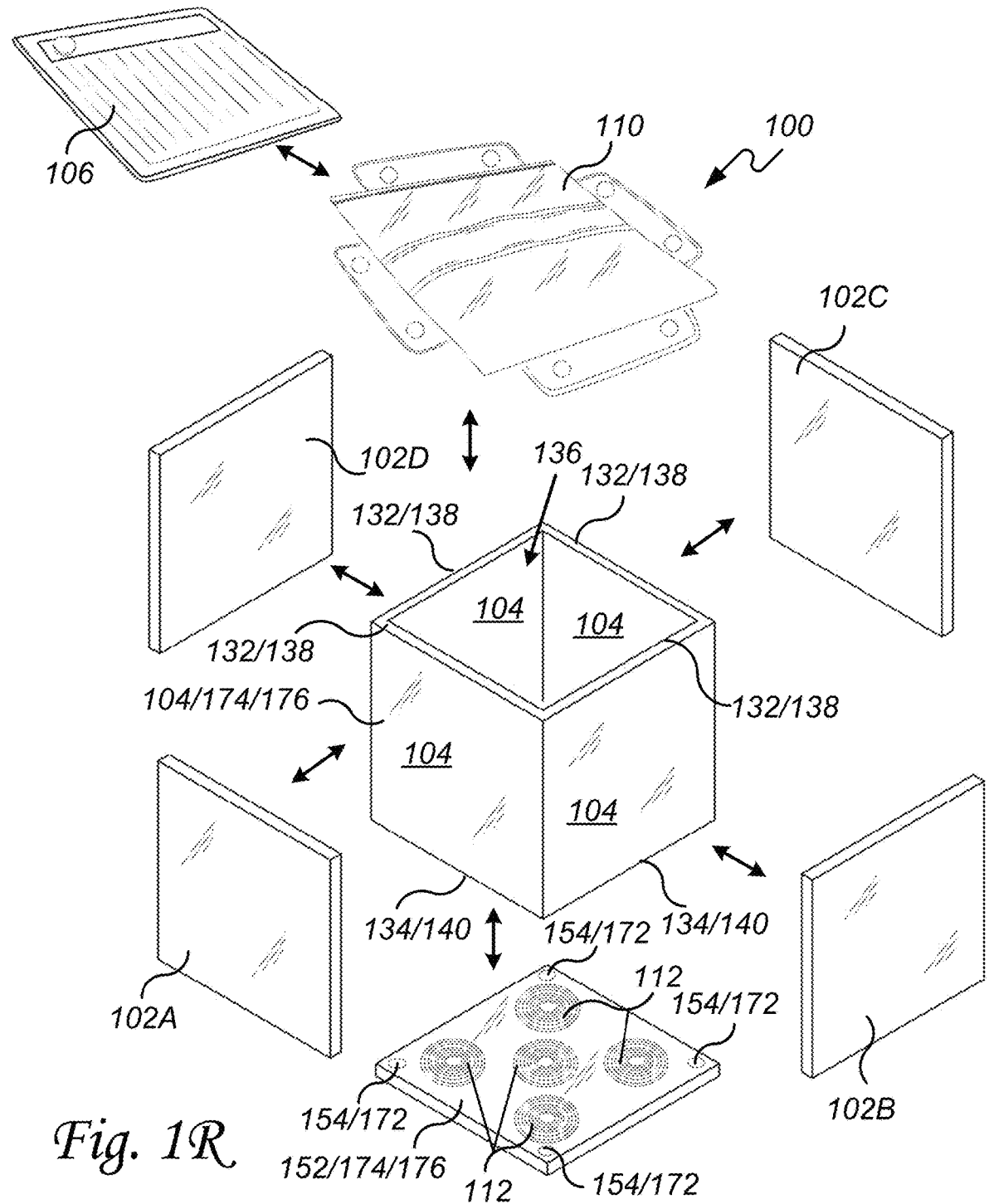

Turning now to the drawings in greater detail, it will be seen that in FIGS. 1A-1R there are illustrated exemplary embodiments of an ambiance lighting system 100.

FIGS. 1A-1G reference an exemplary embodiment, of the ambiance lighting system 100. In this regard, FIG. 1A illustrates an assembled view where a light control panel 106, a lens adapter 186, and a frame 192 are assembled together and fitted across the top edge 138 and contoured along the outer edge of the translucent panels 104 to match the perimeter 132. In operation, the lens adapter is sized to fit across the top edge 138 and the frame is sized to fit within the interior region along the inner surface of the translucent panel 104 along the perimeter 132 so that the light control panel 106, lens adapter 186 and frame 192 hold the assembly from moving, slipping, or rotating during use.

FIG. 1B illustrates a top perspective view and FIG. 1C illustrates a bottom perspective view of the assembly which comprises the light control panel 106, lens adapter 186, and frame 192 removed from the interconnected translucent panels 104. This embodiment is also shown with a solar panel 188 which is used as part of the power source 602.

FIG. 1D illustrates a top perspective view and FIG. 1E illustrates a bottom perspective view wherein each of the light control panel 106, lens adapter 186, frame 192, and interconnected translucent panel 104 are disassembled.

Also illustrated, in an exemplary embodiment, one or more of a color lens 121 can cover the LED 608 changing the color of the light broadcast from the LED 608 into the interior region 136. In this, regard, each of the color lenses 121 can be removably fastened into the lens apertures 190.

Lens cover 121A is a bottom perspective view and 121B is a top perspective view of lens cover 121.

FIG. 1F illustrates in reference 'A' a top perspective view and in reference a bottom perspective view of the assembled light control panel 106, lens adapter 186, and frame 192. In reference 'B' each of the LED 608 is illustrates positioned within one of the lens aperture 190.

In an exemplary embodiment, the ambiance lighting system comprises more than one translucent panel 104 that is aligned, absent occlusions along the surface, and interconnected to form a geometric shape that has a panel perimeter. The panel perimeter has a top edge 138 and an interior region 136. A light control panel 106 comprises one or more of a light-emitting diode (LED) 608 and a power source 602.

A lens adapter 186 has more than one lens aperture 190, a panel inlay 194, and a frame adapter 198. The lens adapter 186 is sized to extend across the top edge 138 and contoured along the outer edge of the translucent panel 104 to match the panel perimeter 138. The light control panel 106, in a removable manner, snugly fits into the panel inlay 194 and each of the LED 608 is positioned inside one of the lens aperture 190. The lens adapter 186 positions the light control panel 106 across the top of the interior region 136.

Frame 192 has a frame opening 119. The frame adapter 198 fits snugly into the frame opening 119. The outer perimeter of frame 192 is sized and contoured to fit into the interior region 136 extending to the interior surface of the translucent panel 104 along the perimeter 132 in a manner that abates the motion of the lens adapter 186 and the light control panel 106.

Light control panel 106 is orientated within the panel inlay 194 so that light from the LED 608 passes through the lens aperture 190 and the frame opening 119 illuminating the interior region 136 and projecting light through the translucent panels 104 creating an ambiance lighting effect.

In an exemplary embodiment and an advantage in the present invention, is that the translucent panels 104 can be assembled absent of occlusions on the surfaces allowing for uniform light transmission through the translucent panels 104. This creates superior ambiance lighting effects as the quality of the light is not blocked by seams, other impairments, and/or layers of material applied to the surface of the translucent panels 104 in a manner that when illuminated can be seen and detract aesthetically or otherwise from the quality of the light and its appearance in arrangements and other ambiance lighting effects.

Referring to FIG. 1G, there is illustrated one example of how a light control panel 106 can be configured to interconnect with a lens adapter 186 and frame 192, in reference 'A', by sliding 402 together and interlocking. In reference 'B', once assembled the assembly can be fitted within the interior region 136 and across the top edge 138 of the translucent panels 104.

In an exemplary embodiment, and with reference to at least FIG. 16 reference 'C', the ambiance lighting system 100 illustrated in at least FIGS. 1A-1G can comprise one or more mirrored film 174, and one or more of a mirror shaper 180. The mirror shaper 180 has a three-dimensional surface 175 and one or more openings 178. The mirror shaper 180 adheres to one or more translucent panels 104. The mirrored film 174 adheres to the three-dimensional surface 175 of the mirror shaper 180. The mirror shaper 180 when covered with the mirrored film 174 redirects at least a portion of radiated light from the light control panel 106 while selectively allowing partial light transmission through the mirrored film 174 and the opening 178 to enhance the ambiance lighting effect.

FIGS. 1H-1M reference another exemplary embodiment of the ambiance lighting system 100. In addition to styling variations of the light control panel 106 and solar panel 188, this embodiment provides for a USBC connector 196 (or other suitable connector configuration) to recharge and/or provide battery power to external devices proximate to the ambiance lighting system 100. In an exemplary embodiment, the USBC connector 192 can be part of device charger 638. In this regard, while solar power 188 may be sufficient in many event locations to charge the light control panel 106, sometimes external power is required. As such, a power source can be plugged into the USBC connector 196 (or other suitable connector styles) to supply external power to the ambiance lighting system 100.

FIG. 1H illustrates an assembled view where a light control panel 106, a lens adapter 186, and a frame 192 are assembled together and fitted across the top edge 138 and contoured along the outer edge of the translucent panels 104 to match the perimeter 132. In operation, the lens adapter is sized to fit across the top edge 138 and the frame is sized to fit within the interior region along the inner surface of the translucent panel 104 along the perimeter 132 so that the light control panel 106, lens adapter 186 and frame 192 hold the assembly from moving, slipping, or rotating during use.

FIG. 1I illustrates a top perspective view and FIG. 1J illustrates a bottom perspective view of the assembly which comprises the light control panel 106, lens adapter 186, and frame 192 removed from the interconnected translucent panels 104. This embodiment is also shown with a solar panel 188 which is used as part of the power source 602.

FIG. 1K illustrates a top perspective view and FIG. 1L illustrates a bottom perspective view wherein each of the light control panel 106, lens adapter 186, frame 192, and interconnected translucent panel 104 are disassembled.

Also illustrated, in an exemplary embodiment, one or more of a color lens 121 can cover the LED 608 changing the color of the light broadcast from the LED 608 into the interior region 136. In this, regard, each of the color lenses 121 can be removably fastened into the lens apertures 190. Lens cover 121A is a bottom perspective view and 121B is a top perspective view of lens cover 121.

FIG. 1M illustrates in reference 'A' a front view and in reference 'B' a side view of the assembled light control panel 106, lens adapter 186, and frame 192.

Referring to FIG. 1N-1P, there is illustrated another exemplary embodiment of an ambiance lighting system 100. FIG. 1N, reference 'A', illustrates a disassembled view of an ambiance lighting system 100 that is formed with a flexible luminary wrap 107. Reference 'B' illustrates an assembled ambiance lighting system 100.

In an exemplary embodiment, a luminary wrap 107 of at least two clear flexible layers of materials are seamed together with more than one edge divider 109 to form a top panel 123 and a panel perimeter 127 which is subdivided by edge dividers 109 into more than one pocket 125A-D. Translucent panels 104 can be slipped into each of the panel perimeter 127 pockets 125A-D by way of an open pocket edge 129 and sealed inside by way of a press-to-seal fastener 111 that is integrated along the open pocket edge 129. A light control panel 106 can be slipped into the top panel 123 by way of an open pocket edge 129 and sealed inside by way of a press-to-seal fastener 111 that is integrated along the open pocket edge 129.

In operation, the open pocket edge 129 and press-to-seal fasteners 111 are located on the inner side of the top panel 123 and perimeter panels 127. In this regard, when the translucent panels 104 and light control panel 106 are slipped into pockets 123/125A-D and the ambiance lighting system 100 assembled the open pocket edge 129 and press-to-seal fasteners 111 are not viewable, from the outside of the ambiance lighting system 100, by a customer enhancing viewable appearance as well as the ambiance lighting effect.

In operation, a press-to-seal fastener 111 can be sealed with a press from the customer's finger causing the fastener edges to interlock and opened with a pull-apart motion from the customer. When sealed the press-to-seal fastener prevents water or moisture from ingressing into the pockets 123/125A-D. By way of the press-to-seal fastener 111, the translucent panels 104 and light control panel 106 are removably sealed in pockets 123/125A-D.

With reference to FIG. 1N, panel perimeter 127 can be formed in a continuous loop. The top panel 123 can comprise a top panel flap 115 that has at least one panel fastener 168. Correspondingly panel fasteners 168 can be placed on the perimeter panel 127 to match up with the panel fasteners 168 on the top panel flap 115 to rigidly secure the ambiance lighting system 100 into place as shown in FIG. 1N, reference 'B'.

In an exemplary embodiment, a luminary wrap 107 can be at least one layer of a clear flexible material such as polyethylene, acrylic, polycarbonate, PVC, ABS, or other types and/or kinds of clear flexible materials, as may be required and/or desired in a particular embodiment.

Alternatively, in an exemplary embodiment, as illustrated in FIG. 1O, reference 'A', the panel perimeter 127 can be formed in a non-continuous manner and an additional panel end flap 131 with panel fasteners 168 can be matched with panel fasteners 168 at the opposite end of the panel perimeter 127 to form when assembled a continuous loop as illustrated in FIG. 1O, reference 'B'.

In this regard, a panel end flap 131 is attached and located on an unconnected end of panel perimeter 127. At least one of the panel fastener 168 is integrated into the panel end flap 131 and the opposite unconnected end of the panel perimeter 127, such that the panel perimeter 127 can be connected to form a continuous loop by way of the panel end flap 131 and the panel fasteners 168 as illustrated in FIG. 1O, reference 'B'.

In an exemplary embodiment, an ambiance lighting system can comprise more than one translucent panel 104. A light control panel 106 comprises one or more of a light-emitting diode (LED) 608, and a power source 602.

In an exemplary embodiment, a luminary wrap 107 forms a top panel 123, and a panel perimeter 127. The panel perimeter 127 has a top edge 138, and an interior region 136. The luminary wrap 107 comprises at least two layers of flexible clear material seamed together with more than one edge divider 109 forming at least one of a pocket 133 on the top panel 123, and more than one pocket 125A-D on the panel perimeter 107. Each of the pockets 125A-D/133 has a pocket front surface 171 and a pocket back surface 173. The pocket back surface 173 faces the interior region 136. At least some of the pockets 125A-D/133 have an open pocket edge 129. A portion of the top panel 123 is connected to the top edge 138 by at least one of the edge dividers 109.

In an exemplary embodiment, a press-to-seal fastener 111 can be integrated along the open pocket edge 129. The open pocket edge 129 can be positioned along the pocket back surface 173. The translucent panels 104 slide into the open pocket edge 129 of the pocket 125A-D along the panel perimeter 107 and the light control panel 106 can slide into the open pocket edge 129 pockets 133 on the top panel 123. The open pocket edge 129 is sealed closed by way of the press-to-seal fastener 111. Viewable from the pocket front surface 171 outside the ambiance lighting system 100 by a customer, the translucent panels 104 hide the open pocket edge 129 improving the viewing appearance and enhancing the ambiance lighting effect.

In an exemplary embodiment, a top panel flap 115. The top panel 123 comprises the top panel flap 115. At least one panel fastener 168 is integrated into the top panel flap 115 and the panel perimeter 127. The ambiance lighting system 100 is collapsible until the top panel 115 is extended across the top edge 138 and the panel fasteners 168 on the top panel flap 115 are aligned and interconnected with the panel fasteners 168 on the panel perimeter 127 transforming the ambiance lighting system 100 into a rigid structure. The LED 608 can be orientated to illuminate the interior region 136, projecting light through the translucent panels 104 creating an ambiance lighting effect.

For disclosure purposes, in a plurality of exemplary embodiments, any number of edge dividers 109 and panel pockets 125 can be formed. As an example, three panel pockets 125 can form a triangle, four panel pockets 125 can form a square, and other numbers of panel pockets 125 can form other geometric shapes, as may be required and/or desired in a particular embodiment.

Referring to FIG. 1P there is illustrated one example of an ambiance lighting system 100 utilizing the luminary wrap 107 that has a bisect divider 135 on at least one panel perimeter 127 pocket 125. The bisect divider 135 provides a flexible joint between translucent panels 104 in a manner that allows the geometric shape of the ambiance lighting system 100 to be changed. In this regard, and with reference to FIG. 1P, reference 'A', the ambiance lighting system 100 is a square shape having four paneled sides. One of the paneled sides has a bisect divider 135 allowing what would otherwise be a rigid surface to flex or otherwise fold at the bisect divider 135.

In operation and as illustrated in FIG. 1P, reference 'B', a customer can press inward at the bisect divider 135 to change the shape of the ambiance lighting system 100. Panel fasteners 168 on opposed corners draw closer together as the panel folds inward at the bisect divider 135 until the panel fasteners 168 meet holding the ambiance lighting system 100 together in its new shape as illustrated in FIG. 1P, reference 'C'.

In an exemplary embodiment, at least one of the pocket 125 located along the panel perimeter 127 comprises a bisect divider 135 that allows each of the translucent panel 104 within the pocket 125 adjacent to the bisect divider 135 to be repositioned changing the geometric shape of the ambient lighting system 100.

Referring to FIG. 1Q, there is illustrated one example of an ambiance lighting system 100 utilizing the luminary wrap 107 that has diagonal bisect dividers 117 on at least two opposing panel perimeter 127 pockets 125. In operation, a customer can press inward on the diagonal bisect dividers 117 causing them to flex inward and the ambiance lighting system 100 will fold flat. Correspondingly, starting with a folded ambiance lighting system 100, a customer can lift the sides causing the diagonal bisect dividers 117 to flex outward. Once the side panels are extended closing the top panel 123 secures the ambiance lighting system 100 into a rigid form ready for use.

In an exemplary embodiment, each of at least two pockets 125 that are opposed along the panel perimeter 127 comprise at least one of a diagonal bisect divider 117 which allows each of the translucent panel 104 within the pocket 125 adjacent to the diagonal bisect divider 117 to be repositioned allowing the translucent panel 104 to fold flat.

In an exemplary embodiment, and with reference to at least FIG. 16 reference 'C', the ambiance lighting system 100 illustrated in at least FIGS. 1H-1Q can comprise one or more mirrored film 174, and one or more of a mirror shaper 180. The mirror shaper 180 has a three-dimensional surface 175 and one or more openings 178. The mirror shaper 180 adheres to the pocket back surface 173 along the panel perimeter 127. The mirrored film 174 adheres to the three-dimensional surface 175 of the mirror shaper 180. The mirror shaper 180 when covered with the mirrored film 174 redirects at least a portion of radiated light from the light control panel 106 while selectively allowing partial light transmission through the mirrored film 174 and the opening 178 to enhance the ambiance lighting effect.

Referring to FIG. 1R, there is illustrated one example of an ambiance lighting system 100. In an exemplary embodiment, an ambiance lighting system 100 can comprise more than one translucent panel 104 that are aligned and connected to form a perimeter 132 having a top edge 138, a bottom edge 140, a bottom perimeter edge 134, and an interior region 136.

As better illustrated in at least FIG. 18, a light control panel 106 can comprise one or more light-emitting diode (LED) 608, a power source 602, and an activation control circuit 604.

As better illustrated in at least FIG. 3, one or more of a sleeve 110 has an open edge 148. The light control panel 106 slides into the open edge 148 and is retained in sleeve 110. The sleeve 110 is secured across the top edge 138 or the bottom edge 140.

The light control panel 106 is orientated within the sleeve 110 so that the LED(s) 608 illuminate the interior region 136 projecting light, when the sleeve 110 is secured across the top edge 138 towards the bottom edge 140 or when the sleeve 110 is secured across the bottom edge 140 towards the top edge 138, and through the translucent panels 104 creating an ambiance lighting effect.

In another exemplary embodiment, an ambiance lighting system 100 can comprise more than one translucent panel 104. As better illustrated in at least FIG. 5, one or more of a panel connector 124/126/150/182 aligns and interconnects the translucent panel 104 forming a perimeter 132 having a top edge 138, a bottom edge 140, a bottom perimeter edge 134, and an interior region 136.

As better illustrated in at least FIG. 18, a light control panel 106 comprises one or more LED 608, a power source 602, and an activation control circuit 604. As better illustrated in at least FIG. 3, one or more of a sleeve 110 has an open edge 148. The light control panel 106 slides into the open edge 148 and is retained in sleeve 110. The sleeve 110 is secured across the top edge 148. The light control panel 106 is orientated within the sleeve 110 so that the LED(s) 608 illuminate the interior region 136 projecting light, when the sleeve 110 is secured across the top edge 138 towards the bottom edge 140 or when the sleeve 110 is secured across the bottom edge 140 towards the top edge 138, and through the translucent panels 104 creating an ambiance lighting effect.

The translucent panels 104 can be made from one or more of the following materials: polycarbonate, plastic, Plexiglass, Lexan, Acrylic, acrylonitrile butadiene styrene (ABS), glass, fabric, recycled materials, or other suitable materials as may be required and/or desired in a particular embodiment. Additionally, a top panel 110 and a bottom panel 152 can be clear or translucent and can be made from one or more of the following materials: polycarbonate, plastic, Plexiglas, Lexan, Acrylic, ABS, glass, fabric, recycled materials, or other suitable materials as may be required and/or desired in a particular embodiment.

In an exemplary embodiment, one or more of a Fresnel lens 112 is secured across the bottom edge 140. The Fresnel lens 112 projects patterns of light onto surfaces proximate to the ambiance lighting system 100. The Fresnel lens can be applied to a bottom panel 152. The bottom panel 152 can further comprise bottom panel fasteners 154 that secure the bottom panel to the bottom edge of the translucent panels 104.

Such bottom panel fasteners 154 can be magnets, hook-and-loop, adhesive tapes or films, or other types and kinds of fasteners as may be required and/or desired in a particular embodiment. Depending on the types of bottom panel fasteners 154 used, the bottom panel fasteners 154 can be surface applied to the for hook-and-look, adhesive film, and similar types of panel fasteners or press-fit or otherwise embedded into the bottom panel 152 for magnets, and other similar panel fasteners.

The translucent panels 104 or bottom translucent panel 152 can have de-embossed recesses/fastener holes 172 where the panel fasteners 116/154 can be located, fitted, press-fitted, or secured in other ways as may be required and/or desired in a particular embodiment.

In an exemplary embodiment, sleeve 110 can be fabricated from a clear material. When solar panels 188 are used as part of the power source 602, a clear material used for the sleeve 110 allows sunlight to reach the solar panels 188 which are part of the light control panel 106. Additionally, a clear material used for sleeve 110 allows the light generated by the LED(s) which are part of the light control panel 106 and secured inside the sleeve 110 to radiate light mostly unobstructed and not occluded into the inner region 136. The injecting of high-quality light into the inner region 136 projects light through the translucent panels 104 to create the ambiance lighting effect.

In an exemplary embodiment, one or more of an accessory sleeve 102 can be secured to the surface of one or more of the translucent panel 104. In this regard, as better illustrated in at least FIG. 4, the access sleeve 102 is configured such that an ornamental accessory 158 can be slid into the accessory sleeve 102. In operation, the ornamental accessory 158 has a plurality of apertures therethrough and slides into the accessory sleeve 102. The ambiance lighting system 100 backlights the ornamental accessory 158 creating the desired ambiance lighting effect.

In an exemplary embodiment, the sleeve 110 and the accessory sleeve 102 can be made from a clear material such as one or more of the following materials: plastic, vinyl, glass, or suitable type or kind of materials as may be required and/or desired in a particular embodiment.

In an exemplary embodiment, one or more of an accessory sleeve 102 can be adhered to the interior region 136 facing surface of the translucent panel 104. And, one or more of an ornamental accessory 150 having a plurality of apertures therethrough can be slid into one or more of the accessory sleeve 102. In this regard, the accessory sleeves 102 can be affixed to the interior surface of the translucent panels 104. This provides a cleaner more aesthetically pleases view of the ambiance lighting system from the outside where the accessory sleeves 102 are not visible to the customer.

Referring to FIG. 2, there is illustrated one example of a sleeve 110 and light control panel 106. In an exemplary embodiment, reference 'A' illustrates how a light control panel 106 comprising one or more LED(s) 608, the power source 602, and the activation control circuit 604 is slipped into the sleeve 110, and then the combination is secured to the top edge 138. Alternatively, the combination can be secured to the bottom edge 140.

A handle 108 can be fastened at each end 156A and 156B and spans the sleeve 110 so that a consumer 302 can carry the ambiance lighting system 100. One or more hanging holes 182 can be cut into the handle. The hanging holes 182 can be used to tie a string, wire, cord, or other suitable hanging material through the hanging holes 180 to effectuate the ability to hang the ambiance lighting system 100. Reference 'B' illustrates photo 704 of an ambiance lighting system 100 with the sleeve 110 and light control panel 106 attached to the translucent panels 104.

Referring to FIG. 3, there is illustrated one example of a consumer 302 carrying an ambiance lighting system 100. In an exemplary embodiment, reference 'A' illustrates the sleeve 110 further comprising a seal 120 along the open edge 148 that when closed creates a water resistance environment around the light control panel 106. In this regard, sleeve 110 can comprise at least two layers of material sealed along three edges leaving one open edge 148. The sleeve 110 forming a pocket allows the light control panel 106 to be slipped into sleeve 110. The seal 120 can then be pressed sealing firmly by the consumer 302 to close the seal with an interlocking edge type fastener or other suitable fastener type and/or manner as may be required and/or desired in a particular embodiment. Once sealed the light control panel 106 is in a water-resistant environment. The sleeve 110 can be made of multiple clear layers of the material that allows the sunlight to reach a solar panel 188 which in certain embodiments can be part of the power source 602. The solar panel 188 recharges the batteries by way of the sun or external light source that powers the light control panel 106 and/or powers the light control panel 106 directly. The clear layer material also allows consumer 302 to see through to the light control panel 106 to activate by touching the activation circuit 604. Alternatively, consumer 302 can use a remote-control 636 to operate the ambiance lighting system 100. Such manual touch or wireless remote operation causes light generated by the LED(s) to be broadcast into the interior region 136 of the translucent panels 104.

In an exemplary embodiment, at least some of the translucent panels 104 can comprise panel fasteners 116A and 116B. Furthermore, sleeve 110 can have one or more flaps 118A, 118B, 118C, and 118D that extend beyond the perimeter 132 across the top edge 138 or the bottom edge 140 as needed in a particular embodiment. The flaps 118A, 118B, 118C, and 118D can have fasteners 114A-H that mate with the panel fasteners 116A-B. While one translucent panel 104 is illustrated in FIG. 3 reference 'A', other translucent panels 104 can be combined to form perimeter 132. The combination of translucent panels 104 can be similarly equipped with panel fasteners 116A-B securing the sleeve 110 to the top edge 138 or bottom edge 140 of each of the translucent panels.

In an exemplary embodiment, the fastener 114A-H and panel fasteners 116A-B can be magnets, hook-and-loop, adhesive tapes or films, or other types and kinds of fasteners as may be required and/or desired in a particular embodiment.

A handle 108 can be fastened at each end 156A and 156B and span the sleeve 110 so that a consumer 302 can carry the ambiance lighting system 100 as illustrated in reference 'B' photo 706. In an exemplary embodiment, the handle 108 can be fabricated from the same clear material as the sleeve 110 and can be one or more of the following materials: plastic, vinyl, glass, or suitable types and kinds of materials as may be required and/or desired in a particular embodiment.

Figure 4:
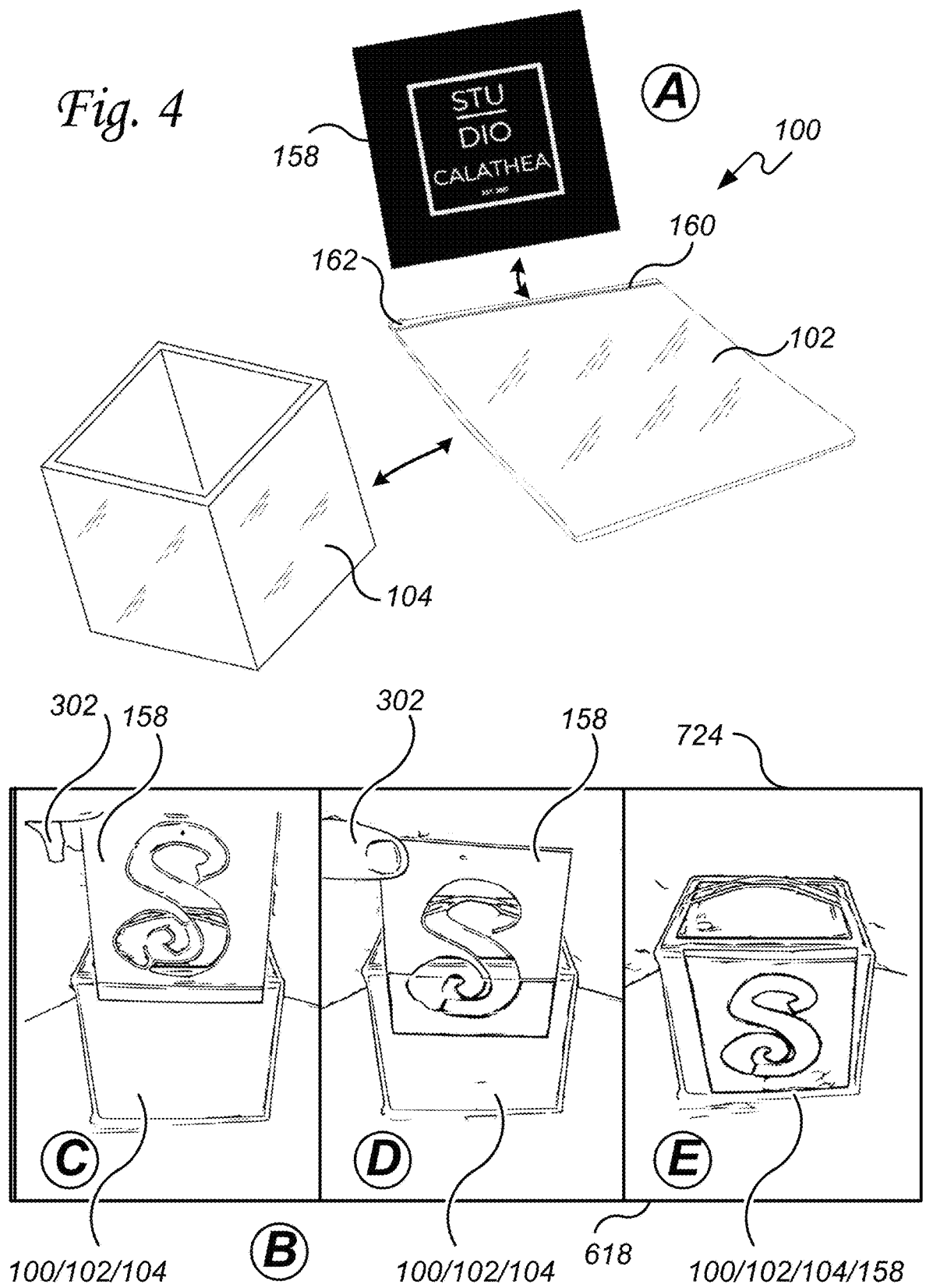
FIG. 4 illustrates one example of an accessory sleeve and an ornamental accessory.

Referring to FIG. 4, there is illustrated one example of an accessory sleeve 102 and an ornamental accessory 158. In an exemplary embodiment, an ornamental accessory 158 can be thin and made of paper, metal, or other material and have a plurality of apertures punch there through to create a unique pattern, shape, indicia, or other ornamental design. As an example, illustrated in FIG. 4 is an ornamental accessory 158 with the indicia STUDIO CALATHEA punched therein. Thin in nature the ornamental accessory 158 can slide into the accessory sleeve 102, open edge 162.

The accessory sleeve 102 can be fabricated similarly to sleeve 110. In this regard, the accessory sleeve 102 can be fabricated from clear material so that the ornamental accessory 158 is viewable through the accessory sleeve 102 and backlit from the LED(s) 608.

In an exemplary embodiment, the accessory sleeve 158 clear material can be one or more of the following materials: plastic, vinyl, glass, or other suitable type or kinds of materials as may be required and/or desired in a particular embodiment.

FIG. 4, reference 'B' illustrates photo 724 showing in operation a consumer 302 sliding an ornamental accessory 158 into an accessory sleeve 102. In this regard, illustrated as references 'C', 'D', and 'E' is a progression, showing the consumer 302 sliding an ornamental accessory 158 into an accessory sleeve 102. The accessory sleeve 102 is fastened to a translucent panel 104 which is part of an ambiance lighting system 100.

The accessory sleeve 102 can comprise an accessory seal 160 that is similar to seal 120 along the open edge 162 that when closed creates a water resistance environment around the ornamental accessory 158. In this regard, the accessory sleeve 102 can comprise at least two layers of material sealed along three edges leaving one open edge 162. The accessory sleeve 102 forming a pocket allows the ornamental accessory 158 to be slipped into the accessory sleeve 102. The accessory seal 160 can then be pressed by the consumer 302 sealing firmly interlocking edges of the fastener or sealed by other suitable fastener types or kinds as may be required and/or desired in a particular embodiment. Once sealed the ornamental accessory 158 is in a water-resistant environment.

Figure 5:
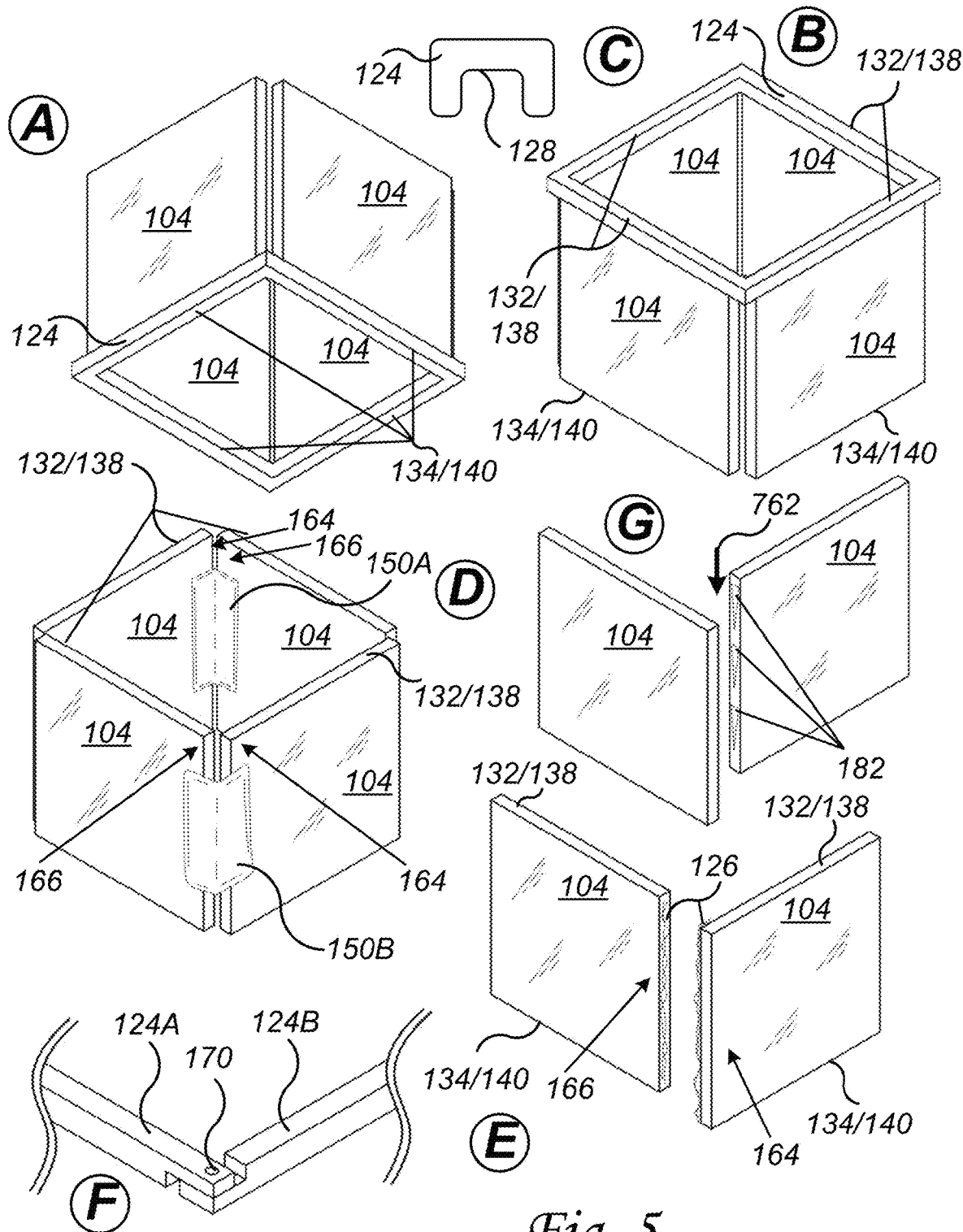
FIG. 5 illustrates one example of a panel connector.

Referring to FIG. 5, there are illustrated examples of a panel connector 124, 126, 150, and 182. In an exemplary embodiment, panel connectors 124, 126, 150, and 182 align and interconnect the translucent panel 104 forming a perimeter 132 having a top edge 138, a bottom edge 140, a bottom perimeter 134, and an interior region 136. In references 'A' and 'B', the panel connector 124 is a ridged frame that fastens along the bottom edge 140 illustrated in reference 'A' or the top edge 138 illustrated in reference 'B' holding each of the translucent panels 104 in position.

The ridged frame 124 can have a u-shaped groove 128 configured for receiving the top edge 138 or the bottom edge 140 of each of the translucent panels 104. The u-shaped groove 128 of the ridged frame 124 illustrated in reference 'C' can press over the edges of the translucent panels 104 gripping the edges of the translucent panels 104 and aligning and holding the translucent panels 104 firmly. The ridged frame 124 can be made of plastic, metal, or other materials as may be required and/or desired in a particular embodiment.

Figure 7A:
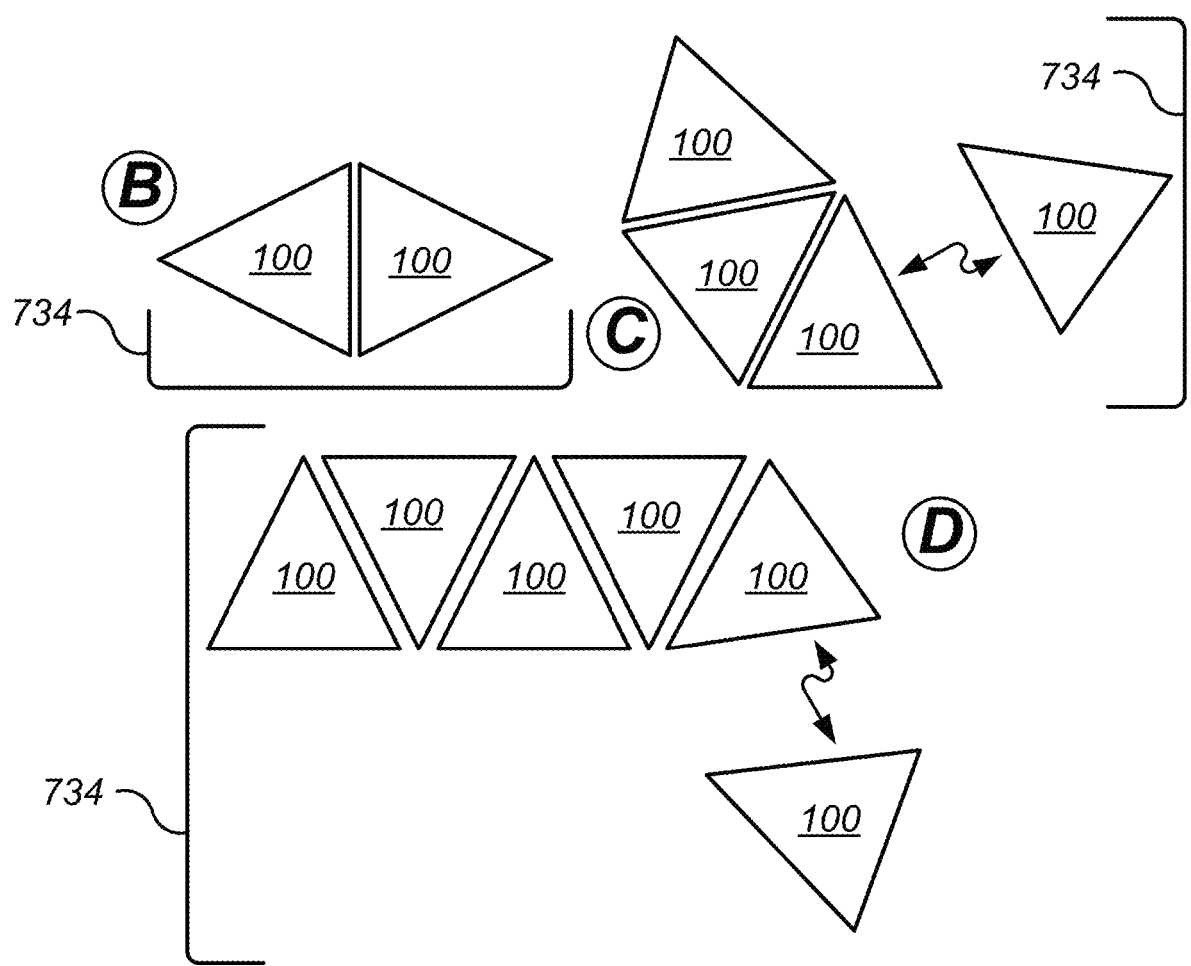

As better illustrated in at least FIG. 7A, in a plurality of exemplary embodiments, the ridged frame 124 can be formed into a variety of shapes including triangle, square, pentagon, and other shapes that hold the translucent panel 104 creating different shaped ambiance lighting systems.

In another exemplary embodiment, in FIG. 5 reference 'D', the panel connector 124 can be an adhesive film 150A-B. In this regard, each of the translucent panel 104 has a left edge 164 and a right edge 166. The adhesive film 150A-B spans adjacent right edge 166 and left edge 164 of each of the translucent panel 104. In operation, the adhesive film 150A can be placed on the interior surface, or interchangeably the adhesive file 150B can be placed on the exterior surface of the translucent panels 104.

An advantage, in the present invention, of using adhesive film 150A-B to secure the translucent panel is that the adhesive film 150A-B is positioned and secured to the translucent panel 104 adjacent edges to allow each of the translucent panels 104 to change angles for use and well as stack for storage.

In an exemplary embodiment, in reference 'E', the panel connector 124 can be hook-and-loop 126. In this regard, the hoop-and-loop can be disposed of on opposite adjacent edges or side 126 of the translucent panels 104. In operation, the consumer 302 can press the hook-and-loop edges of adjacent translucent panels 104 together to create the perimeter. The sleeve 110 can then be applied to the top edge 138 or bottom edge 140 to hold the shape of the ambiance lighting system 100. Such hook-and-loop can be VELCRO or other similar types or kinds of hook-and-loop-material as may be required and/or desired in a particular embodiment.

In an exemplary embodiment, in reference 'F', the panel connector 124A-B is a rigid frame having a plurality of hinges 170 located at the corner junctions where each of the translucent panels 104 intersect. In this regard, the hinges 170 are configured to allow each of the translucent panels 104 to change angles with respect to each other for use expanding into the desired shape as well as for stacking the translucent panels 104 for storage with the panel connector attached. Such a hinge 170 can be a press-fit pin, rivet, or other hinge type or kind that passes through and connects, in a movable manner, the movable corners of the panel connector 124A-B. Hinges can be placed at each corner of the panel connector 124. The hinge pin 170 illustrated is an example and not a limitation, other suitable types and kinds of hinges can be used as may be required and/or desired in a particular embodiment.

In an exemplary embodiment, the panel connector 182 is one or more interlocking embossed and de-embossed guides on opposing translucent panels 104 that securely interconnect together. In operation, when two translucent panels 104 are aligned, the embossed and de-embossed guides engaged, and the two translucent panels 104 slid 762 in opposing directions causing a friction fitting between the embossed and de-embossed guides. In an exemplary embodiment, the number of and shape of the embossed and de-embossed guides can be customized as may be required and/or desired in a particular embodiment.

Figure 6:
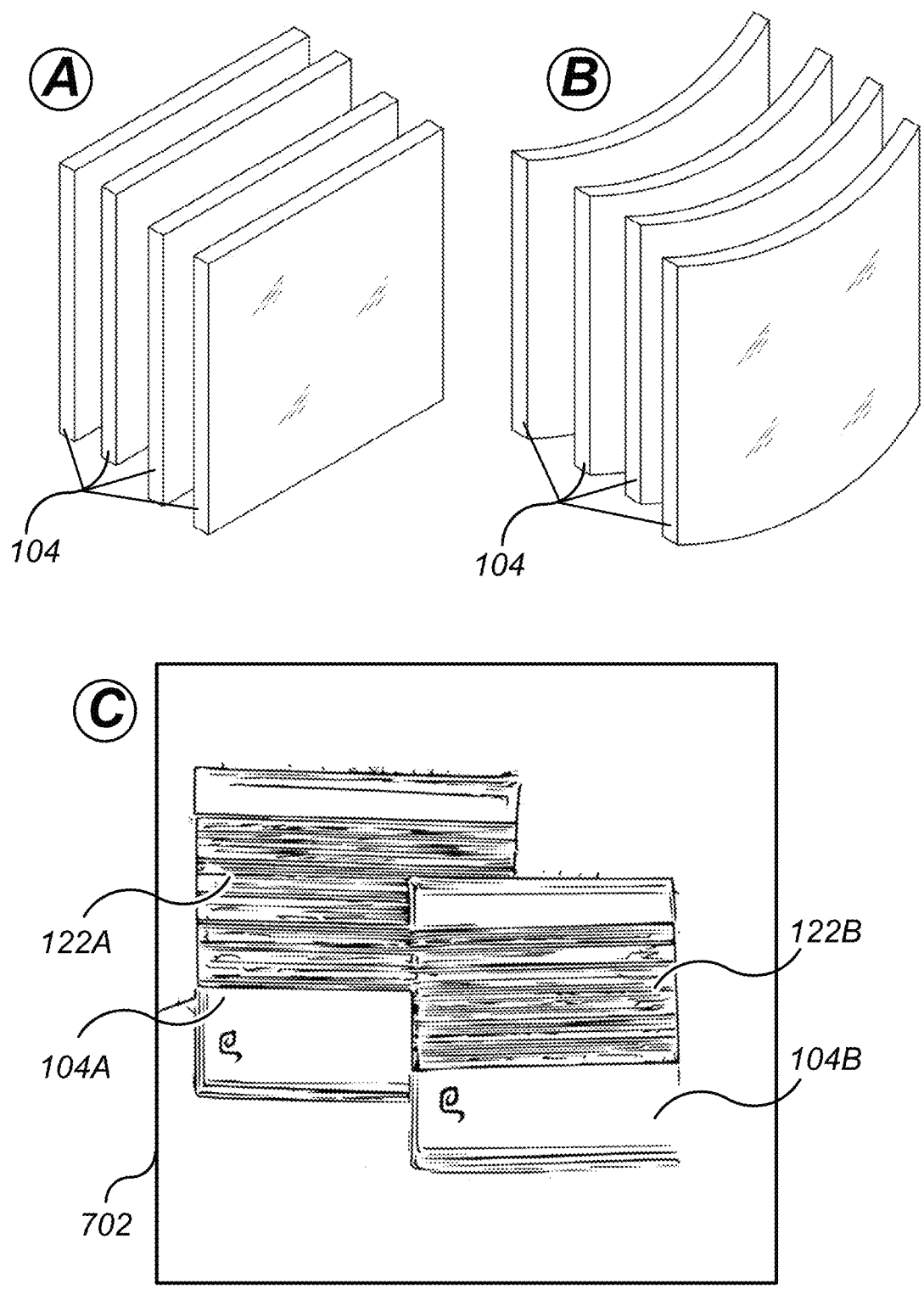
FIG. 6 illustrates examples of translucent panels.

Referring to FIG. 6, there are illustrated examples of translucent panels 104. In a plurality of exemplary embodiments, the translucent panels 104 can be cut or shaped to any size, and any number of translucent panels 104 can be used in an ambiance lighting system 100. For example and not a limitation, preferred translucent panel 104 sizes are four-inches by four-inches, six-inches by six-inches, or other sizes as may be required and/or desired in a particular embodiment. Shown in reference 'A' are planar translucent panels 104 which interconnect to form perimeter 132 and bottom perimeter 134. Shapes such as triangles, squares, and other shapes can be formed using multiple translucent panels 104.

The translucent panels 104, in reference 'B', can also be curvilinear in shape to form contoured, round, and other shapes. Planar and curvilinear translucent panels 104 of the same size or different sizes can be mixed and matched to create the ambiance lighting system 100 as may be required and/or desired in a particular embodiment.

In an exemplary embodiment, in reference 'C', photo 702 illustrates how different size translucent panels 104 can be stacked and wrapped with bands 122A-B for shipping to a consumer 302, displayed for purchase in a store, stacked and stored ready for future use, or packaged for other purposes as may be required and/or desired in a particular embodiment.

Referring to FIGS. 7A-7B, there are illustrated examples of a plurality of ambiance lighting systems being interconnected forming ambiance lighting cluster effects. In FIG. 7A, in an exemplary embodiment, a plurality of ambiance lighting systems 100 can be stacked and/or coupled together forming an ambiance lighting cluster 734 of ambiance lighting systems 100. Reference 'A' illustrates one example of a row of three ambiance lighting systems 100 interconnected forming a one-by-three matrix ambiance lighting cluster 734 effects.

FIG. 7A, reference 'B' illustrates ambiance lighting cluster 734 effects using triangle-shaped ambiance lighting systems 100. In this regard, the triangle-shaped ambiance lighting systems 100 can be coupled together in pairs, or in reference 'C' coupled together and arranged in curved shapes, or in reference 'D' coupled together and used to create straight rows and curved corners.

In FIG. 7B, reference 'A', panel fasteners 168 can secure each of the ambiance lighting systems 100 together. In this regard, the panel fasteners can interconnect a plurality of ambiance lighting systems 100 as desired to create an ambiance lighting cluster 734 effects.

Such panel fasteners 168 can be magnets, hook-and-loop, adhesive tapes or films, or other types and kinds of panel fasteners as may be required and/or desired in a particular embodiment. The panel fasteners 168 can be surface applied to translucent panel 104, recessed in de-embossed cavities, or press-fit into holes.

Reference 'B', photo 710, illustrates one example of a matrix of nine ambiance lighting systems 100 interconnected forming a three-by-three matrix ambiance lighting cluster 734 effects. In an exemplary embodiment, in FIG. 7A reference 'A', a plurality of ambiance lighting systems 100 can be stacked and/or coupled together in rows and columns to form a lighted matrix of ambiance lighting systems forming an ambiance lighting cluster 734.

Figure 8:
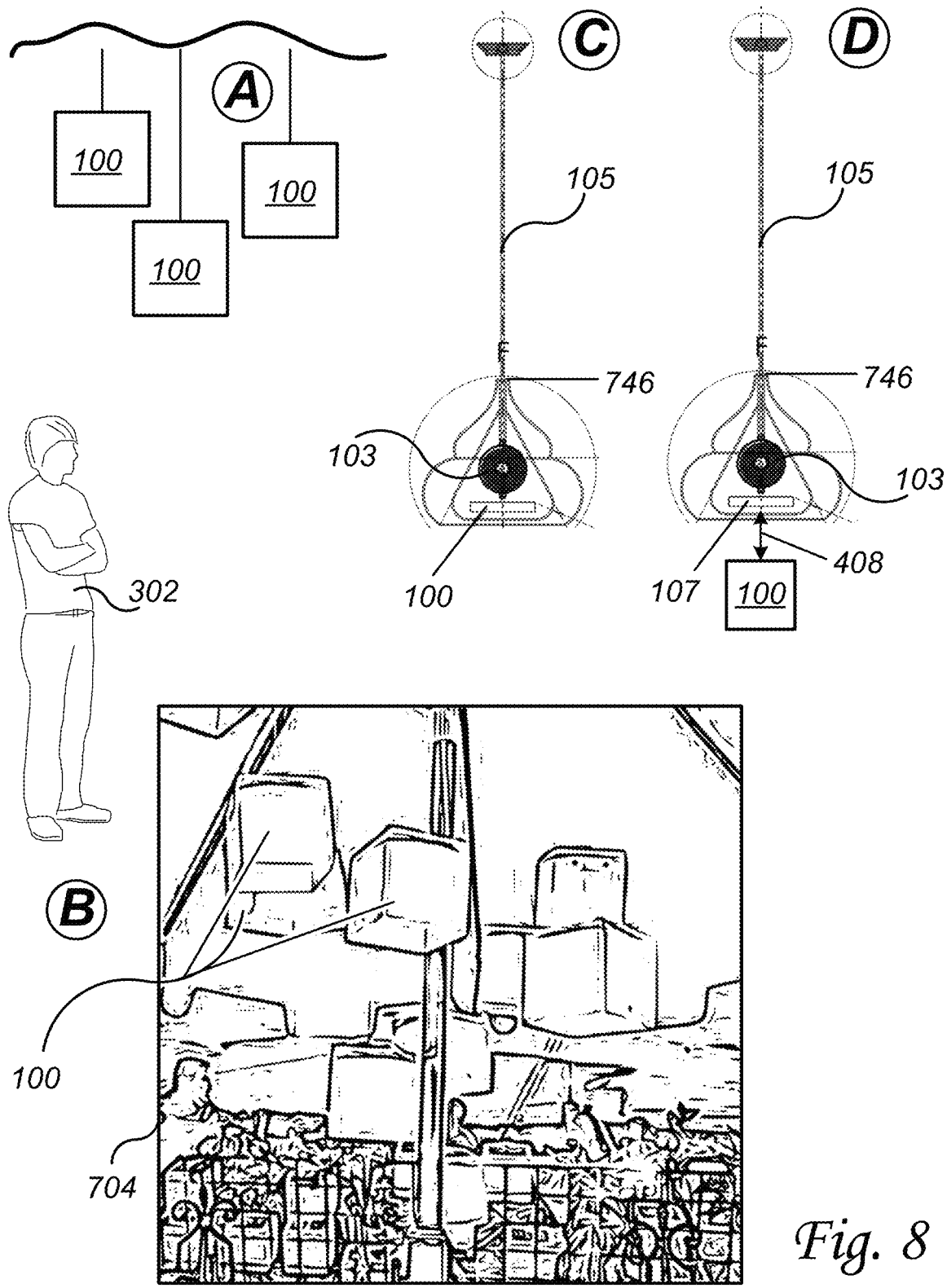
FIGS. 8-10 illustrate examples of applications of an ambiance lighting system.
Figure 9:
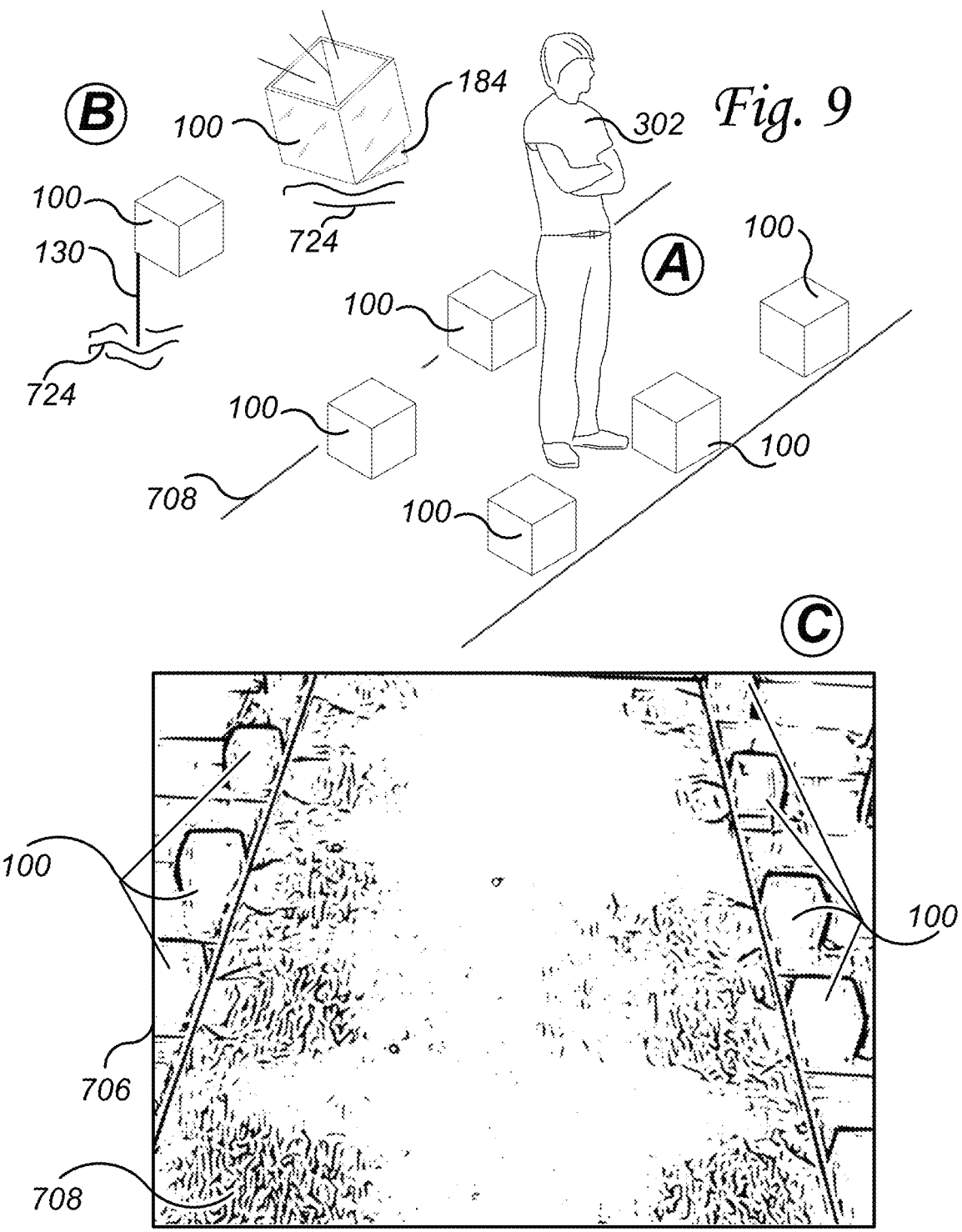
Figure 10:
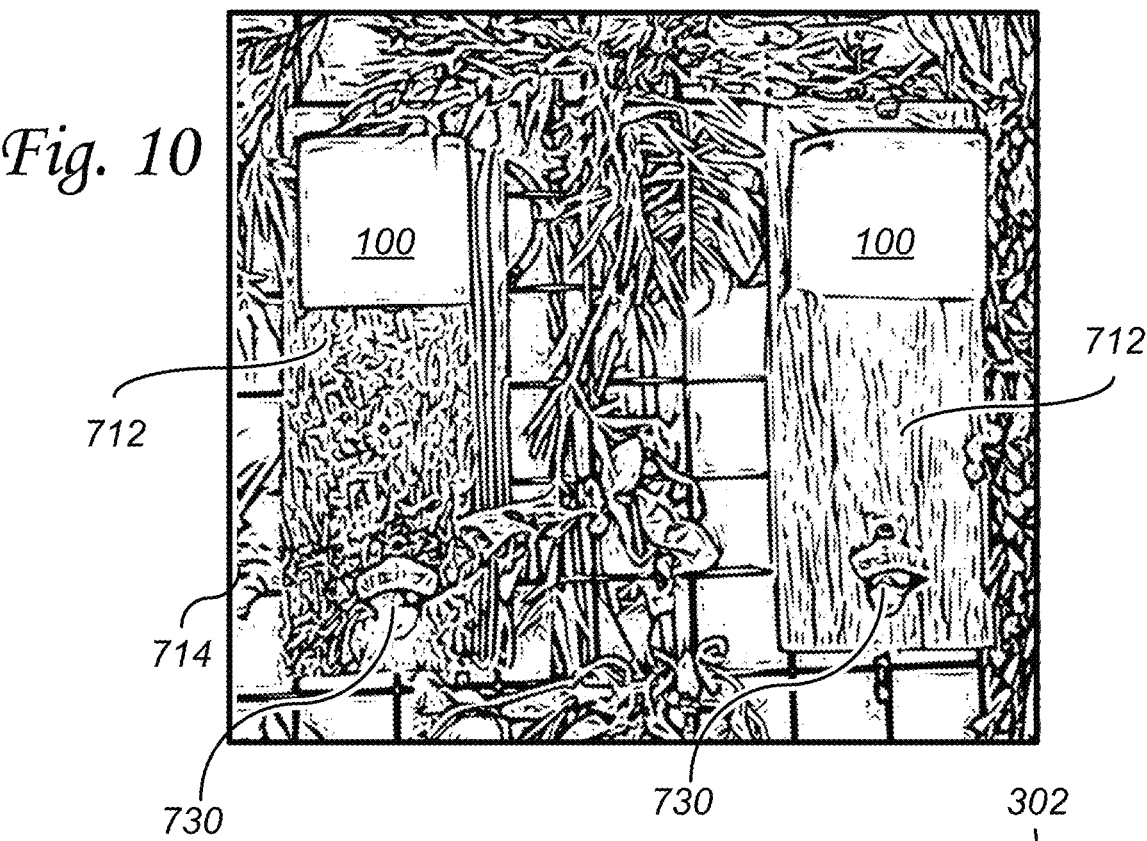

Referring to FIGS. 8-10, there are illustrated examples of applications of an ambiance lighting system 100. In an exemplary embodiment for example and not a limitation, in FIG. 8, reference 'A' illustrates a plurality of ambiance lighting systems 100 can be hung on short strings tied to the handle 108 or other places and secured to a roof, patio fixtures, umbrella, sun deck, or some other suitable overhang. In reference 'B', photo 704, illustrates a plurality of ambiance lighting systems 100 hanging from patio umbrellas and placed in a garden setting to provide ambiance lighting for an outdoor event place.

In an exemplary embodiment and as illustrated in FIG. 8 reference 'C', an ambiance lighting system 100 can be hung by way of cable 105. A retractable tether 103 can be incorporated into an external object 746 such as a hanging lamp, chandelier, ceiling, or other external objects. In this regard, the retractable tether 103 can be interconnected with the external object 746 on one end and connected to the ambiance lighting system 100 on the other end such that the retractable tether 103 having a wire/string/or cord spool can be deployed to lower the ambiance lighting system 100 from the external object 746 and recoiled raising the ambiance lighting system 100 up to the external object 746.

In an exemplary embodiment and as illustrated in FIG. 8 reference 'D', an ambiance lighting system 100 can be hung by way of cable 105. A retractable tether 103 can be incorporated into an external object 746 such as a hanging lamp, chandelier, ceiling, or other external objects. In this regard, the retractable tether 103 can be interconnected with the external object 746 on one end and connected to a lighting adapter 107 on the other end, The light adapter then interconnects 408 or otherwise snaps into the ambiance lighting system 100 such that the retractable tether 103 having a wire/string/or cord spool can be deployed to lower the ambiance lighting system 100 from the external object 746 and recoiled raising the ambiance lighting system 100 up to the external object 746.

In an exemplary embodiment, the lighting adapter 107 can be used in lamp and chandelier applications such as in FIG. 13, furniture and cabinet applications such as in FIG. 15B, and other applications as may be required and/or desired in a particular embodiment. In operation, the lighting adapter is positioned as needed and then the ambiance lighting system 100 interconnects or otherwise snaps to the lighting adapter 100.

In operation, the retractable tether 103 can be utilized to raise and lower ambiance lighting system 100 to and from high handing lamps, chandeliers, ceilings, and other external objects 746. In this regard, when impractical to repeatedly climb to a hanging lamp 746, the retractable tether 103 having a wire/string/or cord spool can be used to raise and lower the ambiance lighting system 100 as needed. Such raising and lowering can be by manual or remote control, as may be required and/or desired in a particular embodiment.

In an exemplary embodiment, a retractable tether 103 interconnects the ambiance lighting system 100 with an external object 746 allowing adjustment of the hanging height of the ambiance lighting system 100.

Referring to FIG. 9, in an exemplary embodiment for example, and not a limitation, in reference 'A', a plurality of ambiance lighting systems 100 can be positioned to illuminate a pathway 708, or other similar types or kinds of walkways or roadways. In reference 'B', optionally a rod 130 can be added to the ambiance lighting system 100 to elevate the system above ground 724. In another exemplary embodiment, a light diverter 184 can be adhered to the outer surface of one of the translucent panels 104 or on the top panel to invert the ambiance lighting system 100 and hold it at an angle pointed upward while it is sitting on the ground 724 to better illuminate objects above the ambiance lighting system 100. In reference 'C', photo 706 illustrates pathway 708 illuminated by a plurality of ambiance lighting systems 100.

Referring to FIG. 1O, in an exemplary embodiment, an ambiance lighting system 100 can be incorporated into art 712. Art 712 can be for example and not a limitation accent art, wall art, functional art, and other display and/or decorations. Photo 714 illustrates an ambiance lighting system 100 incorporated on a wood plank art 712 with an old-style bottle opener 730.

Figure 11:
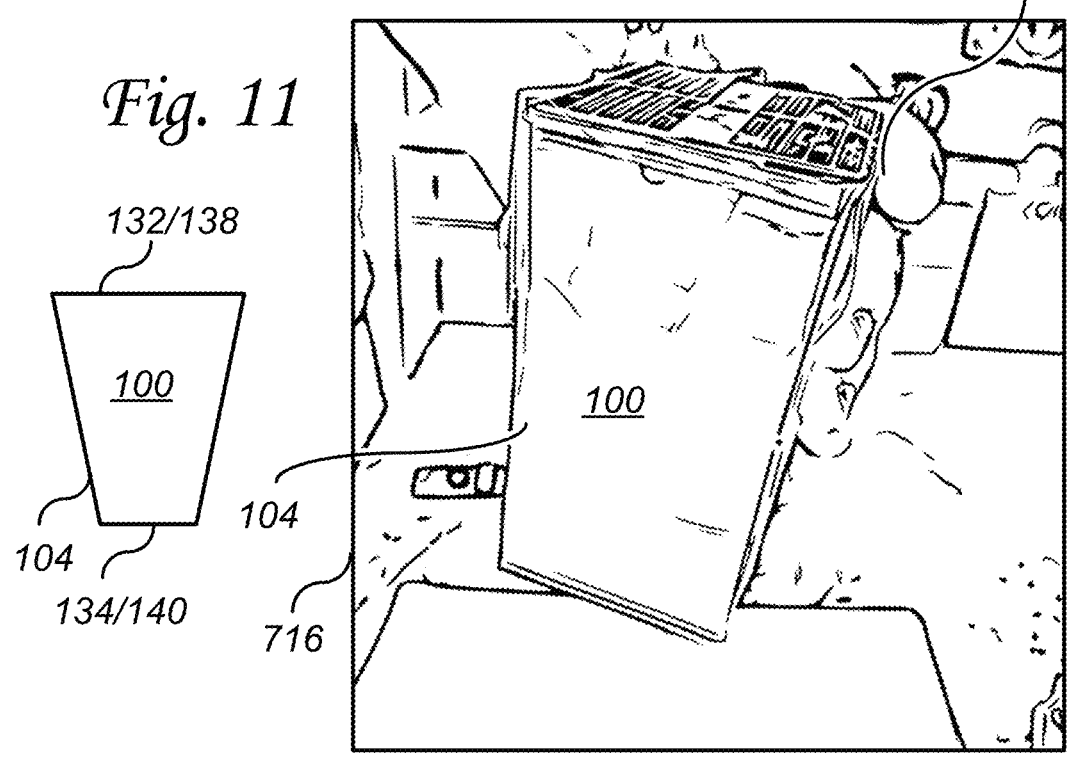
FIG. 11 illustrates one example of a top perimeter edge and a bottom perimeter edge of different sizes.

Referring to FIG. 11, there is illustrated one example of a top perimeter 132 edge and bottom perimeter edge 134 of different sizes. In an exemplary embodiment, the perimeter of an ambiance lighting system 100 can have a top perimeter edge 132 formed by the top edge 138 of each of the translucent panel 104 and a bottom perimeter edge 134 formed by the bottom edge 140 of each of the translucent panels 104. The top perimeter edge 132 can be greater in length than the bottom perimeter edge 140. In this regard, the translucent panels 104 can have different kinds of shapes such as trapezoid, and other kinds of shapes resultant from the top perimeter 132 and the bottom perimeter 134 being unequal lengths creating a tapered effect when the translucent panels 104 are assembled. Photo 716 illustrates one example of the top perimeter edge 132 being greater than the bottom perimeter edge 140.

Referring to FIGS. 12-14, there are illustrated examples of ambiance lighting systems 100 being inserted into secondary lighting fixtures a box 720A-C, a lamp 722 having a lampshade 732, and a chandelier 724. The secondary lighting fixture can be a lamp 722, a box 720A-C, a chandelier 724, a lampshade 732, or other types or kinds of secondary light fixtures as may be required and/or desired in a particular embodiment. In another exemplary embodiment, a sleeve 110 with light control panel 106 having a solar panel 188 as part of the power source 602 can be utilized in place of an entire ambiance lighting system 100.

In an exemplary embodiment for example and not a limitation, FIG. 12 photo 718 illustrates at least one of the ambiance lighting system 100 can be inserted into a secondary lighting fixture, photo 718 shows the insertion progression reference as the box 720A-C, by a consumer 302. The secondary lighting fixture box 720A-C is a box shape or other shape with cutout side panels such that the ambiance lighting system 100 is inserted into the top of the box 720A-C causing the cutout panels on the box 720A-C to be backlit creating the desired lighting effect. Such lighting fixture box can be more than one box panel 167, as better illustrated in at least FIG. 15C, that are interconnected at the perimeter to form the fixture box 720A-C.

In an exemplary embodiment, the ambiance lighting system 100 can be placed on a box spinner 165 and the box panels 167 interconnected with the box spinner 165. The complete assembly in 720C can then rotate on the box spinner 165.

In an exemplary embodiment, one or more of an ornamental accessory 158 can hang from the top edge 138 positioned adjacent to the surface of one or more of the translucent panels 104. In this regard, instead of an ornamental accessory 158 sliding into an accessory sleeve 102, the ornamental accessory can hang such as by a hook or string from the top edge 138 resting against the translucent panel such that the ornamental accessory 158 is backlit by the ambiance lighting system 100.

Referring to FIG. 13, in an exemplary embodiment, reference 'A' illustrates the ambiance lighting system being integrated into a lamp 722 having a lampshade 732. In a plurality of exemplary embodiment, the ambiance lighting system 100 can be integrated into a lamp 722 where the ambiance lighting system is integrated into a lampshade 732, or integrated into other fixtures as may be required and/or desired in a particular embodiment.

In another exemplary embodiment, in reference 13' a plurality of ambiance lighting systems 100 can be integrated into a chandelier 724.

Referring to FIG. 14, in an exemplary embodiment for example, and not a limitation, reference 'A' illustrates how a light control panel 106 can be placed into a translucent basket 112. In the alternative, a complete ambiance lighting system 100 can be placed into basket 112. For disclosure purposes, the basket can be a vase, bucket, or other types and kinds of containers as may be required and/or desired in a particular embodiment.

Once the light control panel 106 or the complete ambiance lighting system 100 is placed into the translucent basket 112 the basket 112 by way of the translucent sides will provide the desired lighting effect. Basket 112 can be made from one or more of the following materials: polycarbonate, plastic, Plexiglass, Lexan, Acrylic, acrylonitrile butadiene styrene (ABS), glass, fabric, recycled materials, or other suitable materials as may be required and/or desired in a particular embodiment. In the exemplary embodiment where the translucent material 104 is flexible, such as a fabric, the basket 112 in reference 'B' can be compressed 726 to adjust the height and/or for storage.

In reference 'C', photo 728 illustrates how a consumer 302 can place inside a basket 112 either a light control panel 106 or a complete ambiance lighting system 100 to create the desired lighting effect.

Referring to FIG. 15A, there are illustrated examples of applications of an ambiance lighting system 100. In an exemplary embodiment, for example, and not a limitation, ambiance lighting system 100 can be integrated into, on to, or under furniture to create ambiance lighting effects. In this regard, in reference 'A' an ambiance lighting system 100 can be integrated under a chair 734, or a table 736, or in reference 'B' under a bench 738, or in reference 'C' under a cabinet 740 such as in a kitchen or other places. In a plurality of embodiments, a plurality of ambiance lighting system 100 can be integrated under all types and kinds of furniture as may be required and/or desired in a particular embodiment. In another embodiment, in place of a complete ambience lighting system 100, a plexiglass panel can be a translucent panel 104, or other translucent material, and comprise a sleeve that holds a light control panel 106 having a solar panel 188 as part of the power source 602.

In an exemplary embodiment, in an application where the ambiance lighting system 100 is mounted on the underside of, for example, and not a limitation, a bench 738, table 736, or other types or kinds of furniture, a hole can be cut into the furniture above the ambiance lighting system 100 to allow sunlight to reach the solar panel 188 power source 602 to recharge the ambiance lighting system 100.

In another exemplary embodiment, the ambiance lighting system 100 can be positioned under cabinets, shelves, and other structures and positioned above plant 746. In this regard, the ambiance lighting system 100 can be a grow light for plants.

In reference 'D', an ambiance lighting system 100 can be equipped with a device charger 638 which is interconnected with a power source 602. One or more of the device charger 638 can be implemented in an ambiance lighting system 100 having similar or different functionality. In an exemplary embodiment, the device charger 638 can be configured to recharge consumer 302 computing devices 506 and other similar devices. In this regard, the computing device 506 can be plugged into the device charger 638 by way of a power cord 644 which can be a USB cord or other suitable type and or kind of power cord 644 as may be required and/or desired in a particular embodiment.

In another exemplary embodiment, an external power source 646 such as a transformer, an AC voltage source, a DC voltage source, or other suitable power sources can be plugged into the device charger 638 by way of a power cord 648, wherein the external power source 646 can charge the ambiance lighting system 100 power source 602 as may be required and/or desired in a particular embodiment.

Referring to FIG. 15B, there are illustrated examples of applications of an ambiance lighting system 100. In an exemplary embodiment, in reference 'A', an ornament 742 can be hung from the inside of the ambiance lighting system and the shadow outline 744 of the ornament 742 can be cast onto the surfaces of the translucent panels 104.

In an exemplary embodiment, in reference 'B', a recharging station 760 can be configured with an external power source 646 to charge a plurality of the light control panel 106 at the same time. In this regard, a plurality of the light control panel 106 can be plugged into a charging station and recharged by the external power 646. In operation, if an ambiance lighting system 100 is not in a location that provides light for solar panel s 188 or provides other suitable power the light control panel 106 will periodically need to be recharged. As such, sleeve 110 housing the light control panel 106 can be replaced with a fully charged light control panel 106, and the depleted light control panel 106 can be plugged into recharging station 760 and recharged.

In an exemplary embodiment, the light control panel 100 can be removed from sleeve 110 and placed in a recharging station terminal while other light control panel 100 co-located. A recharged light control panel 100 can then be removed form the recharging station terminal and placed in the sleeve 110, thereby, rotating freshly charged light control panel 100 that are in need of recharging. As may be required and/or desired in a particular embodiment, the recharging station terminal can be fashioned into a decorative piece to blend in with the décor.

Further, in operation and with reference to FIG. 15C, reference 'A' illustrates how the light control panel 106 can be stacked one on top of the other and recharged. In this regard, power applied to a base ambiance lighting system 100 can pass power to a second ambiance lighting system stack on top. With each of the ambiance lighting system 100 receiving power for recharging from the prior stacked ambiance lighting system 100 a large number of ambiance lighting system 100 can be stacked for recharge saving space and utilizing a single external power supply 646.

Referring to FIG. 15, reference 'B', a lighting fixture box can be constructed of more than one box panel 167 that are interconnected at the perimeter to form a fixture such a fixture box 720A-C in FIG. 12, that the ambiance lighting system 100 can fit inside. In this regard, in an exemplary embodiment, the ambiance lighting system 100 can be placed on a box spinner 165 and the box panels 167 interconnected 410 with the box spinner 165 perimeter. In such an embodiment, the complete assembly of the box fixture can comprise the box spinner 165, the interconnected box panels 167 on each side of the box spinner 165, and the ambiance lighting system 100 placed inside the box panels 167 on the top of the box spinner 165. Reference 'B' is a top view of the ambiance lighting system 100 on the box spinner 165 and reference 'C' is a bottom view that better illustrates the table surface contacting points 169.

In operation, the ambiance lighting system 100 is placed on the box spinner 165, and the box panels 167 are interconnected 410 with the perimeter of the box spinner 165. The box spinner 165 rotates causing the ambiance lighting system to rotate creating an ambiance lighting effect.

In an exemplary embodiment, the ambiance lighting system 100 can comprise a box spinner 165. Each of the translucent panel 104 can be interconnected with the box spinner 165 along a bottom edge 140. More than one box panel 167 interconnects 410 along the perimeter of the box spinner 165. The box panel 167 covers the translucent panel 104. The box panel 167 has at least one of an aperture 171 therethrough allowing light from the light control panel 106 to pass from the interior region 136 through the translucent panels 104 and through the aperture 171 while the box spinner 165 rotates the translucent panel 104 (the ambiance lighting system 100) and the box panel 167 to create an ambiance lighting effect.

Figure 15D:
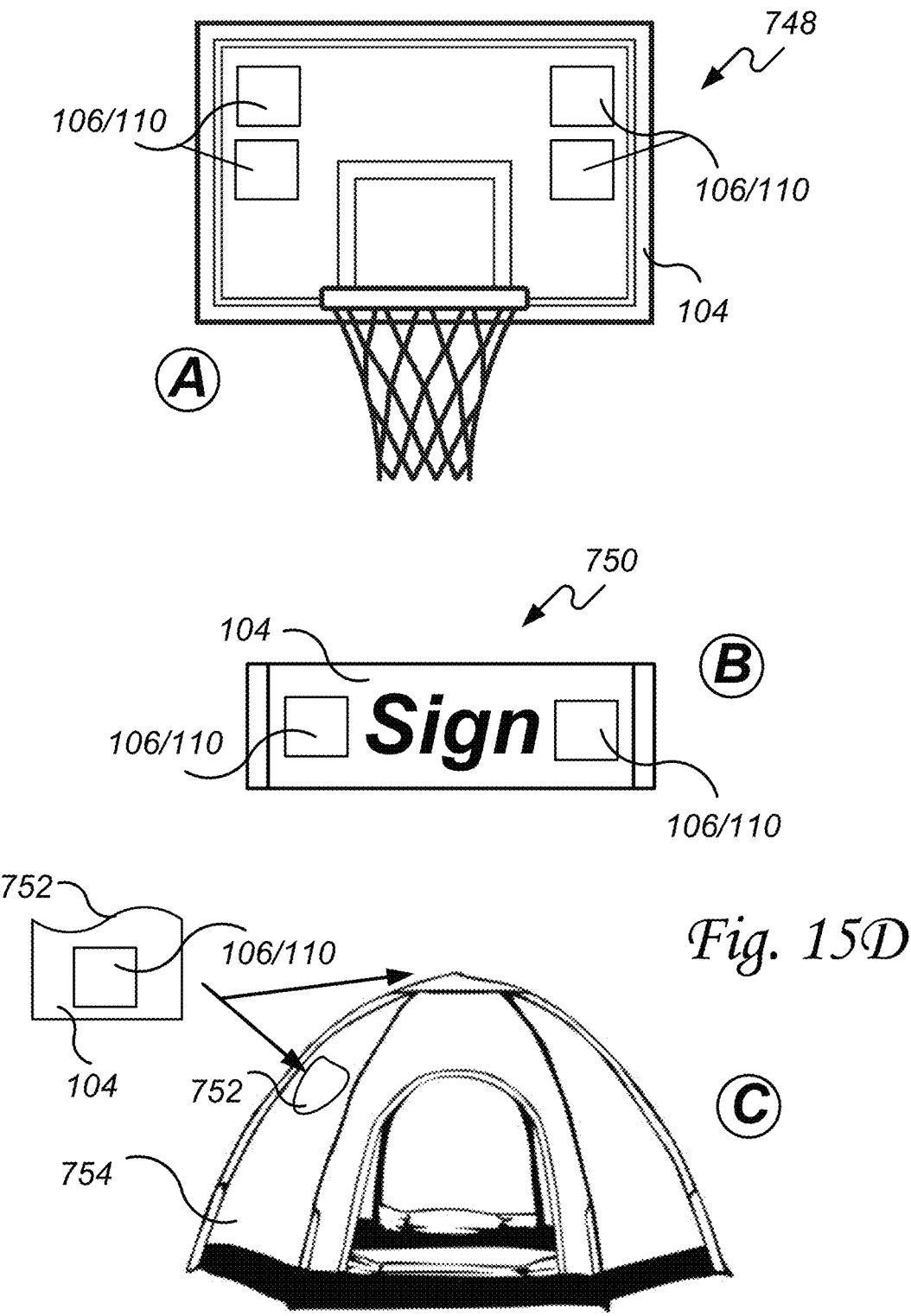

Referring to FIG. 15D, there are illustrated examples of an application of an ambiance lighting system 100. In reference 'A', a basketball backboard 748 can comprise a translucent panel 104 configured to be a backboard. In such as application, the translucent panel 104 can be clear or clouded in appearance as may be required and/or desired in a particular embodiment. In operation, one or more of the sleeves 110 with the light control panel 106 can be secured to and behind the backboard translucent panel 104 so that consumers 302 can play basketball at night and in other low light conditions. In an exemplary embodiment, signs of all types can utilize the light control panels 106 in plexiglass, or other translucent material. As an example, and not a limitation, such signs can include freestanding, wall-mounted, signs attached to buildings, as well as other types and kinds of signs as may be required and/or desired in a particular embodiment.

In another exemplary embodiment, in reference 'B' the translucent panel 104 can be a sign 750. In such an application, one or more of the sleeve 110 with the light control panel 106 can be secured to and behind the translucent panel 104 as to provide a lighted sign that consumers 302 and others can see.

In another exemplary embodiment, in reference 'C', the translucent panel 104 can be window 752 on tent 754. In this regard, one or more of the sleeve 110 with the light control panel 106 can be secured to the window inside or outside tent 754. In this regard, sunlight can recharge the power source 602 such as by solar panels 188 during daylight, and provide a light source to illuminate the interior of the tent in the evening or other low light conditions. Windows 752 can be located on any surface of tent 754 including the sides and top of tent 754 as may be required and/or desired in a particular embodiment.

Figure 15E:
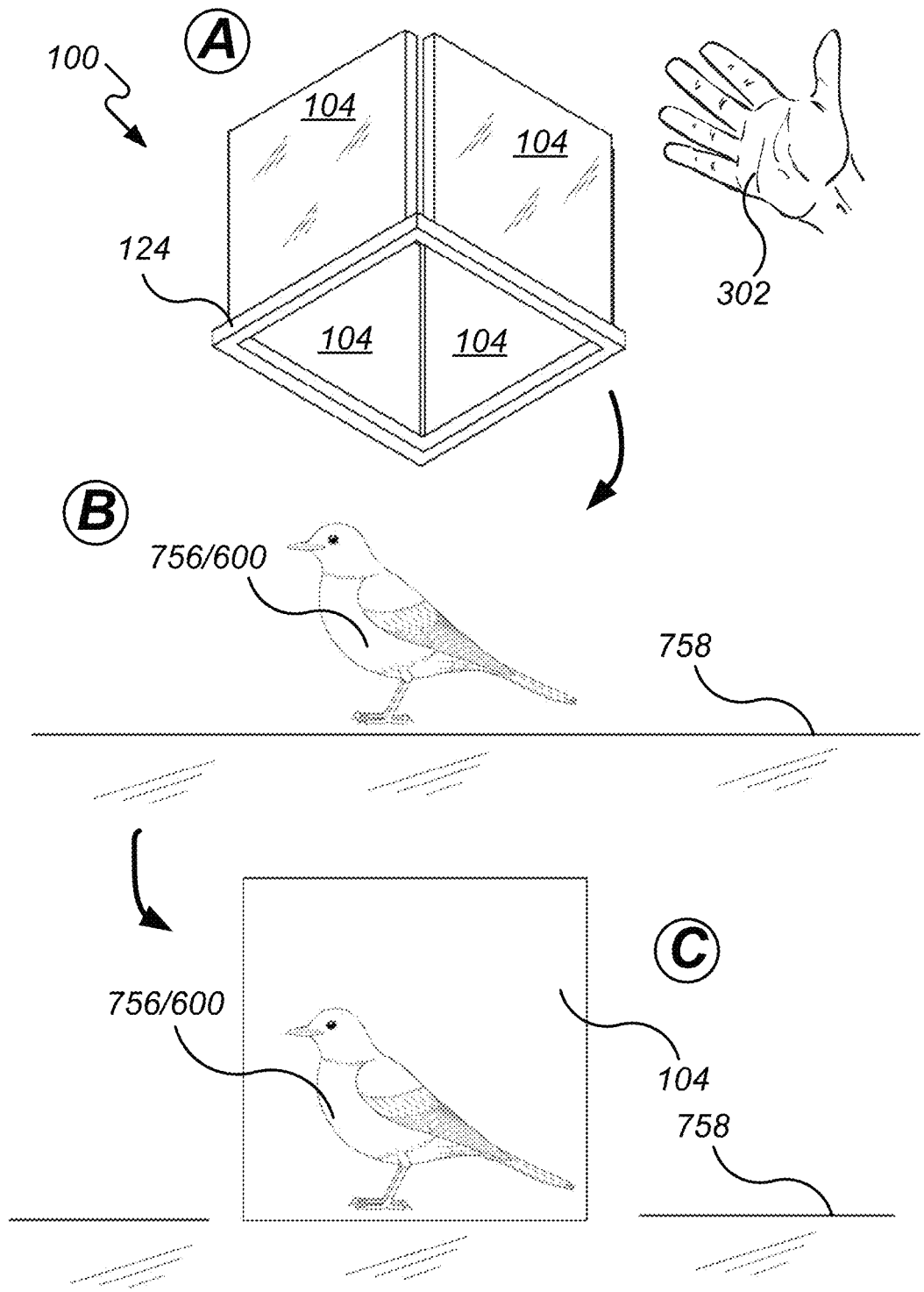

Referring to FIG. 15E, there are illustrated examples of an application of an ambiance lighting system 100. In an exemplary embodiment, the translucent panels 104 can form a cover that a consumer 302 can place over an object such as a bird 756 or another object sitting on a surface 758. In this regard, consumer 302, in reference 'A', can removably cover object 756, in reference 'B', and the control system 600 including the power source 602, and the LED(s) 608. In reference 'C', the combination forms an ambiance lighting system 100. Object 756 can be a bird, or other types and kinds of objects as may be required and or desired in a particular embodiment. In an exemplary embodiment, the object can be a night light and make use of colorful LED(s) to provide light as well as promote by LED color selection calming, relaxing, soothing, and/or other health and wellness benefits as may be required and/or desired in a particular embodiment.

Referring to FIG. 16, there are illustrated examples of mirrored translucent panels. In an exemplary embodiment, mirrored panels 176 or mirrored films 174 can be used to direct the light from the lighting panel 106 in different ways to create ambiance lighting effects. Such ambiance lighting effects can include for example directing light away from one or more of the translucent panels 104 to darken certain panels, directing light towards one or more of the translucent panels 104 to brighten certain panels, directing light downwards to brighten the surface, or décor below the ambiance lighting system 100, directing the light away from the sleeve 106 of the ambiance lighting system 100, or directing the light with mirrored panels 176 or mirrored films 174 in other ways to create other ambiance lighting effects as may be required and/or desired in a particular embodiment.

In an exemplary embodiment, mirrored panels 176 or mirrored films 174 can be added to one or more of the translucent panels 104 or bottom translucent panel 152. The mirrored panels can be fully reflective, semi-reflective, operate as a two-way mirror or be mirrored in other ways and configurations as may be required and or desired in a particular embodiment. In this regard, in reference 'A', a mirrored panel 176 can be adhered by adhesive, hook-and-loop, magnets, or other methods to any one of the translucent panels 104 or the bottom translucent panel 152. Alternatively, the translucent panel 104 and/or the bottom translucent panel 152 can be a mirrored panel 172 and as such not necessitate the addition of a secondary mirrored panel 172 being added and attached to the translucent panel 104 or bottom translucent panel 152.

In another exemplary embodiment, in reference 'B', a mirrored film 174 can be applied to the translucent panel 104 or the bottom translucent panel 152. Such mirrored film can be adhered by adhesive, hook-and-loop, magnets, or other methods to the surface of the panel providing the desired mirrored effect and result.

In another exemplary embodiment, in reference 'C', a mirror shaper 180 can be used to contour the mirrored film 174 on one or more of the translucent panel 104 or bottom panel 152. In this regard, the mirror shaper 180 can be adhered by adhesive, hook-and-loop, magnets, or other methods to the surface of one or more of the translucent panels 104 or bottom translucent panel 152 and covered with a mirrored film 174. The mirror shaper 180 provides a three-dimensional surface 175 structure on an otherwise planer translucent panel 104, bottom panel 152, or the pocket back surface 173 along the panel perimeter 127. The mirrored shaper 180 when covered with a mirrored film 174 enables the design of intricate ambiance lighting effects by allowing radiated light from the light control panel 106 to be tailored internally within the ambiance lighting system 100 and directed externally into spaces, onto surfaces, and onto decor.

The mirror shaper 180 can be fabricated to cover some, part, or all of a translucent panel 104 or a bottom panel 152. In addition, the mirror shaper 180 can be fabricated to span one or more translucent panels 104 and/or the bottom panel 152. Any number of mirror shapers 180 covered in the mirrored film 174 can be used in an ambiance lighting system 100. Additionally, the mirrored shaper 180 can be fabricated with windows 178 so that in applications where partial light reflection is desired, a portion of the light can pass through the mirrored film 174 and the mirror shaper 180 and exit the translucent panel 104 or bottom translucent panel 152.

The mirror shaper 180 can be any shape or size, have any style of three-dimensional surface 175, have any number of openings 178, and be fabricated from plastic, a wireframe, or other materials as may be required and or desired in a particular embodiment to allow for maximum design and ambiance lighting effect options.

Such mirrored film 170 can be manufactured by 3M or other companies as may be required and/or desired in a particular embodiment.

Figure 17:
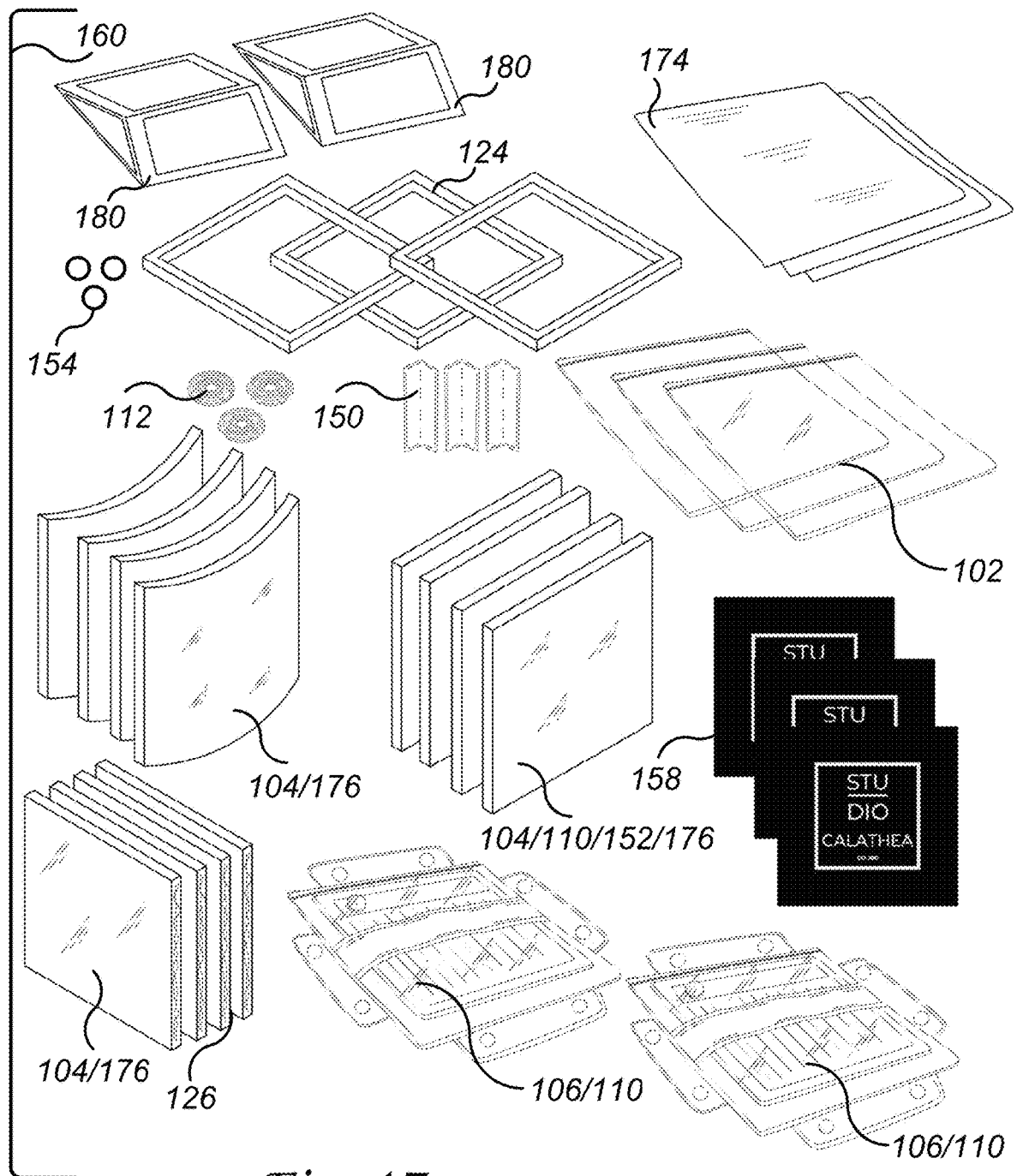
FIG. 17 illustrates one example of an ambiance lighting system kit.

Referring to FIG. 17, there is illustrated one example of an ambiance lighting system kit 160. In an exemplary embodiment, an ambiance lighting system kit can comprise a plurality of each item necessary for a consumer 302 to assemble one or more of the ambiance lighting systems. In this regard, supplies to build 1, 2, 5, 10, 20, or other quantities of the ambiance light system 100 can be packaged in kit 160 form so a consumer 302 can assemble as many as they need. Additionally, customizable options or items such as remote-control 636, and other customizable options or items can be included in kit 160. In an exemplary embodiment, ambiance lighting system kit 160 can come in a variety of translucent panels sizes 104 and thus ambience lighting systems sizes including four-inch by four-inch, six-inch by six-inch, two-inch by four-inch, and other sizes as may be required and/or desired in a particular embodiment.

In an exemplary embodiment for example and not a limitation, illustrated in the ambiance lighting system kit 160 are one or more panel connectors 124, one or more adhesive film 150, one or more Fresnel lens 112, one ore more translucent panel 104, one or more curvilinear translucent panel 104, one or more panel connector 126 such as hook-and-loop or other panel fastener applied to the translucent panel 104, one or more panel fastener 154, one or more of a light control panel 106, one or more of a sleeve 110, one or more of an accessory sleeve 102, one or more of mirror shaper 180, one or more of a mirrored film 174, and one or more of an ornamental accessory 158. Additionally, one or more of the translucent panel 104 or the bottom translucent panel 152 can be mirrored.

In an exemplary embodiment, an ambiance lighting system kit 160 can comprise more than one of a translucent panel 104, one or more of an accessory sleeve 102 secures to the surface of one or more of the translucent panel 104. One or more of a panel connector 124 aligns and interconnects the translucent panel 104 forming a perimeter having a top edge 138, a bottom edge 140, and an interior region 136. One or more of a light control panel 106 comprising one or more light-emitting diode (LED) 608, and a power source 602. One or more of a sleeve 110 has an open edge 148. The light control panel 106 slides into the open edge 148 and is retained in sleeve 110. The sleeve 110 is secured across the top edge 138 or the bottom edge 140. The light control panel 106 is orientated within the sleeve 110 so that the LED(s) 608 illuminate the interior region 136 projecting light through the translucent panel 104 creating an ambiance lighting effect.

In another exemplary embodiment, at least one of the following is included in the ambiance lighting system kit 160 one or more of a fresnel lens 112, one or more of a bottom translucent panel 152 is attached across the bottom edge 140, and one or more of the fresnel lens 112 is secured to the bottom translucent panel 152. The panel fastener can be one or more of an adhesive strip 150 that spans the edges of the translucent panel, one or more of a magnet 154, or one or more of a hook-and-loop 126. One or more of the translucent panels 104 can be curvilinear in shape. One or more of an ornamental accessory 158 having a plurality of apertures therethrough slides into one or more of the accessory sleeve 102.

In addition, at least one of the following can be included in the ambiance lighting system kit the panel fastener is a rigid frame 124 having a u-shaped groove configured for receiving the top edge 138 or the bottom edge 138 hold each of the translucent panel 104 in position. The panel fastener rigid frame 124 further comprises a plurality of hinges 170 located at junctions where each of the translucent panels 104 intersect. One or more of a flap 118 is formed along at least some of the edges of the sleeve 110. Flap 118 extends beyond perimeter 132. A fastener 114 is affixed to the flap 118. The fastener 114 interconnects with the panel fastener 116 securing the sleeve 110 to the top edge 138 or bottom edge 140 of each of the translucent panel 104. One or more of the translucent panels 104 can have one or more fasteners de-embossed recess/holes 172. The panel fastener 154 can be fitted into the fastener hole 172. A seal 120 proximate to the open edge 148 of the sleeve 110 that when closed by a consumer 302 creates a water resistance environment around the light control panel 106. A handle 108 spans and is connected at each end to the edges of the sleeve 110. A solar panel 188 is operationally related to power source 602. Remote-control 636 is operated by a consumer 302. A remote-control interface 610 is operationally related to the light control panel 106 and wirelessly with the remote-control 636. The ambiance lighting system is operable by the consumer 302 by way of the remote-control 636. A communication interface 616 is operationally related to the microcontroller 642 and configured to data communicate with one or more of a remote data processing resource 504, a computing device 506, or wirelessly with other light control panels 106 associated with other ambiance lighting systems 100. In an exemplary embodiment, one or more light diverters 184 can be included in the ambiance lighting system kit 160.

Referring to FIGS. 18-20, there are illustrated examples of a light control panel 106. In an exemplary embodiment, a light control panel 106 can comprise a control system 600. The control system 600 operates the lighting in accordance with consumer 302 interaction. In this regard, the control system 600 can comprise and be operationally related to power source 602, activation circuit 604, LED interface 606, and LED lights 608. Reference 'A' is the top side of the light control panel 106 and reference 'B' is the bottom side of the light control panel 106.

In operation, the consumer 302 by way of the activation circuit 604 can perform turning on and off the LED(s), selecting the color of the LED lights, changing light attributes, selecting a program that dims, or flickers the LED(s) lights, or other features or functions as may be required and/or desired in a particular embodiment.

The activation circuit 604 can be a plurality of switches, a plurality of relays, a plurality of buttons, or other types of kind of activation circuits as may be required and/or desired in a particular embodiment.

The power source 602 can be alternating current (AC), direct current (DC), battery, solar panels 188, a combination thereof, and/or other types and kinds of power sources as may be required and/or desired in a particular embodiment.

The LED interface can be transistor-driven, multiplexed to drive a matrix of LED lights, current-regulated to control the amount of electrical current supplied to the LED lights to control brightness, or interface to drive LED lights in other ways as may be required and/or desired in a particular embodiment.

The LED(s) lights 608 can be a plurality of single color LED, a plurality of red-green-blue type of LED(s) to produce different colors, a plurality of LED(s) that combine solid color and multi-color, or other types or kinds of LED(s) as may be required and/or desired in a particular embodiment.

Referring to FIG. 19, in an exemplary embodiment, the control system 600 can further comprise and be operationally related to the other features and functions such as a remote-control interface 610. The remote-control interface 610 can provide a wireless connection to a remote-control device 636 that is operable by the consumer 302. Such remote-control device can data communicate with the control system 600 by way of the remote-control interface 610 for operating the light control panel 106. Such operation can include turning the system and LED(s) 608 on and off, changing the LED(s) 608 color or changing other light quality attributes, selecting programmed features and functions of the system, and for other purposes as may be required and/or desired in a particular embodiment.

Figure 20A:
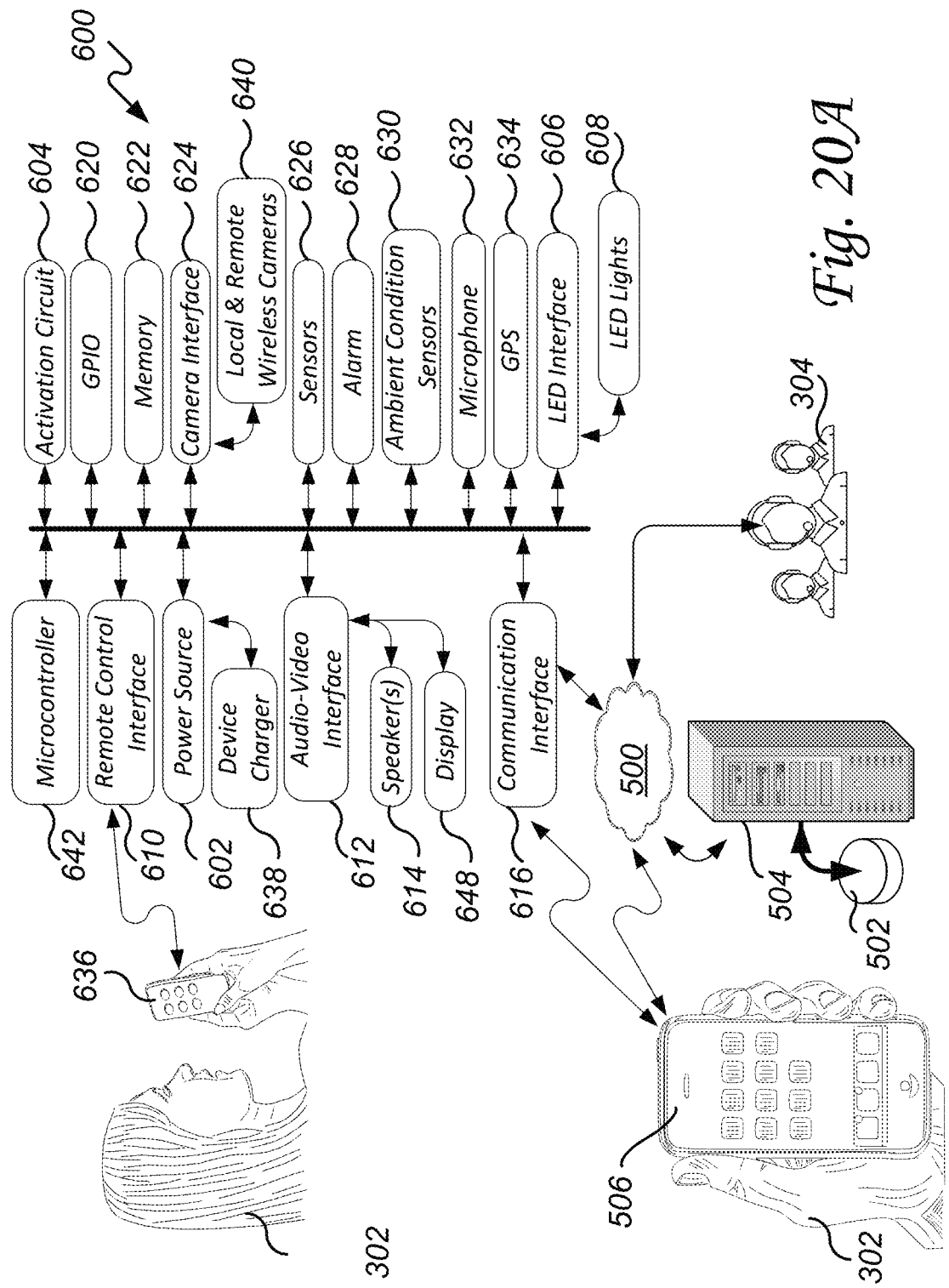

Referring to FIG. 20A, there are illustrated examples of a light control panel 106. In an exemplary embodiment, the light control panel 106 can comprise a plurality of features including being web-enabled and operating as a web-enabled control system.

The term "web-enabled" or "web-enabled control system" or "web-enabled control system 600" in the present invention is intended to mean an Internet-of-things device. In this regard, a device such as the light control panel is equipped with a control system 600 that is capable of connecting a physical device such as the ambiance lighting system 100 to the digital world. Stated differently, web-enabling is equipping a device such as an ambiance lighting system 100 with the necessary electronics and firmware to be monitored, controlled, and data communicate locally and remotely with other data communicating devices. Such other data communicating devices can be smartphones, tablets, laptops, other web-enabled devices, servers, other ambiance lighting system 100, and other types or kinds of data communicating devices as may be required and/or desired in a particular embodiment.

In addition, such computing devices 506 can data communicate with remote data processing resources 504 and utilize data storage resources 502. Such data processing resources 504 can be a server, a database 502, or other types and kinds of data processing resources. Furthermore, computing devices 506, remote data processing resources 504, data storage resources 502, other ambiance lighting systems 100, and other types and kinds of data communicating devices can data communicate over a global network 500.

Remote agents 304 can also data communicate over the global network 500 to interact with a plurality of ambiance lighting systems 100, consumer computing devices, and other data processing resources as may be required and/or desired in a particular embodiment. Such remote agent 304 interaction can be to operate or program the ambiance lighting systems 100, interact with the consumer 302 when they are proximate to the ambiance lighting system 100 through microphone 632 and speaker 614, or for other purposes as may be required and/or desired in a particular embodiment.

Such computing devices 506 can data communicate directly with the communication interface 616 or remotely over the global network 500. The global network 500 can be the Internet. Database 502 is operationally related to the data processing resource 504.

In an exemplary embodiment, the light control panel 106 can be equipped with a web-enabled control system 600. Such a web-enabled control system can comprise a microcontroller 642 which is operationally related to a plurality of communication interfaces 616, a power source 602, a remote-control interface 610, an audio interface 612, an activation circuit 604, general-purpose inputs and outputs (GPIO) interface 620, a memory 622, a camera interface 624, a plurality of sensors 626, an alarm 628, ambient condition sensors 630, a microphone 632, a global position system device 634, and a light-emitting diode (LED) interface 606.

The power source 602 can be further interconnected with a device charger 638 that is configured to charge digital devices such as a smartphone, laptop, tablet, or other digital devices as may be required and/or desired in a particular embodiment.

The audio interface 612 can be further interconnected with speaker(s) 614 and a display 648. Such a display 648 can be an OLED, LCD, or other types and/or kinds of displays. The LED interface 606 can be further interconnected with a plurality of LED lights 608.

The microcontroller 642 can be INTEL, ZILOG, MICROCHIP, AMD, ARM, and/or other types or kinds of microcontrollers.

The communication interfaces 616 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The GPIO 620 can be TTL, CMOS, transistors, buffers, relays, pushbutton, switches, and/or other types and of types and kinds of GPIO circuits.

The memory 622 can be a combination of random access memory (RAM), read-only memory (ROM), flash memory, hard drives, solid-state drives, USB flash drives, and/or other types and kinds of memory.

The camera interface 624 can be further interconnected with a plurality of cameras 640. Such plurality of cameras 640 can be 'local' meaning mount or otherwise attached to the ambient lighting system 100 or 'remote' meaning that the camera 640 is either tethered by wire with the camera interface 624 or forms a wireless connection with the camera interface 624.

In an exemplary embodiment, the camera interface 624 can be 'local' integrated into the ambiance lighting system 100 or can be 'remote' so that the camera 640 view is of the ambiance lighting system 100 and the surrounding area. Also, several cameras 640 can be utilized to create a network of camera 640 views that can monitor a broader area. Such multiple cameras 640 applications can include some cameras 640 that are 'local' integrated into the ambiance lighting system 100 and some cameras 640 that are 'remote'.

In an exemplary embodiment, the sensors 626 can be passive infrared sensor (PIR) motion sensors, infrared, thermal, Doppler radar, ultrasonic, capacitance, touch-type, optical, Hall effect, switch, fingerprint, light-detecting, and other types of biometric sensors, and/or other types and kinds of sensors.

In an exemplary embodiment, such light detecting sensor 626 application can be implemented to have the light control panel 106, LED(s) 608 turn 'on' automatically in dark environments like when the sun goes down, and turn 'off' in light environments such as when the sun rises.

The alarm 628 can be noise, lights, relays, siren, horn, piezo buzzer, speaker, voice annunciations, and/or other types and kinds of alarms. For remote monitor applications, notifications can be sent to the consumer 302 or remote agents 304 when an alarm or other type of condition is detected.

The ambient condition sensors 630 can be temperature, moisture, humidity, sunlight, time, date, and/or other types and kinds of sensors.

The microphone 632 listens to noises and spoken language proximate to the ambiance lighting system. Such listening can be used to remotely monitor, integrate with AMAZON ALEXA and similar type personal assistant web-enabled technologies, allow consumer 320 to talk with remote agents 304 or other remote persons, and for other purposes as may be required and/or desired in a particular embodiment. In this regard, speaker 614 can annunciate AMAZON ALEXA types of responses, play music, be a speaker 614 that is part of the event or location public address system, or other types or kinds of microphone/speaker applications as may be required and/or desired in a particular embodiment.

The global position system (GPS) device 634 can be used to determine the geographic location of the ambiance lighting system 100 within a geographic space 406. In a plurality of exemplary embodiments, the GPS location of a plurality of ambiance lighting systems 100 can be used to establish at least one geofence area 404 (also referred to as geofenced areas 404A-C in at least FIG. 20B) in a geographic area 406. Message notifications, such as SMS text and other notifications, can then be sent to computing devices 606 such as smartphones, laptops, and other computing devices based, in part, on whether or not the computing device 506 is inside or outside a geofenced area 404.

For example, and not a limitation, SMS text notifications can be sent and received on guest smartphones if they are outside a geofenced 404 area that is serving food, asking them to please come join for dinner.

In an exemplary embodiment, the light control panel 106 comprises a microcontroller 642, a communication interface 616 that is operationally related to the microcontroller 642 and configured to data communicate with a remote data processing resource 504, a computing device 506, or wirelessly with other ambiance lighting systems 100. The light control panel 106 also comprises an audio-video interface 612 that is operationally related to the microcontroller 642 and a speaker 614 and/or a display 648.

In operation, a memory 622 is operationally related to the microcontroller 642. The memory 622 is encoded with instructions that when executed by the microcontroller 642 perform the steps of receiving, by way of the communication interface 616, a digital media file, and playing the digital media file by way of the audio-video interface 612 and the speaker 614 and/or the display 648.

In another exemplary embodiment, in operation, the light control panel 106 can be equipped with a web-enabled control system 600 so that the ambiance lighting system 100 can be remotely monitored and controlled. Such remote monitoring and control can be effectuated by the remote agents 304, the consumer 302, a remote service provider, and/or by others as may be required and/or desired in a particular embodiment. Such remote service providers can be StudioCalathea.com or their agents, their partners, their service provider, an alarm monitoring company, a lighting company or event planning company, or other types and kinds of remote service providers as may be required and/or desires in a particular embodiment. In addition, such remote monitoring control can be by way of computing devices 506 or remote data processing resource 504.

Figure 20B:
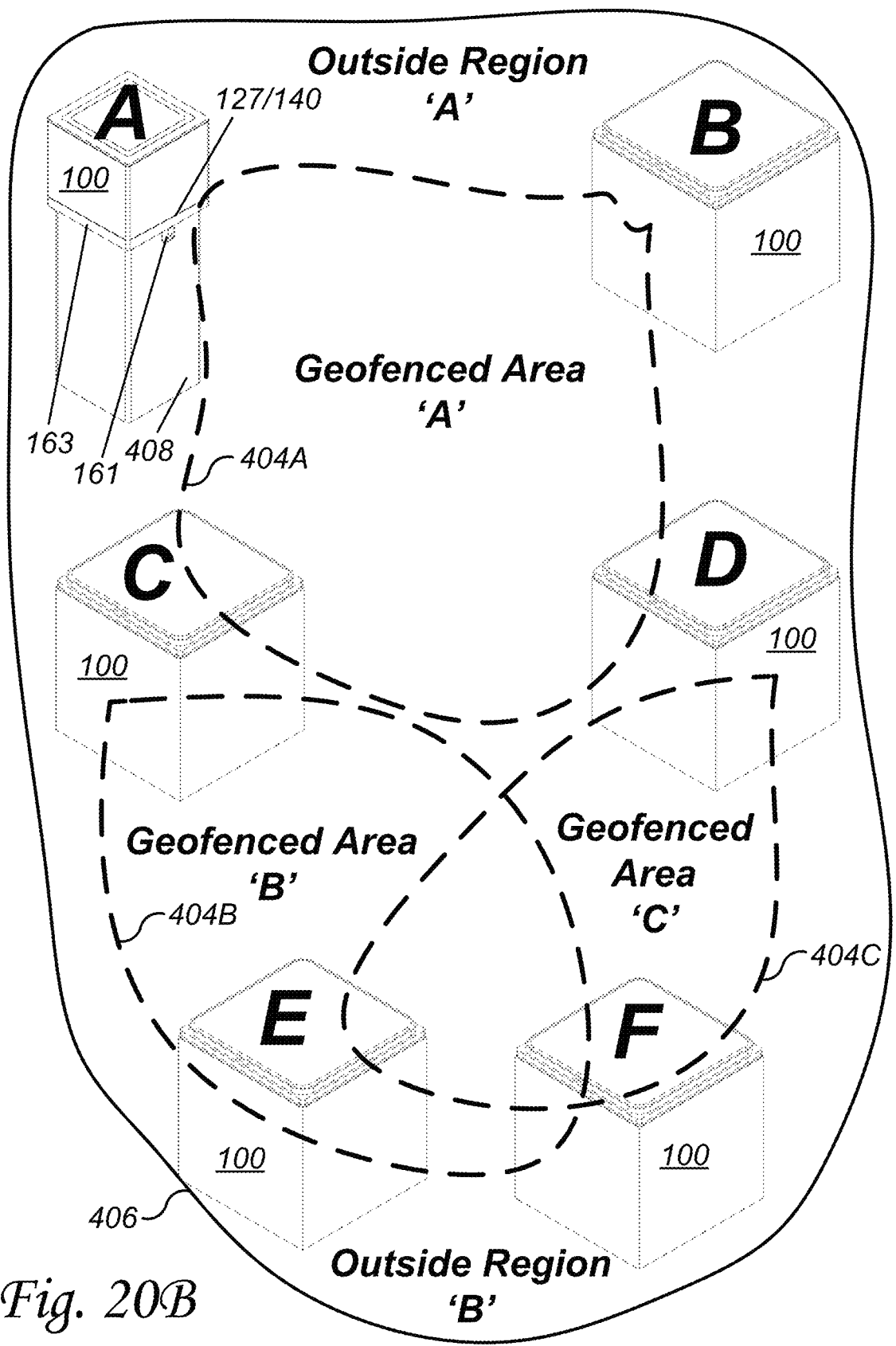
FIG. 20B illustrates one example of a plurality of ambiance lighting systems used to create geofenced boundary areas within a geographic space.

Referring to FIG. 20B, there is illustrated one example of a plurality of ambiance lighting systems 100 used to create geofenced boundary areas within a geographic space 406. In an exemplary embodiment, at least one geofenced area 404 can be created within a geographic area 406, wherein the boundary of the geofenced area 404 is determined by the location of more than one ambiance lighting system 100 communicating its GPS location data to a remote data processing resource 504. In this regard, once placed the ambiance lighting system 100 can report its GPS location data by way of the GPS 634 and communication interface 616. Such reporting can be received by a remote data processing resource 504. The GPS location data from several ambiance lighting system 100 can then be used to determine one or more geofenced areas 404A-C within a geographic area 406.

For example, and not a limitation, the ambiance lighting system 100 placed around the perimeter of a pool creates a geofence around the pool, the ambiance lighting system 100 placed around the perimeter of a wedding chapel creates a geofence around the wedding chapel, and so on.

Once the geofenced areas 404A-C are determined the guests within the geographic area 406 can be tracked by their computing device 506 such as a smartphone or other computing device 506. Based on the geolocation of guest computing devices tailors notifications such as SMS text, email, and other notifications can be sent to certain guests. In this regard, for example, and not a limitation in an event is ready to start with a geofenced area 'B' 404B notification can be sent to computing devices outside the geofenced area 'B' 404B notifying them that an event is going to start please return to the event area.

In an exemplary embodiment, there can be multiple different geofenced boundaries 404A-C with a geographic space 406 and notifications can be sent as appropriate to herd guests to areas at the required times to smoothly effectuate an event. Such geofenced areas can include food, entertainment, dancing, bar, events, meet-and-greet areas, silent auction areas, and other areas as may be required and or desired.

A geographic space 406 can be established as an outer perimeter. For the purposes of notifications to guests, those inside the outer perimeter geographic space 406 can be considered as attending the event and therefore receive the notifications while those guests outside the geographic space 406 can be considered as not attending the event and therefore don't receive notifications.

In an exemplary embodiment, the light control panel 106 can comprise microcontroller 642, a global position system (GPS) 634 that is operationally related to the microcontroller 642 and configured to determine the location of the ambiance lighting system 100. The light control panel 106 also comprises a communication interface 616 that is operationally related to the microcontroller 642 and configured to data communicate with a remote data processing resource 504, a computing device 506, or wirelessly with other ambiance lighting systems 100.

In an exemplary embodiment, a post adapter 163 can have a post connector 161. The panel perimeter 127 has a bottom edge 140. The post adapter 163 fits across the bottom edge 140. The post connector 161 secures over post 408 such that the ambiance lighting system 100 can be mounted on top of post 408. In this regard, where fence posts define an area, the ambiance lighting system 100 can be mounted to the top of the fence posts by using a post adapter 163.

To prevent the ambiance lighting system 100 from falling off the fence post 408, a post connector 161 can extend from the post adapter 163 allowing a customer to place a fastener such as a screw or a nail through the post connector 161 into the post 408 to hold the post adapter 163 to the post 408. The ambiance lighting system 100 securely fastens to the post adapter 160 along the panel perimeter 127 bottom edges 140 of the translucent panel 104.

In a plurality of exemplary embodiments, the post adapter 163 can be configured for different sizes and shaped posts 408. In this regard, by way of the post adapter 163, the ambiance lighting system 100 can be configured to mount to a wide variety of posts 408 as may be required and/or desired in a particular embodiment.

In an exemplary embodiment, a post adapter 163 has a post connector 161, and the panel perimeter 127 has a bottom edge 140. The post adapter 163 fits over post 408 and across the bottom edge 140 of the translucent panel 104. The post connector 161 is secured to post 408 such that the ambiance lighting system 100 can be mounted on top of post 408.

In operation, a memory 622 is operationally related to the microcontroller 642. The memory 622 is encoded with instructions that when executed by the microcontroller 642 perform the step of communicating a lighting GPS location data of the ambiance lighting system 100 to the remote data processing resource 504. The computing device 506 receives one or more notification messages from the remote data processing resource 504. The content of the notification message is selected based, in part, on the GPS location of the computing device 506 being located inside or outside of at least one of a geofenced boundary 404A-C that is established by the plurality of the lighting GPS location data from the physical location of the plurality of the ambiance lighting systems 100 within a geographic location 406.

Figure 21:
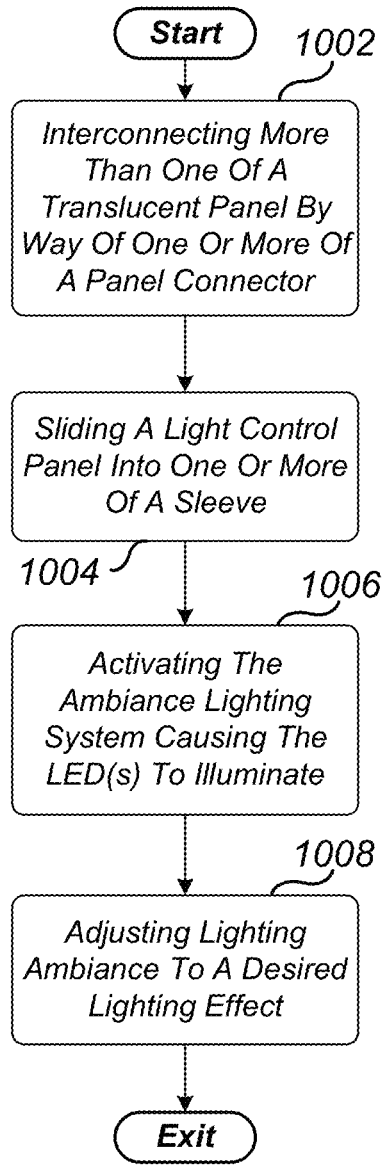
FIGS. 21-22 illustrates one example of a method of using an ambiance lighting system.

Referring to FIG. 21, there is illustrated one example of an ambiance lighting system method. In an exemplary embodiment, the method begins in step 1002 where more than one translucent panel 104 can be interconnected by way of one or more panel connectors 124, 126, or 150. The panel connector 124, 126, or 150 aligns and secures the translucent panels 104 forming a perimeter 132 having a top edge 138, a bottom perimeter 134, a bottom edge 140, and an interior region 136. The method then moves to step 1004.

In step 1004, a light control panel slides into one or more of a sleeve 110, the sleeve 110 having an open edge 148. The light control panel 106 comprises one or more light-emitting diode (LED) 608, and a power source 602. The light control panel 106 slides into the open edge 148 and is retained in sleeve 110. The sleeve 110 is secured across the top edge 138 or the bottom edge 140. The light control panel 106 is orientated within the sleeve 110 so that the LED(s) 608 illuminates the interior region 136 through the translucent panel creating an ambiance lighting effect. The method then moves to step 1006.

In step 1006, the ambiance lighting system is activated causing the LED(s) 608 to illuminate. The method then moves to step 1008.

In step 1008, the lighting ambiance is adjusted to the desired lighting effect. The method is then exited.

Figure 22:
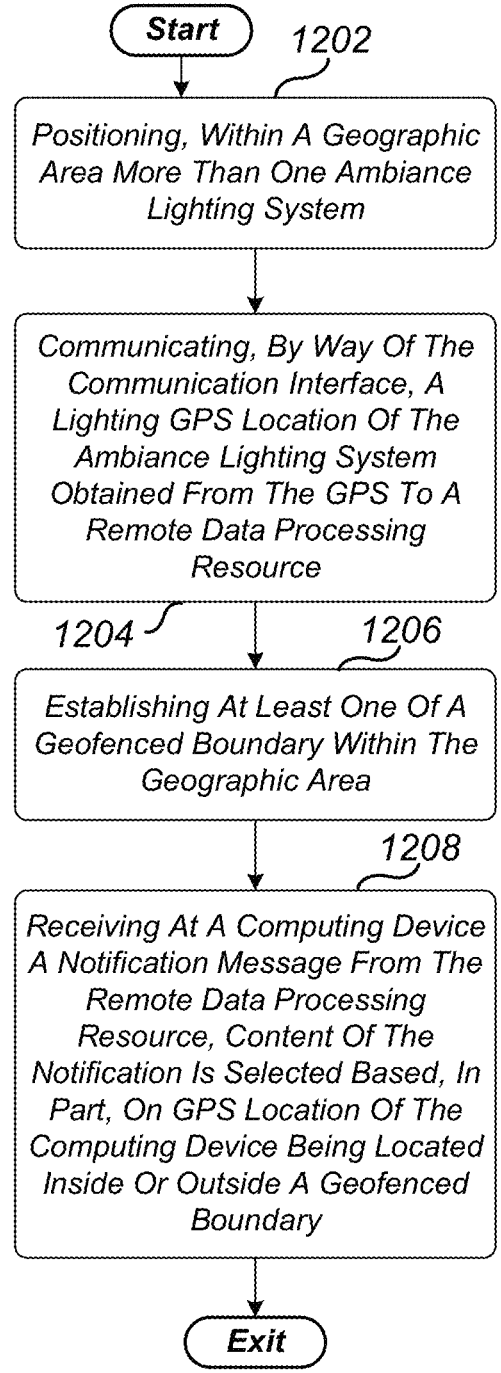

Referring to FIG. 22, there is illustrated one example of a method of using an ambiance lighting system. In an exemplary embodiment. The method begins in step 1202.

In step 1202, more than one ambiance lighting system 100 are positioned, within a geographic area.

In one embodiment, the ambiance lighting system 100 comprises more than one translucent panel 104, and a light control panel 106 that comprises one or more of a light-emitting diode (LED) 608, and a power source 602, a global position system (GPS) 634 configured to determine the location of the ambiance lighting system 100, and a communication interface 616 configured to data communicate with a remote data processing resource 504, a computing device 506, or wirelessly with a plurality of the ambiance lighting system 100.

A lens adapter 186 has more than one lens aperture 190, a panel inlay 194, and a frame adapter 192. The lens adapter 186 is sized to extend across the top edge 138 and contoured along the outer edge of the translucent panel to match perimeter 132. The light control panel 106, in a removable manner, fits snugly into the panel inlay 194, and each of the LED 608 is positioned inside one of the lens aperture 190. The lens adapter positions the light control panel across the top of the interior region 136. Frame 192 has a frame opening 119. The frame adapter 186 fits snugly into the frame opening 192. The outer perimeter of frame 192 is sized and contoured to fit into the interior region 136 extending to the interior surface of the translucent panel 104 along the perimeter 132 in a manner that abates the motion of the lens adapter 186 and the light control panel 106. The light control panel 106 is orientated within the panel inlay 194 so that light from the LED 608 passes through the lens aperture 190 and the frame opening 119 illuminating the interior region 136 and projecting light through the translucent panel2 104 creating an ambiance lighting effect.

In a second embodiment, more than one of an ambiance lighting system 100 is positioned, within a geographic area. The ambiance lighting system 100 comprises more than one translucent panel 104, a light control panel 106 that comprises one or more of a light-emitting diode (LED) 608, a power source 602, a global position system (GPS) 634 configured to determine the location of the ambiance lighting system 100, and a communication interface 616 configured to data communicate with a remote data processing resource 504, a computing device 506, or wirelessly with a plurality of the ambiance lighting system 100.

A luminary wrap 107 forms a top panel 123, and a perimeter 132. The perimeter 132 has a top edge 138, and an interior region 136. The luminary wrap 107 comprises at least two layers of flexible clear material seamed together with more than one of an edge divider 109 forming at least one pocket 133 on the top panel 123, and more than one pocket 125 (also referred to as 125A-D in at least FIG. 1O) on the panel perimeter 127. Each of the pockets 123/125 has a pocket front surface 171 and a pocket back surface 173. The pocket back surface 173 faces the interior region 136. At least some of the pocket 123/125 has an open pocket edge 129. A portion of the top panel 123 is connected to the top edge 138 by at least one of the edge dividers 109. A press-to-seal fastener 111 is integrated along the open pocket edge 129. The open pocket edge 129 is positioned along the pocket back surface 173. The translucent panel 104 slides into the open pocket edge 129 of pocket 125 along the panel perimeter 127 and the light control panel 106 slides into the open pocket edge 129 of pocket 133 on the top panel 123. The open pocket edge 129 is sealed closed by way of the press-to-seal fastener 111. Viewable from the pocket front surface 171, the translucent panels 104 hide the open pocket edge 129. The top panel 123 comprises a top panel flap 115. At least one panel fastener 168 is integrated into the top panel flap 115 and the panel perimeter 127. The ambiance lighting system 100 is collapsible until the top panel 123 is extended across the top edge 138 and the panel fasteners 168 on the top panel flap 115 are aligned and interconnect with the panel fasteners 168 on the panel perimeter 127 transforming the ambiance lighting system 100 into a rigid structure. The LED 608 is orientated to illuminate the interior region 136, projecting light through the translucent panels 104 creating an ambiance lighting effect 100. The method then continues in step 1204.

In step 1204, a lighting GPS location data of the physical location of the ambiance lighting system 100 obtained from the GPS 634 is data communicate, by way of the communication interface 616, to the remote data processing resource 504. The method then moves to step 1206.

In step 1206, at least one geofenced boundary 404 (also referred to as 404A-C in at least FIG. 20B) is established, within the geographic area 406 based on a plurality of the lighting GPS location data from a plurality of ambiance lighting system 100. The method then moves to step 1208.

In step 1208, a notification message is received from the remote data processing resource 504 at the computing device 506. The content of the notification message is selected based, in part, on the GPS location of the computing device 506 being located inside or outside the geofenced boundary 404. The method is then exited.

Figure 23:
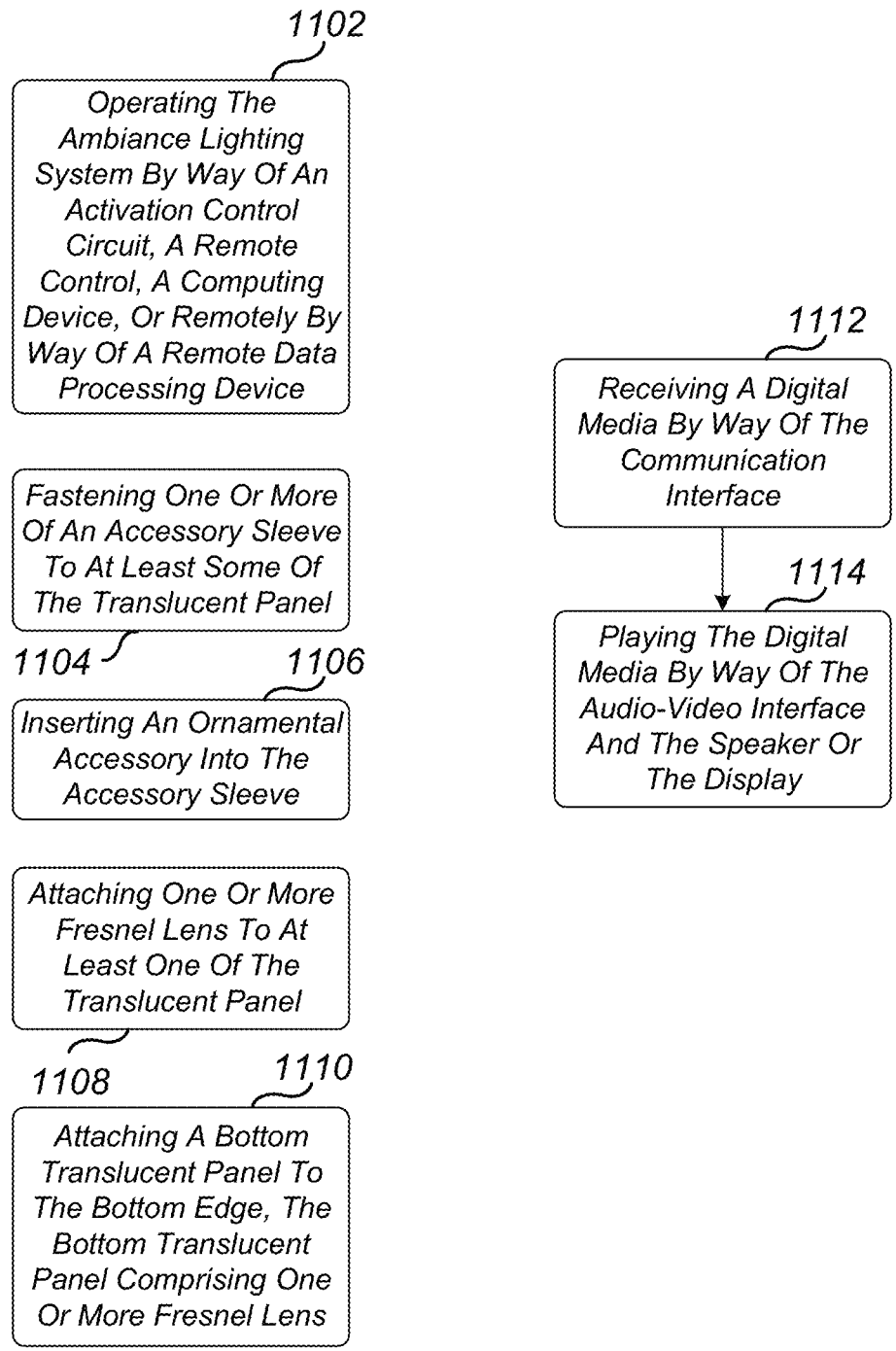
FIG. 23 illustrates an exemplary embodiment of an ambiance lighting system method.

Referring to FIG. 23, there are illustrated exemplary embodiments of an ambiance lighting system 100. The following exemplary embodiment steps can be used interchangeably with the methods of the present invention.

In step 1102, the ambiance lighting system 100 can be operated by way of an activation control circuit 604, a remote-control 636, a computing device 506 such as a smartphone, or remotely by way of a remote data processing resource 504.

In step 1104, one or more of an accessory sleeve 102 is fastened to at least some of the translucent panels 104.

In step 1106, an ornamental accessory 158 is inserted into the accessory sleeve 102.

In step 1108, one or more Fresnel lens 112 is attached to at least one of the translucent panels 102 or the bottom translucent panel 152.

In step 1110, a bottom translucent panel 152 is attached to the bottom edge 140. The bottom translucent panel 152 comprises one or more of a Fresnel lens 112.

In step 1112, a digital media file, digital media stream, or other digital media data source (also referred to as digital media) is received by way of the communication interface 616. An audio interface 612 is operationally related to the light control panel 106 and a speaker 614 or a display 648. The method then moves to step 1114.

In step 1114, the digital media file, stream, or other digital media data source (also referred to as digital media) is played by way of the audio-video interface 612 and the speaker 614 or the display 648.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An ambiance lighting system comprising:
   more than one of a translucent panel is aligned, absent occlusions along surface of the translucent panel, and interconnected to form a panel perimeter having a top edge, and an interior region;

a light control panel comprises one or more of a light-emitting diode (LED), and a power source;

a lens adapter having more than one of a lens aperture, a panel inlay, and a frame adapter, the lens adapter is sized to extend across the top edge and contoured along outer edge of the translucent panel to match the panel perimeter, the light control panel, in removable manner, fits snug into the panel inlay and the LED is positioned inside the lens aperture, the lens adapter positions the light control panel across top of the interior region; and a frame having a frame opening, the frame adapter fits snug into the frame opening, outer perimeter of the frame is sized and contoured to fit into the interior region along interior surface of the translucent panel and along the panel perimeter in a manner that abates motion of the lens adapter and the light control panel;

the light control panel is orientated within the panel inlay so that light from the LED passes through the lens aperture and the frame opening illuminating the interior region and projecting light through the translucent panel to create an ambiance lighting effect.

2. The ambiance lighting system in accordance with claim 1, further comprising one of the following:
a retractable tether interconnects on a first end with a lighting adapter and the lighting adapter interconnects with the ambiance lighting system, the retractable tether interconnects on a second end with an external object, wherein by way of the retractable tether hanging height of the ambiance lighting system is adjustable; or
the retractable tether interconnects the ambiance lighting system with the external object allowing adjustment of hanging height of the ambiance lighting system.

3. The ambiance lighting system in accordance with claim 1, further comprising:
one or more of an accessory sleeve is adhered to the interior region facing surface of the translucent panel; and
one or more of an ornamental accessory having a plurality of apertures therethrough slides into one or more of the accessory sleeve.

4. The ambiance lighting system in accordance with claim 1, further comprising:
one or more of a color lens cover the LED changing color of the light broadcast from the LED into the interior region, each of the color lens are removably fastened into the lens aperture.

5. The ambiance lighting system in accordance with claim 1, further comprising:
one or more of a mirrored film; and
one or more of a mirror shaper, the mirror shaper having a three-dimensional shape and one or more of an opening, the mirror shaper adheres to one or more of the translucent panel, the mirrored film adheres to the three-dimensional surface of the mirror shaper, the mirror shaper when covered with the mirrored film redirects at least a portion of radiated light from the light control panel while selectively allowing partial light transmission through the mirrored film and the opening to enhance the ambiance lighting effect.

6. The ambiance lighting system in accordance with claim 1, further comprising:
a box spinner, each of the translucent panel interconnects with the box spinner along a bottom edge; and
more than one box panel interconnects along perimeter of the box spinner, the box panel covers the translucent panel, the box panel having at least one of an aperture therethrough allowing light from the light control panel to pass from the interior region through the translucent panels and through the aperture while the box spinner rotates the translucent panel and the box panel to create the ambiance lighting effect.

7. The ambiance lighting system in accordance with claim 1, further comprising:
a solar panel operationally related to the power source;
a remote-control operated by a consumer; and
a remote-control interface is operationally related to the light control panel and wirelessly with the remote-control, the ambiance lighting system is operable by the consumer by way of the remote-control.

8. The ambiance lighting system in accordance with claim 1, the light control panel further comprising:
a microcontroller;
a communication interface is operationally related to the microcontroller and configured to data communicate with a remote data processing resource, a computing device, or wirelessly with other ambiance lighting systems;
an audio-video interface is operationally related to the microcontroller and a speaker or a display; and
a memory is operationally related to the microcontroller, the memory is encoded with instructions that when executed by the microcontroller perform the steps of:
receiving, by way of the communication interface, a digital media file; and
playing the digital media file by way of the audio-video interface and the speaker or the display.

9. The ambiance lighting system in accordance with claim 1, the light control panel further comprising:
a microcontroller;
a global position system (GPS) is operationally related to the microcontroller and configured to determine geographic location of the ambiance lighting system;
a communication interface is operationally related to the microcontroller and configured to data communicate with a remote data processing resource, a computing device, or wirelessly with other ambiance lighting systems; and
a memory is operationally related to the microcontroller, the memory is encoded with instructions that when executed by the microcontroller perform the step of:
communicating, by way of the communication interface and obtained from the GPS, a lighting GPS location data of physical location of the ambiance lighting system to the remote data processing resource.

10. The ambiance lighting system in accordance with claim 9, further comprises:
the computing device receives one or more of a notification message from the remote data processing resource, content of the notification message is selected based, in part, on the GPS location of the computing device being located inside or outside of at least one of a geofenced boundary that is established by the plurality of the lighting GPS location data from physical location of plurality of the ambiance lighting system within a geographic location.

11. The ambiance lighting system in accordance with claim 1, further comprising:
a post adapter having a post connector, the panel perimeter having a bottom edge, the post adapter fits over a post and across the bottom edge of the translucent panel, the post connector is secured to the post such that the ambiance lighting system can be mounted on top of the post.

12. A method of using the ambiance lighting system of claim 1, the method comprising the steps of:
   positioning, within a geographic area, more than one of the ambiance lighting system, the light control panel comprises a microcontroller, a global position system (GPS) configured to determine location of the ambiance lighting system, and a communication interface configured to data communicate with a remote data processing resource, a computing device, or wirelessly with plurality of the ambiance lighting system;
   communicating, by way of the communication interface and obtained from the GPS, a lighting GPS location data of physical location of the ambiance lighting system to the remote data processing resource;
   establishing at least one of a geofenced boundary, within the geographic area, based on plurality of the lighting GPS location data from plurality of the ambiance lighting system; and
   receiving at the computing device a notification message from the remote data processing resource, content of the notification message is selected based, in part, on GPS location of the computing device being located inside or outside the geofenced boundary.

13. The ambiance lighting method in accordance with claim 12, further comprising the steps of:
   receiving a digital media by way of the communication interface, an audio interface is operationally related to a speaker or a display; and
   playing the digital media by way of the audio-video interface and the speaker or the display.

14. An ambiance lighting system comprising:
   more than one of a translucent panel;
   a light control panel comprises one or more of a light-emitting diode (LED), and a power source;
   a luminary wrap forms a top panel, and a panel perimeter, the panel perimeter having a top edge, and an interior region, the luminary wrap comprises at least two layers of flexible clear material seamed together with more than one of an edge divider forming at least one of a pocket on the top panel, and more than one pocket on the panel perimeter, each of the pocket having a pocket front surface, and a pocket back surface, the pocket back surface faces the interior region, at least some of the pocket having an open pocket edge, portion of the top panel is connected to the top edge by at least one of the edge divider;
   a press-to-seal fastener is integrated along the open pocket edge, the open pocket edge is positioned along the pocket back surface, the translucent panel slides into the open pocket edge of the pocket along the panel perimeter, and the light control panel slides into the open pocket edge of the pocket on the top panel, the open pocket edge is sealed closed by way of the press-to-seal fastener, viewable from the pocket front surface, the translucent panel hides the open pocket edge;
   a top panel flap, the top panel comprises the top panel flap; and
   at least one of a panel fastener is integrated into the top panel flap and the panel perimeter, the ambiance lighting system is collapsible until the top panel is extended across the top edge and the panel fasteners on the top panel flap are aligned and interconnected with the panel fasteners on the panel perimeter transforming the ambiance lighting system into a rigid structure, the LED are orientated to illuminate the interior region, projecting light through the translucent panel to create an ambiance lighting effect.

15. The ambiance lighting system in accordance with claim 14, further comprising:
   a panel end flap is attached and located on an unconnected end of the panel perimeter, at least one of the panel fastener is integrated into the panel end flap and opposite unconnected end of the panel perimeter, such that the panel perimeter can be connected to form continuous loop by way of the panel end flap and the panel fasteners.

16. The ambiance lighting system in accordance with claim 14, at least one of the pocket located along the panel perimeter comprises a bisect divider that allows each of the translucent panel within the pocket adjacent to the bisect divider to be repositioned, changing geometric shape of the ambient lighting system.

17. The ambiance lighting system in accordance with claim 14, each of at least two of the pocket that are opposed along the panel perimeter comprise at least one of a diagonal bisect divider that allows the translucent panel within the panel perimeter pocket adjacent to the diagonal bisect divider to be repositioned allowing the ambiance lighting system to fold flat.

18. The ambiance lighting system in accordance with claim 14, further comprising:
   one or more of a mirrored film; and
   one or more of a mirror shaper, the mirror shaper having a three-dimensional shape and one or more of an opening, the mirror shaper adheres to the pocket back surface along the panel perimeter, the mirrored film adheres to the three-dimensional surface of the mirror shaper, the mirror shaper when covered with the mirrored film redirects at least a portion of radiated light from the light control panel while selectively allowing partial light transmission through the mirrored film and the opening to enhance the ambiance lighting effect.

19. The ambiance lighting system in accordance with claim 14, further comprising:
   a box spinner, the panel perimeter having a bottom edge that interconnects with the box spinner along the bottom edge; and
   more than one box panel interconnects along perimeter of the box spinner, the box panel covers the translucent panel, the box panel having at least one of an aperture therethrough allowing light from the light control panel to pass from the interior region through the translucent panels and through the aperture while the box spinner rotates the translucent panel and the box panel to create the ambiance lighting effect.

20. The ambiance lighting system in accordance with claim 14, the light control panel further comprising:
   a microcontroller;
   a global position system (GPS) is operationally related to the microcontroller and configured to determine geographic location of the ambiance lighting system;
   a communication interface is operationally related to the microcontroller and configured to data communicate with a remote data processing resource, a computing device, or wirelessly with other ambiance lighting systems; and
   a memory is operationally related to the microcontroller, the memory is encoded with instructions that when executed by the microcontroller perform the step of:

communicating, by way of the communication interface and obtained from the GPS, a lighting GPS location data of physical location of the ambiance lighting system to the remote data processing resource.

21. The ambiance lighting system in accordance with claim 20, further comprises:
the computing device receives one or more of a notification message from the remote data processing resource, content of the notification message is selected based, in part, on the GPS location of the computing device being located inside or outside of at least one of a geofenced boundary that is established by the plurality of the lighting GPS location data from physical location of plurality of the ambiance lighting system within a geographic location.

22. The ambiance lighting system in accordance with claim 14, further comprising,
a post adapter having a post connector, the panel perimeter having a bottom edge, the post adapter fits over a post and across the bottom edge of the translucent panel, the post connector is secured to the post such that the ambiance lighting system can be mounted on top of the post.

23. A method of using the ambiance lighting system of claim 14, the method comprising the steps of:
positioning, within a geographic area, more than one of the ambiance lighting system, the light control panel comprises a microcontroller, a global position system (GPS) configured to determine location of the ambiance lighting system, and a communication interface configured to data communicate with a remote data processing resource, a computing device, or wirelessly with plurality of the ambiance lighting system;
communicating, by way of the communication interface and obtained from the GPS, a lighting GPS location data of physical location of the ambiance lighting system to the remote data processing resource;
establishing at least one of a geofenced boundary, within the geographic area, based on plurality of the lighting GPS location data from plurality of the ambiance lighting system; and
receiving at the computing device a notification message from the remote data processing resource, content of the notification message is selected based, in part, on GPS location of the computing device being located inside or outside the geofenced boundary.

24. The method in accordance with claim 23, further comprising the steps of:
receiving a digital media by way of the communication interface, an audio interface is operationally related to the microcontroller and a speaker or a display; and
playing the digital media by way of the audio-video interface and the speaker or the display.

* * * * *